US008364938B2

(12) United States Patent
Gonion et al.

(10) Patent No.: US 8,364,938 B2
(45) Date of Patent: *Jan. 29, 2013

(54) RUNNING-AND, RUNNING-OR, RUNNING-XOR, AND RUNNING-MULTIPLY INSTRUCTIONS FOR PROCESSING VECTORS USING A BASE VALUE FROM A KEY ELEMENT OF AN INPUT VECTOR

(75) Inventors: Jeffry E. Gonion, Campbell, CA (US); Keith E. Diefendorff, Jr., Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 743 days.

This patent is subject to a terminal disclaimer.

(21) Appl. No.: 12/541,526

(22) Filed: Aug. 14, 2009

(65) Prior Publication Data
US 2010/0049951 A1   Feb. 25, 2010

Related U.S. Application Data

(60) Provisional application No. 61/089,251, filed on Aug. 15, 2008.

(51) Int. Cl.
*G06F 7/36* (2006.01)
(52) U.S. Cl. .......... 712/222; 712/223; 712/224
(58) Field of Classification Search .......... None
See application file for complete search history.

(56) References Cited

U.S. PATENT DOCUMENTS

| 5,381,536 A | 1/1995 | Phelps |
| 5,781,752 A | 7/1998 | Moshovos |
| 5,953,241 A | 9/1999 | Hansen |
| 6,115,808 A | 9/2000 | Arora |
| 6,295,599 B1 | 9/2001 | Hansen |
| 6,308,250 B1 | 10/2001 | Klausler |
| 6,584,482 B1 | 6/2003 | Hansen |
| 6,643,765 B1 | 11/2003 | Hansen |
| 6,725,356 B2 | 4/2004 | Hansen |
| 7,213,131 B2 | 5/2007 | Hansen |
| 7,216,217 B2 | 5/2007 | Hansen |

(Continued)

OTHER PUBLICATIONS

Sheffler (A Portable MPI-Based Parallel Vector Template Library); Research Institute for Advanced Computer Science—NASA Ames Research Center; RIACS Technical Report 95.04, Feb. 1995; 32 pages.*

(Continued)

*Primary Examiner* — Keith Vicary
(74) *Attorney, Agent, or Firm* — Park, Vaughan, Fleming & Dowler LLP; Anthony Jones

(57) ABSTRACT

In the described embodiments, a processor captures a value from an element at a key element position in a second input vector into a base value. The processor then generates a result vector by, if the predicate vector is received, for each element in the result vector to the right of the key element position for which a corresponding element in the predicate vector is active, otherwise, for each element in the result vector to the right of the key element position, setting the element in the result vector equal to a result from an associative Boolean operation or a multiplication operation for which the inputs are the base value and a value in each relevant element of a first input vector from an element at the key element position to and including a predetermined element in the first input vector.

38 Claims, 31 Drawing Sheets

U.S. PATENT DOCUMENTS

| | | |
|---|---|---|
| 7,260,708 B2 | 8/2007 | Hansen |
| 7,301,541 B2 | 11/2007 | Hansen |
| 7,353,367 B2 | 4/2008 | Hansen |
| 7,430,655 B2 | 9/2008 | Hansen |
| 7,464,252 B2 | 12/2008 | Hansen |
| 7,509,366 B2 | 3/2009 | Hansen |
| 7,516,308 B2 | 4/2009 | Hansen |
| 7,653,806 B2 | 1/2010 | Hansen |
| 7,660,972 B2 | 2/2010 | Hansen |
| 7,660,973 B2 | 2/2010 | Hansen |
| 7,730,287 B2 | 6/2010 | Hansen |
| 2009/0089542 A1* | 4/2009 | Laine et al. ............ 712/30 |

OTHER PUBLICATIONS

Young (NRL Connection Machine Fortran Library); Naval Research Laboratory; NRL Memorandum Report 6807; Apr. 16, 1991; 193 pages.*

Chatterjee et al. (Scan Primitives for Vector Computers); In Supercomputing '90: Proceedings of the 1990 Conference on Supercomputing (1990), pp. 666-675.*

Sengupta et al. (Scan Primitives for GPU Computing); In Proceedings of Graphics Hardware (Aug. 2007); 11 pages.*

\* cited by examiner

| | | | | |
|---|---|---|---|---|
| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 6, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

| | x = | 0 | 1 | 2 | 3 | 4 | 5 | 6 | 7 |
|---|---|---|---|---|---|---|---|---|---|
| | A[x] = | 1 | 10 | 16 | 16 | 26 | 29 | 9 | 1 |
| r = A[x+s] | = | 1 | | | | | | | |
| s = A[x+r] | = | | 16 | 16 | 26 | 29 | 9 | | |
| r = A[x+s] | = | | | | | | | 13 | 0 |
| | B[x] = | 1 | 17 | 17 | 27 | 30 | 10 | 22 | 9 |

| | x = | 8 | 9 | 10 | 11 | 12 | 13 | 14 | 15 |
|---|---|---|---|---|---|---|---|---|---|
| | A[x] = | 20 | 0 | 16 | 14 | 20 | 14 | 22 | 13 |
| s = A[x+r] | = | 20 | | | | | | | |
| r = A[x+s] | = | | 17 | | | | | | |
| s = A[x+r] | = | | | 9 | 1 | 17 | 19 | 15 | 30 |
| | B[x] = | 20 | 37 | 26 | 18 | 34 | 36 | 32 | 47 |

FIG. 5

Source Code

```
r = 0;
s = 0;
for (x=0; x<KSIZE; ++x)
{
   if (A[x] < FACTOR)
   {
       r = A[x+s];
   }
   else
   {
       s = A[x+r];
   }
   B[x] = r + s;
}
```

Vectorized Code

```
r = 0;
s = 0;
x = VectorIndex(0,1);
goto Loop1Tail;
Loop1:
   s = PropagatePriorF(s,p0);
   ~p0; t = VectorReadInt(A,x);
   p1 = (t < FACTOR);
   i2 = ConditionalStop(p1,kTF|kFT);
   p2 = 0;
Loop2:
   !p0; p2 = GeneratePredicates(p2,i2);
   ~p2; VectorTest(p1);
   if (!FIRST()) goto Skip1;
   t1 = x + s;
   ~p2; r = VectorReadInt(A,t1);
   goto Skip2;
Skip1:
   r = PropagatePriorF(r,p2);
   t2 = x + r;
   ~p2; s = VectorReadInt(A,t2);
   s = PropagatePostT(s,s,p2);
Skip2:
   if (!CARRY()) goto Loop2;
   v = r + s;
   ~p0; VectorWriteInt(B,x,v);
   x += VECLEN;
Loop1Tail:
   p0 = (x < KSIZE);
   if (FIRST()) goto Loop1;
```

FIG. 6

Example 2A
Vectorized
(Non-Speculative)

```
j = 0;
x = VectorIndex(0,1);
goto Loop1Tail;
Loop1:
  p3 = 0;
  j = PropagatePriorF(j,p0);
  ~p0; t = VectorReadInt(A,x);
  p1 = t < FACTOR;
  p2 = ConditionalStop(p1, kTT|kTF);
Loop2:
  t = x + j;
  !p0; p3 = GeneratePredicates(p3,p2);
  ~p3; VectorTest(p1);
  if(NONE()) goto Loop2Tail;
  !p3; p4 = p1 + 0;
  ~p4; j = VectorRead(A,t);
  j = PropagatePostT(j,j,p4);
Loop2Tail:
  if(!CARRY()) goto Loop2
  ~p0; VectorWrite(B,x,j);
  x += VECLEN;
Loop1Tail:
  p0 = (x < KSIZE);
  if (FIRST()) goto Loop1;
```

FIG. 7A

Example 2B
Vectorized
(Speculative)

```
          j = 0;
          x = VectorIndex(0,1);
          goto Loop1Tail;
       Loop1:
          p3 = 0;
          j = PropagatePriorF(j,p0);
       Loop2:
          !p0; p5 = Remaining(p3);
          ~p5; t = x + j;
          ~p5; t = VectorReadIntFF(A,t);
          !p5; p5 = LegalElements(p5);
          ~p5; p1 = (t < FACTOR);
          !p5; i2 = ConditionalStop(p1, kTT|kTF);
          !p0; p3 = GeneratePredicates(p3,i2);
          ~p3; VectorTest(p1);
          ~p3; if (NONE()) goto Loop2Tail;
          !p3; p4 = p1 + 0;
          ~p4; j = VectorRead(A,x);
          j = PropagatePostT(j,j,p4);
       Loop2Tail:
          ~p0; VectorTest(p3);
          if(!LAST()) goto Loop2;
          ~p0; VectorWrite(B,x,j);
          x += VECLEN;
       Loop1Tail:
          p0 = (x < KSIZE);
          if (FIRST()) goto Loop1;
```

FIG. 7B

Source Code

```
for (x=0; x<KSIZE; ++x)
{
   r = C[x];
   s = D[x];
   A[x] = A[r] + A[s];
}
```

Vectorized Code

```
   x = VectorIndex(0,1);
   goto Loop1tail;
Loop1:
   ~p0; r = VectorReadInt(C,x);
   ~p0; s = VectorReadInt(D,x);
   i1 = CheckHazardP(r,x,p0);
   i2 = CheckHazardP(s,x,p0);
   i3 = VectorMax(i1,i2);
   p4 = 0;
Loop2:
   ~p0; p4 = GeneratePredicates(p4,i3);
   ~p4; t1 = VectorReadInt(A,r);
   ~p4; t2 = VectorReadInt(A,s);
   ~p4; t3 = t1 + t2;
   ~p4; VectorWriteInt(A,x,t3);
   if(!CARRY()) goto Loop2;
   x += VECLEN;
Loop1tail:
   p0 = (x < KSIZE);
   if (FIRST()) goto Loop1;
```

FIG. 8

Source Code

```
j = 0;
for (x=0; x<KSIZE; ++x)
{
  f = A[x];
  g = B[x];
  if (f < FACTOR)
  {
     h = C[x];
     j = E[h];
  }
  if (g < FACTOR)
  {
     i = D[x];
     E[i] = j;
  }
}
```

Vectorized Code

```
   x = VectorIndex(0,1);
   goto Loop1Tail;
Loop1:
   j = PropagatePriorF(j,p0);
   ~p0; f = VectorReadInt(A,x);
   ~p0; g = VectorReadInt(B,x);
   !p0; p1 = (f < FACTOR);
   !p0; p2 = (g < FACTOR);
   ~p1; h = VectorReadInt(C,x);
   ~p2; i = VectorReadInt(D,x);
   !p1; ix = CheckHazardP(h,i,p2);
   p3 = 0;
Loop2:
   p3 = GeneratePredicates(p3,ix);
   !p3; p4 = p1;
   !p3; p5 = p2;
   ~p4; j = VectorReadInt(E,h);
   j = CopyPropagate(j,j,p4);
   ~p5; VectorWriteInt(E,i,j);
   if (!CARRY()) goto Loop2;
   x += VECLEN;
Loop1Tail:
   p0 = (x < KSIZE);
   if (FIRST()) goto Loop1;
```

FIG. 9

Source Code

```
j = 0;
for (x=0; x<KSIZE; ++x)
{
   j = A[x] + A[x+1];
   if (j != last)
      B[x] = j;
   last = j;
   if (E[x] < RANGE)
        continue;
   if (C[x] < FACTOR)
      D[x] = j;
}
```

Vectorized Code

```
q = 0;
last = 0;
x = VectorIndex(0,1);
goto Loop1Tail;
Loop1:
   !p0; t0 = VectorReadInt(A,x);
   !p0; t1 = VectorReadInt(A+4,x);
   j = t0 + t1;
   last = ShiftInRightP(q,j,p0);
   q = j;
   !p0; p = (j != last);
   ~p; VectorWriteInt(B,x,j);
   t0 = VectorReadInt(E,x);
   p = (t0 < RANGE);
   !p0; p1 = Continue(p);
   ~p1; t0 = VectorReadInt(C,x);
    !p1; p = (t0 < FACTOR);
   ~p; VectorWriteInt(D,x,j);
    x += VECLEN;
Loop1Tail:
    p0 = (x < KSIZE);
    if (FIRST()) goto Loop1;
```

FIG. 10

Source Code
```
y = 0;
for (x=0; x<KSIZE; ++x)
{
    B[x] = A[y];
    if (A[x] < FACTOR1)
       ++y;
    if (y >= FACTOR2)
       y = 0;
    C[x] = A[y];
}
```

Vectorized Code
```
    y1 = 0;
    x = VectorIndex(0,1);
    goto Loop1Tail;
Loop1:
    y1 = PropagatePriorF(y2,p0);
    ~p0; t = VectorReadInt(A,x);
    !p0; p1 = (t < FACTOR1);
    p2 = 0;
Loop2:
    !p0; p4 = Remaining(p2);
    ~p4; y1 = IncrPropagate1(y1,p1);
    ~p4; y2 = IncrPropagate2(y1,p1);
    !p4; q2 = (y2 >= FACTOR2);
    ~q2; y2 = 0;

i2 = ConditionalStop(q2,kTF|kTT);
    p2 = GeneratePredicates(p2,i2);
    y1 = PropagatePostT(y1,y2,p2);
    if (!CARRY()) goto Loop2;

~p0; tb = VectorReadInt(A,y1);
    ~p0; tc = VectorReadInt(A,y2);
    ~p0; VectorWriteInt(B,x,tb);
    ~p0; VectorWriteInt(C,x,tc);

x += VECLEN;
Loop1Tail:
    p0 = (x < KSIZE);
    if (FIRST()) goto Loop1;
```

FIG. 11

Source Code

```
x = 0;
for (; x<KSIZE; ++x)
{
    r = 23;
    for (; x<KSIZE; ++x)
    {
        if (A[x] < FACTOR)
            r = A[x];
        if (B[x] < FACTOR)
            break;
        if (C[x] < FACTOR)
            r = C[x];
        if (D[x] < FACTOR)
            break;
        if (E[x] < FACTOR)
            r = E[x];
        if (F[x] < FACTOR)
            break;
    }
    if (x < KSIZE)
    {
        G[x] = r;
    }
}
```

FIG. 12

Vectorized Code

```
                    xint = 0;
                    goto Loop1Tail;
            Loop1:
                    r = 23;
                    x = VectorIndex(xint,1);
                    goto Loop2Tail;
            Loop2:
                    r = PropagatePriorF(r,p0);

~p0; t = VectorReadInt(A,x);
                    !p0; p1 = (t < FACTOR);
                    ~p1; r = t;
                    ~p0; t = VectorReadInt(B,x);
                    !p0; p2 = (t < FACTOR);
                    !p0; q3 = PreBreak(p2);
                    !p0; p3 = Break(p2);

~p3; t = VectorReadInt(C,x);
                    !p3; p4 = (t < FACTOR);
                    ~p4; r = t;
                    ~p3; t = VectorReadInt(D,x);
                    !p3; p5 = (t < FACTOR);
                    !q3; q6 = PreBreak(p5);
                    !p3; p6 = Break(p5);

~p6; t = VectorReadInt(E,x);
                    !p6; p7 = (t < FACTOR);
                    ~p7; r = t;
                    ~p6; t = VectorReadInt(F,x);
                    !p6; p8 = (t < FACTOR);
                    !q6; q9 = PreBreak(p8);
                    !p6; p9 = Break(p8);

p = p1 | p4;
                    !q9; p |= p7;
                    r = CopyPropagate(r,r,p);

!p0; VectorTest(p9);
                    if (!LAST()) goto Loop2B;
                    VectorTest(p0);
                    if (!LAST()) goto Loop2Exit;
                    x += VECLEN;
```

Vectorized Code        (CONTINUED FROM FIG. 13A)

```
Loop2Tail:
    pz = (x >= KSIZE);
    p0 = Break(pz);
    if (FIRST()) goto Loop2;
Loop2Exit:
    q9 = PreBreak(pz);
Loop2B:
    ~q9; xint = int(x);
    ~q9; rint = int(r);
    if (xint < KSIZE)
    {
        G[xint] = rint;
    }
    ++xint;
Loop1Tail:
    if (xint < KSIZE) goto Loop1;
```

FIG. 13B

Source Code

```
k = 99;
for (x=0; x<KSIZE; ++x)
{
   j = A[D[x]];
   A[C[x]] = j + k;
   k = A[B[x]];
   E[x] = k;
}
```

Vectorized Code

```
r1d = 99;
r1d = r1d;
r3di = int(r3d);
x = VectorIndex(0,1);
goto Loop1Tail;
Loop1:
  ~p0; r1a = VectorRead(D,x);
  ~p0; w2a = VectorRead(C,x);
  ~p0; r3a = VectorRead(B,x);
  i1 = CheckHazardP(r1a,w2a,p0);
  i2 = CheckHazardPx(r3a,w2a,p0);
  ix = CheckHazardPx(w2a,r3a,p0);
  i2 = VectorMax(i2,ix);
  ix = VectorMax(i1,i2);
  p2 = 0;
Loop2:
  !p0; p2 = GeneratePredicates(p2,ix);
  ~p2; r3d = VectorRead(A,r3a);
  r3ds = ShiftInRightP(r3di,r3d,p0);
  ~p2; r1d = VectorRead(A,r1a);
  temp = r1d + r3ds;
  ~p2; VectorWrite32(A,w2a,temp);
  ~p2; r3d = VectorRead(A,r3a);
  ~p0; if (!CARRY()) goto Loop2;
  ~p0; VectorWrite(E,x,r3d);
  ~p0; r3di = r3d;
  x += VECLEN;
Loop1Tail:
  p0 = (x < KSIZE);
  if (FIRST()) goto Loop1;
```

FIG. 15

Source Code

```
for (x=0; x<KSIZE; ++x)
{
  t = A[x];
  B[x] = t;
  if (B[t] < FACTOR)
    break;
  C[x] = B[t];
}
```

Vectorized Code

```
   x = VectorIndex(0,1);
   p1 = 0;
   p1 = ShiftInRightP(1,p1,p0);
   goto Loop1Tail;
Loop1:
   !p0; p4 = Remaining(p4);
   ~p4; t = VectorReadFF(A,x);
   ~p4; p4 = LegalElements(p4);
   ii = CheckHazardPx(t,x,p4);
   ix = CheckHazardPx(x,t,p4);
   ix = VectorMax(ix,ii);
   p2 = 0;
Loop2:
   !p4; p2 = GeneratePredicates(p2,ix);
   ~p2; tt = VectorReadInt(B,t);
   !p2; p1 = (tt < FACTOR);
   p3 = PreBreak(p1);
   !p3; p2 = p2 + 0;
   ~p2; VectorWriteInt(B,x,t);
   ~p2; tt = VectorReadInt(B,t);
   !p2; p1 = (tt < FACTOR);
   !p0; p3 = Break(p1);
   ~p2; if (!LAST()) goto SkipB;
   ~p0; if (!CARRY()) goto Loop2;
   ~p0; VectorTest(p4);
   if(!LAST()) goto Loop1;
SkipB:
   ~p3; VectorWrite(C,x,tt);
   ~p4; VectorTest(p3);
   if (!LAST()) goto SkipB2;
   x += VECLEN;
Loop1Tail:
   p0 = (x < KSIZE);
   p4 = 0;
   if (FIRST(p0)) goto Loop1;
SkipB2:
```

FIG. 16

Source Code

```
v = v2 = 0;
for (x=0; x<KSIZE; ++x)
{
   if (A[x] < FACTOR1)
      v = A[x];
   B[v] = v2;
   if (A[x] > FACTOR2 && A[x] < FACTOR3)
      continue;
   v2 += v;
}
```

Vectorized Code

```
   v = 0;
   v2 = 0;
   x = VectorIndex(0,1);
   goto Loop1Tail;
Loop1:
   v = PropagatePriorF(v,p0);
   v2 = PropagatePriorF(v2,p0);
   ~p0; t1 = VectorReadInt(A,x);
   p1 = (t1 < FACTOR1);
   v = CopyPropagate(v,t1,p1);
   p2 = t1 > FACTOR2;
   !p2; p3 = t1 < FACTOR3;
   !p0; p3 = Continue(p3);
   v2 = RunningSum1P(v2,v,p3);
   ~p0; VectorWriteInt(B,v,v2);
   v2 = RunningSum2P(v2,v,p3);
   x += VECLEN;
Loop1Tail:
   p0 = (x < KSIZE);
   if (FIRST()) goto Loop1
```

FIG. 17

Source Code

```
y = z = 0;
for (x=0; x<LIMIT; ++x)
{
   z = aptr[z];
   t = bptr[z];
   tx = t;
   ty = t / tx;
   while (ty < tx)
   {
      tx = (tx + ty) / 2;
      ty = t / tx;
   }
   if (tx < FACTOR)
   {
      aptr[y++] = tx;
   }
}
```

FIG. 18A

Vectorized Code

```
        y = zd = 0;
        i2 = VectorIndex(0,1);
        x = VectorIndex(0,1);
        goto Loop1Tail;
Loop1:
        za = PropagatePriorF(zd,p0);
        y = PropagatePriorF(y,p0);
        p2 = p3 = 0;
Loop2:
        !p0; p2 = GeneratePredicates(p2,i2);
        ~p2; zd = VectorReadFF32s(A,za);
        za = PropagatePostT(za,zd,p2);
        if (CARRY()) goto SkipLoop3;
Loop3:
        !p0; p2 = GeneratePredicates(p2,i2);
        ~p2; zd = VectorReadIntNF(A,za);
        za = PropagatePostT(za,zd,p2);
        if(ABOVE()) goto Loop3;
SkipLoop3:
        !p0; LegalElements(p0);
        !ps = Remaining(p3);
        ~p4; t = VectorRead32s(B,zd);
        ~p4; tx = t;
        ~p4; ty = t / tx;
        !p4; p7 = 1;
        goto around;
sLoop:
        ~p7; tx += ty;
        ~p7; tx /= 2;
        ~p7; ty = t / tx;
around:
        !p7; p7 = ty < tx;
        if (ANY()) goto sLoop;
        !p4; p1 = tx < FACTOR;
        ~p4; y = IncrPropagate1(y,p1);
        !p4; i3 = CheckHazardP(za,y);
        !p4; p3 = GeneratePredicates(p3,i3);
        !p3; p1 &= p3;
        ~p1; VectorWrite32(A,y,tx);
        y = IncrPropagate2(y,p1);
        !p3; p2 = 1;
        za = PropagatePostT(za,zd,p3);
        ~p0; VectorTest(p3);
        if (!LAST()) goto Loop2;
        x += VECLEN;
Loop1Tail:
        p0 = (x < LIMIT);
        if (FIRST()) goto Loop1;
SkipB:
```

FIG. 18B

Horizontally
Vectorized
```
      x = VectorIndex(0,1);
      goto Loop1Tail;
   Loop1:
      t = VectorReadInt(A,x);
      p9 = 0;
      i9 = VectorIndex(0,1);
   Loop1a:
      p9 = GeneratePredicates(p9,i9);
      ~p9; intq9 = int(t);
      ~p9; intq8 = int(x);
      tt = Vector(intq9);
      xx = Vector(intq8);
      ss = 0;
      y = VectorIndex(0,1);
      goto Loop2Tail;
   Loop2:
      ss = PropagatePriorF(ss,p1);
      a = xx + y;
      !p1; td = VectorReadInt(A,a);
      ss = RunningSum2P(ss,td,p1);
      y += VECLEN;
   Loop2Tail:
      p1 = (y < tt);
      if (FIRST()) goto Loop2;
      q7 = int(ss);
      ~p9; s = q7;
      if (!CARRY()) goto Loop1a;
      ~p0; VectorWriteInt(B,x,s);
      x += VECLEN;
   Loop1Tail:
      p0 = (x < LIMIT);
      if (FIRST()) goto Loop1;
```

FIG. 19A

Vertically
Vectorized

```
     x = VectorIndex(0,1);
     goto Loop1Tail;
Loop1:
     ~p0; t = VectorReadInt(A,x);
     ss = 0;
     y = 0;
     goto Loop2Tail;
Loop2:
     a = x + y;
     ~p1; td = VectorReadInt(A,a);
     ~p1; ss += td;
     y += 1;
Loop2Tail:
     !p0; p1 = (y < t);
     if (ANY()) goto Loop2;
     ~p0; VectorWriteInt(B,x,ss);
     x += VECLEN;
Loop1Tail:
     p0 = (x < LIMIT);
     if (FIRST()) goto Loop1;
```

FIG. 19B

RUNNING-AND, RUNNING-OR, RUNNING-XOR, AND RUNNING-MULTIPLY INSTRUCTIONS FOR PROCESSING VECTORS USING A BASE VALUE FROM A KEY ELEMENT OF AN INPUT VECTOR

RELATED APPLICATIONS

This application hereby claims the benefit of U.S. provisional application No. 61/089,251, entitled "Macroscalar Processor Architecture," by inventor Jeffry E. Gonion, filed 15 Aug. 2008.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; and (7) pending application Ser. No. 12/541,505, entitled "Running-Sum Instructions for Processing Vectors," by inventors Jeffry E. Gonion and Keith E. Diefendorff, filed on 14 Aug. 2009.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; and (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008.

BACKGROUND

1. Field

The described embodiments relate to techniques for improving the performance of computer systems. More specifically, the described embodiments relate to running-AND, running-OR, running-XOR, and running-multiply instructions for processing vectors in program code.

2. Related Art

Recent advances in processor design have led to the development of a number of different processor architectures. For example, processor designers have created superscalar processors that exploit instruction-level parallelism (ILP), multicore processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments provide a processor (e.g., processor 102) for generating a result vector with results from an associative Boolean operation. During operation, the processor receives a first input vector, a second input vector, and a control vector, and optionally receives a predicate vector. The processor then records a value from an element at a key element position in the second input vector into a base value. Next, the processor generates a result vector. When generating the result vector, if the predicate vector is received, for each element in the result vector to the right of the key element position for which a corresponding element in the predicate vector contains a non-zero value, otherwise, for each element in the result vector to the right of the key element position, the processor is configured to set the element in the result vector equal to a result from the associative Boolean operation for which the inputs are the base value and a value in each relevant element of the first input vector from an element at the key element position to and including a predetermined element in the first input vector.

In some embodiments, the associative Boolean operation is one of: (1) an AND operation; (2) an OR operation; or (3) an XOR operation.

In some embodiments, the predetermined element in the first input vector is one of: (1) a first element to the left of the element in the result vector; or (2) the element in the result vector.

In some embodiments, when generating the result vector, the processor is configured to set an element in the result vector at the key element position equal to one of: (1) the base value; or (2) an output of the associative Boolean operation for which the inputs are the base value and a value in the key element position of the first input vector.

In some embodiments, if the predicate vector is received, the key element position is a leftmost element position where both the control vector and the predicate vector contain a non-zero value. Otherwise, the key element position is a leftmost element position where the control vector contains a non-zero value.

In some embodiments, if the predicate vector is received, for each element in the result vector to the left of the key element position for which a corresponding element in the predicate vector contains a non-zero value, otherwise, for each element in the result vector to the left of the key element position in the result vector, when generating the result vector, the processor is configured to set the element in the result vector equal to a value in a corresponding element in the second input vector. In these embodiments, if no key element position exists, if the predicate vector is received, for each element in the result vector for which a corresponding element in the predicate vector contains a non-zero value, otherwise, for each element in the result vector, when generating the result vector, the processor is configured to set each element in the result vector equal to a value in a corresponding element in the second input vector.

In some embodiments, if the predicate vector is received, when generating the result vector, for each element in the result vector, if a corresponding element in the predicate vector contains a zero, the processor is configured to one of: (1) leave the element in the result vector unmodified; or (2) set the element in the result vector to zero.

In some embodiments, if the predicate vector is received, a relevant element in the result vector is an element in the result vector for which the corresponding element in the predicate vector and the corresponding element in the control vector contain non-zero values. Otherwise, a relevant element in the result vector is an element in the result vector for which the corresponding element in the control vector contains a non-zero value.

In some embodiments, when generating the result vector, the processor is configured to process elements in the first input vector, the second input vector, the control vector, and, if the predicate vector is received, the predicate vector in parallel to enable the elements of the result vector to be generated in parallel.

The described embodiments provide a processor (e.g., processor 102) for generating a result vector with multiplied values from a first input vector. During operation, the processor receives the first input vector, a second input vector, and a control vector, and optionally receives a predicate vector. The processor then records a value from an element at a key element position in the second input vector into a base value. Next, the processor generates the result vector. When generating the result vector, if the predicate vector is received, for each element in the result vector to the right of the key element position for which a corresponding element in the predicate vector contains a non-zero value, otherwise, for each element in the result vector to the right of the key element position, the processor configured to set the element in the result vector equal to a product of the base value multiplied by a value in each relevant element of the first input vector, from an element at the key element position to and including a predetermined element in the first input vector.

In some embodiments, when generating the result vector, the processor is configured to set an element in the result vector at the key element position equal to one of: (1) the base value; or (2) a product of the base value multiplied by a value in the key element position in the first input vector.

BRIEF DESCRIPTION OF THE FIGURES

FIG. 5 presents two tables illustrating operation using vectorized code in accordance with the described embodiments.

FIG. 6 presents vectorized program code in accordance with the described embodiments.

FIGS. 7A-7B present exemplary vectorized program code in accordance with the described embodiments.

FIG. 8 presents a vectorized loop from program code with memory aliasing in accordance with the described embodiments.

FIG. 9 presents a vectorized loop from program code with memory aliasing in accordance with the described embodiments.

FIG. 10 presents a vectorized loop from program code with pseudo loop-carried dependencies in accordance with the described embodiments.

FIG. 11 presents a vectorized loop from program code with conditional updates in accordance with the described embodiments.

FIG. 12 presents a section of source code in accordance with the described embodiments.

FIGS. 13A-13B present a vectorized loop from program code with consolidation in accordance with the described embodiments.

FIG. 15 presents a vectorized loop from program code with mutual dependences in accordance with the described embodiments.

FIG. 16 presents a vectorized loop from program code with mutual dependences in accordance with the described embodiments.

FIG. 17 presents a vectorized loop from program code with summation in accordance with the described embodiments.

FIGS. 18A-18B present a vectorized loop from program code with summation in accordance with the described embodiments.

FIGS. 19A-19B present a vectorized loop from program code that has been vectorized both horizontally and vertically in accordance with the described embodiments.

In the figures, like reference numerals refer to the same figure elements.

DETAILED DESCRIPTION

Figure 1:
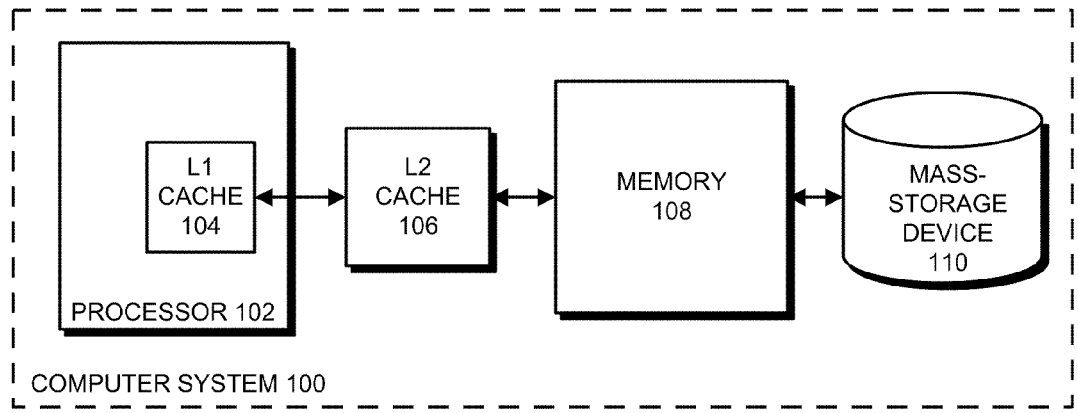
FIG. 1 presents a block diagram of a computer system in accordance with the described embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code herein described are typically stored on a computer-readable storage device, which may be any device or medium that can store code and/or data for use by a computer system (e.g., computer system 100). The computer-readable storage device includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed. Note that non-statutory media such as signals are not included in the computer-readable storage devices in these embodiments.

The methods and processes described in the detailed description section can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

TERMINOLOGY

Throughout the description, we use the following terminology. These terms may be generally known in the art, but are described below to clarify the subsequent descriptions.

The term "cycle" as used in this description refers to a quantum of time in which an operation happens. Although a cycle can be exactly one clock cycle, in some embodiments one "cycle" includes two or more clock cycles. Moreover, although one operation may be performed during a given cycle, that operation may include any number of sub-operations. For example, when referring to a vector execution unit performing an operation "in a cycle," this means that sufficient time has passed to enable the execution unit to have completed the described operation.

The term "vector-length agnostic" as used in this description indicates that an operation (i.e., instruction, etc.) can be executed using vectors of any length, up to the limitations imposed by the supporting hardware. For example, assuming that the vector execution hardware supports 256-bit vectors that can include eight separate four-byte words, a vector-length agnostic operation can operate on any number of the eight words in the vector.

The term "active element," as used in this description to refer to one or more elements of a vector, indicates elements that are operated on during a given operation. Generally, the described embodiments enable a vector execution unit to selectively perform parallel operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" (described in detail below) can include "active" elements that are used to determine which elements in the operand vector to perform operations on. In some embodiments, non-zero elements are active elements.

The terms "true indicator" and "false indicator" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units). Processor 102's vector execution unit is described in detail below.

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses.

Computer system 100 can be incorporated into many different types of electronic devices. For example, computer system 100 can be part of a desktop computer, a laptop computer, a server, a media player, an appliance, a cellular phone, a piece of testing equipment, a network appliance, a personal digital assistant (PDA), a hybrid device (i.e., a "smart phone") or another electronic device.

Although we use specific components to describe computer system 100, in alternative embodiments different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
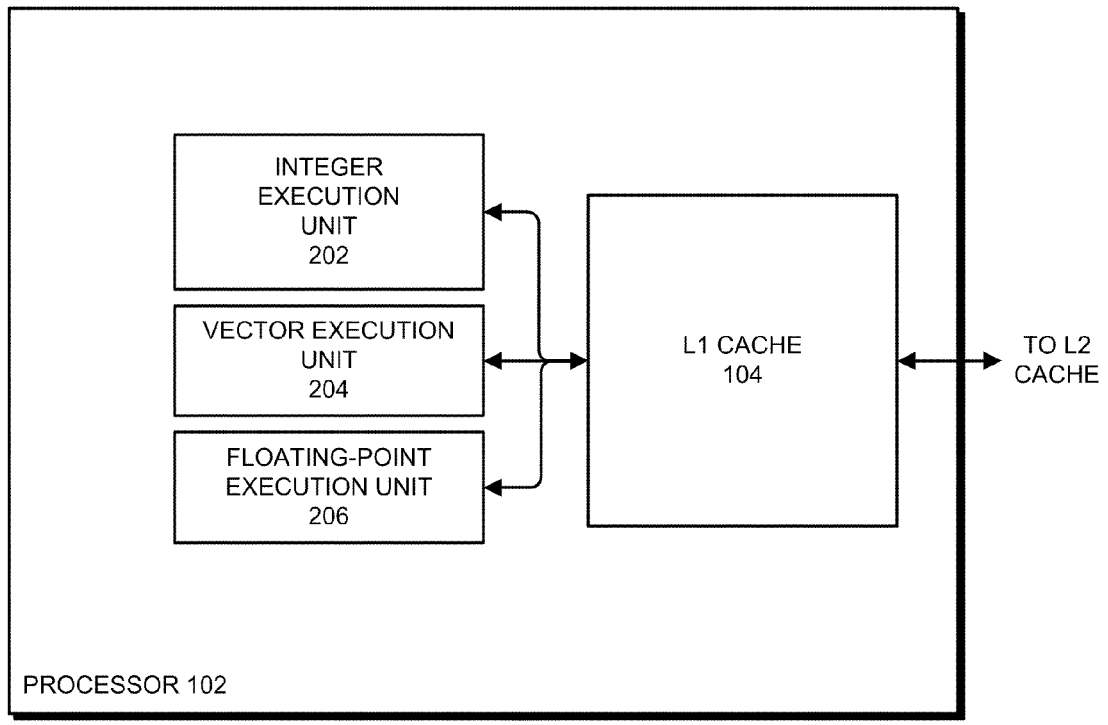
FIG. 2 presents an expanded view of a processor in accordance with the described embodiments.

FIG. 2 presents an expanded view of processor 102 in accordance with the described embodiments. As is shown in FIG. 2, processor 102 includes L1 cache 104, integer execution unit 202, floating-point execution unit 206, and vector execution unit 204 (integer execution unit 202, floating-point execution unit 206, and vector execution unit 204 as a group are interchangeably referred to as "the execution units"). Each of the execution units is used for performing computational operations, such as logical operations, mathematical operations, or bitwise operations for an associated type of operand. More specifically, integer execution unit 202 is used for performing computational operations that involve integer operands, floating-point execution unit 206 is used for performing computational operations that involve floating-point operands, and vector execution unit 204 is used for performing computational operations that involve vector operands. Integer execution units and floating-point execution units are generally known in the art and are not described in more detail.

Figure 3:
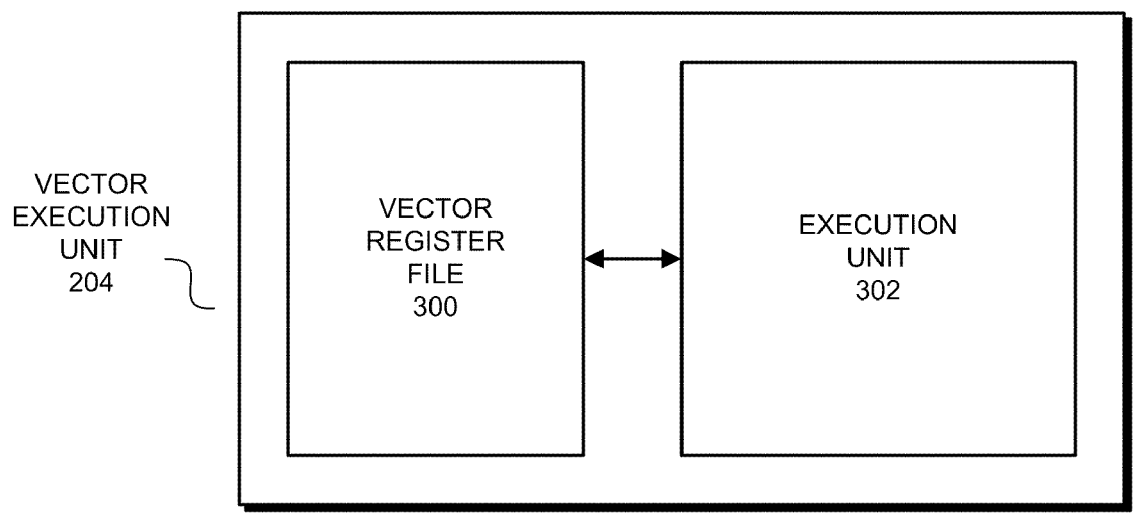
FIG. 3 presents an expanded view of a vector execution unit in accordance with the described embodiments.

In the described embodiments, vector execution unit 204 is a single-instruction-multiple-data (SIMD) execution unit that performs operations in parallel on some or all of the data elements that are included in vectors of operands. FIG. 3 presents an expanded view of vector execution unit 204 in accordance with the described embodiments. As is shown in FIG. 3, vector execution unit 204 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Execution unit 302 retrieves operands from registers in vector register file 300 and executes vector instructions that cause execution unit 302 to perform operations in parallel on some or all of the data elements in the operand vector. For example, execution unit 302 can perform logical operations, mathematical operations, or bitwise operations on the elements in the vector. Execution unit 302 can perform one vector operation per cycle (although, as described above, the "cycle" may include more than one cycle of a clock used to trigger, synchronize, and/or control execution unit 302's computational operations).

In the described embodiments, execution unit 302 supports vectors that hold N data elements (e.g., bytes, words, doublewords, etc.). In these embodiments, execution unit 302 can perform operations on Nor fewer of the data elements in an operand vector in parallel. For example, assuming an embodiment where the vector is 256 bits in length, the data elements being operated on are four-byte words, and the operation is adding a value to the data elements, these embodiments can add the value to any number of the words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Although we describe processor 102 as including a particular set of execution units, in alternative embodiments, processor 102 can include different numbers or types of execution units. Moreover, although the embodiment shown in FIG. 2 is limited to a particular set of functional blocks, in the described embodiments processor 102 can include other functional blocks, such as an instruction fetch unit, an instruction decode unit, a branch unit, a memory management unit, I/O interfaces, etc. coupled to the execution units. The additional functional blocks that can be present in processor 102 are well-known in the art and are not described in more detail.

Macroscalar Architecture

The described embodiments provide an instruction set and supporting hardware that allow compilers to generate program code for loops without having to completely determine parallelism at compile-time, and without discarding useful static analysis information. Specifically, these embodiments provide a set of instructions that do not mandate parallelism for loops but, instead, enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

As described, these embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions.

Figure 4:
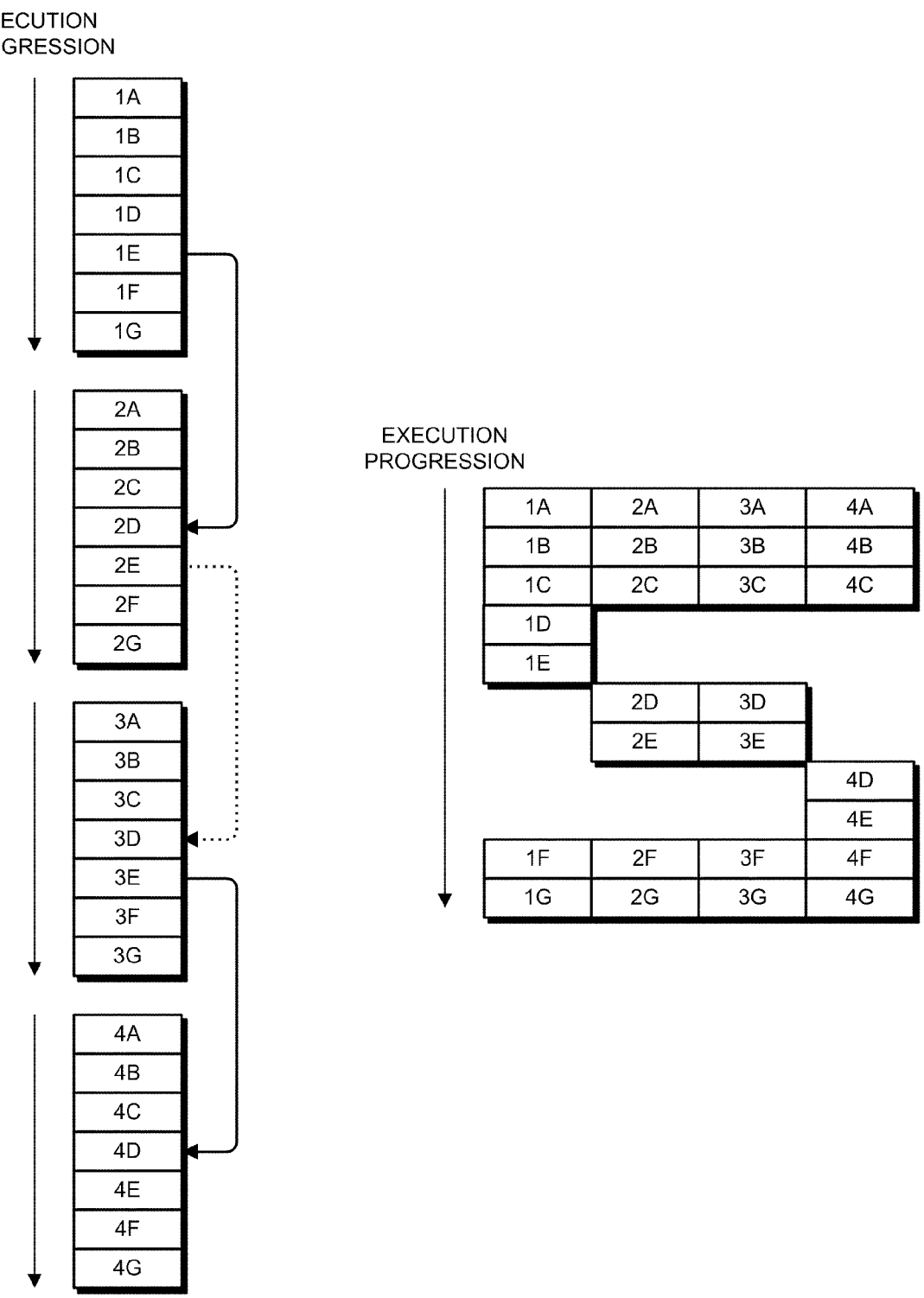
FIG. 4 presents an example of the parallelization of a loop in program code in accordance with the described embodiments.

FIG. 4 presents an example of the parallelization of a loop in program code in accordance with the described embodiments. On the left side of FIG. 4 is shown an execution pattern for four iterations of a loop that have not been parallelized, where each loop includes instructions A-G. On the right side of FIG. 4 is shown a parallelized version of the loop in accordance with the described embodiments. In this example, we assume that each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). Note that in alternative embodiments the instructions within a given iteration can be parallelizable.

As shown by the arrows between the iterations of the loop in FIG. 4, there is a possibility of a runtime data dependency between instruction E in a given iteration and instruction D of the subsequent iteration. However, during compilation, the compiler can only determine that the possibility of data dependency exists between these instructions. The compiler cannot tell in which iterations dependencies actually materialize, because this information is only available at runtime. In this example, a data dependency that actually materializes at runtime is shown by the solid arrows in FIG. 4, while a data dependency that doesn't materialize at runtime is shown using a dashed arrow. Thus, as shown in FIG. 4, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of any other iteration, instruction B can also execute in parallel with instruction B of any other iteration, and so forth.

The right side of FIG. 4 shows a version of the loop that has been parallelized in accordance with the observations above. The example shows how the iterations of such a loop can be executed to accommodate both the static and runtime data dependencies, while achieving maximum parallelism. For instructions A-C, all four iterations can be executed in parallel. Then instructions D and E can be executed with the maximum amount of parallelism allowed by the runtime data dependencies. Specifically, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel. Finally, for instructions F-G, all four iterations can be executed in parallel.

EXAMPLES OF THE EMBODIMENTS

In the following section, we present a series of examples in describing the embodiments. These examples introduce Macroscalar operations and demonstrate their use in vectorizing loops in accordance with the described embodiments. For ease of understanding, these examples are presented using C++-formatted pseudocode.

The instructions and operations presented in this description are intended to aid in understanding the described embodiments. However, in alternative embodiments, an instruction or operation can be implemented in a different way, for example, using a microcode sequence of more primitive operations or using a different sequence of sub-operations. Note that further decomposition of instructions is avoided so that information about the macro-operation and the corresponding usage model is not obscured. Note also that additional definitions for each instruction may be provided in the "Macroscalar Instructions" section in this description.

Notation

In describing the examples, we use the following formats for variables, which are vector quantities unless otherwise noted:

p5=a<b;
   Elements of vector p5 are set to 0 or 1 depending on the result of testing a<b. Note that vector p5 can be a "predicate vector," as described in detail below. Some instructions that generate predicate vectors also set processor status flags to reflect the resulting predicates. For example, the processor status flags can include the FIRST, LAST, NONE, and/or ALL flags.

~p5; a=b+c;
   Only elements in vector a designated by active (i.e., non-zero) elements in the predicate vector p5 receive the result of b+c. The remaining elements of a are unchanged. This operation is called "predication," and is denoted using the tilde ("~") sign before the predicate vector.

!p5; a=b+c;
   Only elements in vector a designated by active (i.e., non-zero) elements in the predicate vector p5 receive the result of b+c. The remaining elements of a are set to zero. This operation is called "zeroing," and is denoted using the exclamation point ("!") sign before the predicate vector.

if (FIRST( )) goto . . . ; Also LAST( ), ANY( ), ALL( ), CARRY( ), ABOVE( ), or NONE( ), (where ANY( )==!NONE( ))
   These instructions test the processor status flags and branch accordingly.

x+=VECLEN;
   VECLEN is a machine value that communicates the number of elements per vector. The value is determined at runtime by the processor executing the code, rather than being determined by the assembler.

// Comment
   In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed in this paper are vectors of integers, but alternative embodiments support other data formats.

Structural Loop-Carried Dependencies

Example 1 presents an example loop in program code that is "non-vectorizable" using conventional vector architectures. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A[x]<FACTOR) is known to be always true or always false. These assumptions change when the condition is allowed to vary during execution (the common case). For simplicity in this example, we presume that no aliasing exists between A[ ] and B[ ]. Note that aliasing is addressed in later sections.

EXAMPLE 1

Program Code Loop

```
r = 0;
s = 0;
for (x=0; x<KSIZE; ++x)
{
    if (A[x] < FACTOR)
    {
        r = A[x+s];
    }
    else
    {
        s = A[x+r];
    }
    B[x] = r + s;
}
```

In the described embodiments, the loop in Example 1 can be vectorized by partitioning the vector into segments for which the conditional (A[x]<FACTOR) does not change. Exemplary processes for partitioning such vectors, as well as exemplary instructions that enable the partitioning, are presented below. Note that for this example the described partitioning need only be applied to instructions within the conditional clause. The first read of A[x] and the final operation B[x]=r+s can always be executed in parallel across a full vector, except potentially on the final loop iteration.

We now present instructions and exemplary vectorized code in order to explain the described embodiments. The following description is generally organized so that a number of instructions are described and then one or more vectorized code samples that use the instructions are presented. In some cases, a particular type of vectorization issue is explored in a given example.

dest=VectorReadInt(base, offset)
   VectorReadInt is an instruction for performing a memory read operation. A vector of offsets, offset, scaled by the data size (integer in this case) is added to a scalar base address, base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(base, offset, value)
   VectorWriteInt is an instruction for performing a memory write operation. A vector of offsets, offset, scaled by the data size (integer in this case) is added to a scalar base address, base, to form a vector of memory addresses. A vector of values, value, is written to these memory addresses. If this instruction is predicated or zeroed, data is written only to active addresses. In the described embodiments, writes to illegal addresses always generate faults.

dest=VectorIndex(start, increment)
   VectorIndex is an instruction for generating vectors of values that monotonically adjust by the increment from a scalar starting value specified by start. This instruction can be used for initializing loop index variables when the index adjustment is constant. When predication or zeroing is applied, the first active element receives the starting value, and the increment is only applied to subsequent active elements. For example:
   x=VectorIndex(0, 1); //x={0 1 2 3 4 5 6 7} dest=PropagatePostT(dest, src, pred)
   The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

| Entry: | dest | = { 8 | 9 | A | B | C | D | E | F } |
|---|---|---|---|---|---|---|---|---|---|
|  | src | = { 1 | 2 | 3 | 4 | 5 | 6 | 7 | 8 } |
|  | pred | = { 0 | 0 | 1 | 1 | 0 | 0 | 1 | 0 } |
| Exit: | dest | = { 8 | 9 | A | B | 4 | 4 | E | 7 } | dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

| Entry: | src | = { 1 | 2 | 3 | 4 | 5 | 6 | 7 | 8 } |
|---|---|---|---|---|---|---|---|---|---|
|  | pred | = { 1 | 0 | 1 | 1 | 0 | 0 | 1 | 0 } |
| Exit: | dest | = { 8 | 2 | 2 | 2 | 5 | 6 | 6 | 8 } | dest=ConditionalStop(pred, deps)

The Conditional Stop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1. In this loop, transitions between true and false iterations of the conditional clause represent a loop-carried dependency that requires a break in parallelism. This can be handled using the following instructions:

```
p1 = (t < FACTOR); // p1 = { 0 0 0 0 1 1 0 0 }
p2 = ConditionalStop(p1, kTF|kFT); // p2 = { 0 0 0 0 4 0 6 0 }
```

Because the 4th iteration generates the required data, and the 5th iteration depends on it, a 4 is stored in position 5 of the output vector p2 (interchangeably called the "dependency index vector" or "DIV"). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(pred, DIV)

GeneratePredicates takes the dependency index vector, DIV, and generates predicates corresponding to the next group of elements that may safely be processed in parallel, given the previous group that was processed, indicated by pred. If no elements of pred are active, predicates are generated for the first group of elements that may safely be processed in parallel. If pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

```
Entry Conditions: // i2 = { 0 0 0 0 4 0 6 0 }
p2 = 0; // p2 = { 0 0 0 0 0 0 0 0 }
Loop2:
    p2 = GeneratePredicates(p2,i2); // p2' = { 1 1 1 1 0 0 0 0 } CF = 0, ZF = 0
    if(!CARRY( )) goto Loop2// p2" = { 0 0 0 0 1 1 0 0 } CF = 0, ZF = 0
                            // p2'" = { 0 0 0 0 0 0 1 1 } CF = 1, ZF = 0
```

From an initialized predicate p2 of all zeros, GeneratePredicates generates new instances of p2 that partition subsequent vector calculations into three sub-vectors (i.e., p', p", and p'"). This enables the hardware to process the vector in groups that avoid violating the data dependencies of the loop.

FIG. 5 presents two tables illustrating operation using vectorized code in accordance with the described embodiments. The top of FIG. 5 presents a table illustrating a sequence of states through which scalar execution of the loop in Example 1 might progress using a randomized 50/50 distribution of the direction of the conditional expression. The bottom of FIG. 5 presents a table illustrating a progression of execution for Macroscalar vectorized program code in accordance with the described embodiments. In FIG. 5, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in the lower portion of FIG. 5. Note that the example uses vectors eight elements in length. When processing the first vector instruction, the first iteration is performed alone (i.e., execution unit 302 processes only the first vector element), whereas iterations 1-5 are processed in parallel by execution unit 302, and then iterations 6-7 are processed in parallel by execution unit 302.

FIG. 6 presents exemplary vectorized program code in accordance with the described embodiments. In FIG. 6, the top portion contains the original source code, while the bottom portion contains vectorized code representing the operations that may be performed by the described embodiments. In the vectorized code, Loop1 is the loop from the source code, while Loop2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable s is updated, the PropagatePostT instruction propagates the final value in the active partition to subsequent elements in the vector. At the top of the loop, the PropagatePriorF instruction copies the last value of s from the final vector position across all elements of the vector in preparation for the next pass. Note that variable r is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. This is not always the case. Consider the following two loops:

EXAMPLE 2A

Program Code Loop

```
j = 0;
for (x=0; x<KSIZE; ++x)
{
    if (A[x] < FACTOR)
    {
        j = A[x+j];
    }
    B[x] = j;
}
```

EXAMPLE 2B

Program Code Loop

```
j = 0;
for (x=0; x<KSIZE; ++x)
{
    if (A[x+j] < FACTOR)
    {
        j = A[x];
    }
    B[x] = j;
}
```

In Example 2A, the control-flow decision is independent of the loop-carried dependency chain, while in Example 2B the control flow decision is part of the loop-carried dependency chain. In some embodiments, the loop in Example 2B leads the described embodiments to speculate that the value of j remains unchanged and compensate later if this prediction proves incorrect. In these embodiments, the speculation on the value of j does not significantly change the vectorization of the loop.

In some embodiments, the compiler can be configured to always predict no data dependencies between the iterations of the loop. In these embodiments, in the case that runtime data dependencies exist, the group of active elements processed in parallel can be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(base, offset)

VectorReadIntFF is a first-faulting variant of VectorReadInt. This instruction does not generate a fault if at least the first active element is a valid address. Unmapped or illegal addresses after the first active element are nothing in the fault status register. If the first active element of the address is unmapped, this instruction faults to allow a virtual memory (VM) system in computer system 100 (not shown) to populate the page ensuring forward progress. Fault handling is described in more detail below.

dest=Remaining(pred)

The Remaining instruction evaluates a vector of predicates, pred, and calculates the remaining elements in the vector. This corresponds to the set of inactive predicates following the last active predicate. If there are no active elements in pred, a vector of all active predicates is returned. Likewise, if pred is a vector of all active predicates, a vector of inactive predicates is returned. For example:

| Entry: | pred | = { 0 0 1 0 1 0 0 0 } |
|---|---|---|
| Exit: | dest | = { 0 0 0 0 0 1 1 1 } |

FIGS. 7A-7B present exemplary vectorized code in accordance with the described embodiments. The code sample shown in FIG. 7A is a vectorized version of the code in Example 2A (as presented above). The code sample shown in FIG. 7B is a vectorized version of the code in Example 2B. In the vectorized code in FIG. 7B, the read of A[ ] and subsequent comparison have been moved inside the vector-partitioning loop. Thus, these operations presume (speculate) that the value of j does not change. Only after using j is it possible to determine where j may change value. After j is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

The described embodiments include fault-tolerant read support. Thus, in these embodiments, processor 102 can speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments are configured to continue normal execution in the presence of invalid but irrelevant data mistakenly read from memory. (Note that in embodiments that support virtual memory, this has the additional benefit of not paging until the need to do so is certain.)

In the loop shown in FIGS. 7A-7B, there exists a loop-carried dependency between iterations where the condition is true, and subsequent iterations, regardless of the predicate value for the later iterations. This is reflected in the parameters of the ConditionalStop instruction.

The sample code in FIGS. 7A-7B highlights the differences between non-speculative and speculative vector partitioning. In Example 2A, memory is read and the predicate is calculated prior to the ConditionalStop. The partitioning loop begins after the ConditionalStop instruction. In Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

Memory-Based Loop-Carried Dependencies

The examples presented thus far presume the compiler was able to establish that no address aliasing existed at the time of compilation. Such determinations are often very difficult or impossible to make. The next example shows how loop-carried dependencies occurring through memory (which may include aliasing) are dealt with in the described embodiments (i.e., in the Macroscalar architecture). Consider the following loop:

EXAMPLE 3

Program Code Loop

```
for (x=0; x<KSIZE; ++x)
{
    r = C[x];
    s = D[x];
    A[x] = A[r] + A[s];
}
```

In Example 3, the compiler cannot determine at compile-time whether A[x] aliases with A[r] or A[s]. However, in the described embodiments, the compiler inserts instructions that cause the hardware to check for memory hazards at runtime and partitions the vector accordingly at runtime to ensure correct program behavior.

dest=CheckHazardP(first, second, pred)

CheckHazardP examines two vectors of memory addresses (or indices) corresponding to two memory operations for potential data dependencies through memory. The vector first holds addresses for the first memory operation, and vector second holds addresses for the second operation. The predicate pred indicates which elements of second are to be operated upon. As scalar loop iterations proceed forward in time, vector elements representing sequential iterations appear left to right within vectors. CheckHazardP evaluates hazards in this context. The instruction calculates a DIV representing memory hazards between the corresponding pair of first and second memory operations. The instruction correctly evaluates write-after-read, read-after-write, and write-after-write memory hazards.

As with the ConditionalStop instruction, the element position corresponding to the iteration that generates the data that is depended upon is stored in the destination vector at the element position corresponding to the iteration that is dependent upon the data. If no data dependency exists, a zero is stored in the destination vector at the element position corresponding to the iteration that does not have the dependency. For example:

| Entry: | first | = { 2 3 4 5 6 7 8 9 } |
| | second | = { 8 7 6 5 4 3 2 1 } |
| | pred | = { 1 1 1 1 1 1 1 1 } |
| Exit: | dest | = { 0 0 0 0 3 2 1 0 } |

Here, element 5 of the first vector ("first") and element 3 of the second vector ("second") both access array index 6. Therefore, a 3 is stored in position 5 of DIV. Likewise, element 6 of first and element 2 of second both access array index position 7, causing a 2 to be stored in position 6 of DIV, and so forth. A zero is stored in DIV where no data dependencies exist.

In some embodiments, the CheckHazardP instruction is configured to account for various sizes of data types. However, for clarity we describe the function of the instruction using only array index types.

The example above has three memory hazards. However, in the described embodiments, only two partitions are needed to safely process the associated memory operations. Close inspection reveals that handling the first hazard on element position 3 renders subsequent dependencies on lower or equally numbered element positions moot. For example:

| Entry Conditions: | // DIV = { 0 0 0 0 3 2 1 0 } |
| | // p2 = { 0 0 0 0 0 0 0 0 } |
| p2 = GeneratePredicates(p2,DIV); // p2 = { 1 1 1 1 0 0 0 0 } |
| p2 = GeneratePredicates(p2,DIV); // p2 = { 0 0 0 0 1 1 1 1 } |

The process used by the described embodiments to analyze a DIV to determine where a vector should be broken is shown in pseudocode below. In some embodiments, processor 102 performs this calculation in parallel. For example:

```
List = <empty>;
for (x=STARTPOS; x<VECLEN; ++x)
    if (DIV[x] in List)
        Break from loop;
    else if (DIV[x] > 0)
        Append <x> to List;
```

The vector may safely be processed in parallel over the interval [STARTPOS, x), where x is the position where DIV[x]>0, that is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIV's can be combined and used in a single partitioning loop. Either approach yields correct results, but the optimal approach depends on the characteristics of the loop in question. More specifically, where multiple DIVs are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs can be combined using a VectorMax (A, B) instruction:

```
i2 = CheckHazardP(a,c,p0);   // i2 = { 0 0 2 0 2 4 0 0 }
i3 = CheckHazardP(b,c,p0);   // i3 = { 0 0 1 3 3 0 0 0 }
ix = VectorMax(i2,i3);       // ix = { 0 0 2 3 3 4 0 0 }
```

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 8 presents a vectorized loop from program code with memory aliasing in accordance with the described embodiments. In this example no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists within A[ ], the partitions retain full vector size, and the partitioning loop simply falls through without iterating. However, for iterations where aliasing does occur, the partitioning loop partitions the vector to respect the data dependencies, thereby ensuring correct operation.

In the example presented in FIG. 8, the hazard check is performed across the entire vector of addresses. In the general case, however, it is often necessary to check hazards between conditionally executed memory operations. The CheckHazardP instruction takes a predicate that indicates which elements of the second memory operation are active. If not all elements of the first operation are active, this CheckHazardP instruction itself can be predicated with a zeroing predicate corresponding to those elements of the first operand which are active. (Note that this yields correct results for cases where the first memory operation is predicated.)

FIG. 9 presents a vectorized loop from program code with memory aliasing in accordance with the described embodiments. As shown in FIG. 9, the top portion is a loop with a memory hazard on array E[ ]. The code conditionally reads and writes to unpredictable locations within the array. The vectorized Macroscalar code for this loop is shown in the bottom portion in accordance with the described embodiments.

In the vectorized loop, p1 and p2 are predicates indicating whether array E[ ] is to be read or written, respectively. The CheckHazardP instruction checks vectors of addresses (h and i) for memory hazards. The parameter p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV (ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

Pseudo Loop-Carried Dependencies

The described embodiments can encounter pseudo loop-carried dependencies. In these embodiments, not all references to values calculated during a previous iteration are actual loop-carried dependencies. A common example is when a calculated value is compared to its value from the previous iteration. Such dependencies are merely overlapping dependencies and, hence, do not form a loop-carried dependency chain. The following loop is used as an example:

EXAMPLE 4

Program Code Loop

```
j = 0;
for (x=0; x<KSIZE; ++x)
{
    j = A[x] + A[x+1];
    if (j != last)
    {
        B[x] = j;
    }
    last = j;
    if (E[x] < RANGE)
        continue;
    if (C[x] < FACTOR)
    {
        D[x] = j;
    }
}
``` dest=ShiftInRightP(in, vect, pred)

The ShiftInRightP instruction takes the scalar value in and places in in the leftmost position of vector vect, shifting elements of vect to the right to make room. Shifted elements are propagated across elements that have a zero-predicate in the parameter. The shifted vector is then stored to the destination register. For example:

```
Entry:  in    = 9
        vect  = {1  2  3  4  5  6  7  8}
        pred  = {0  1  1  1  0  1  1  1}
Exit:   dest  = {9  9  2  3  4  4  6  7}
``` dest=Continue(pred)

The Continue instruction evaluates the predicate pred, and returns the logical negation of each active element. In the described embodiments, this instruction can be used to handle C-language "continue" statements. In the described embodiments, the Continue instruction performs a similar operation to the logical "not" operation. For example:

```
Entry:  pred  = {0  0  1  0  0  1  0  0}
Exit:   dest  = {1  1  0  1  1  0  1  1}
```

FIG. 10 presents a vectorized loop from program code with pseudo loop-carried dependencies in accordance with the described embodiments. As shown in FIG. 10, the vector last represents a vector of last values of j. The vector last is calculated by shifting the vector j to the right one position.

The last value of j from the previous pass is kept in the scalar q and is shifted into the earliest position of last. Likewise, the ultimate value of j from the current pass is copied into the scalar q for the next pass by the "q=j" operation.

To process the "continue" statement in this loop, the predicate p1 is calculated to constrain the elements for the remainder of the loop. This is predicated on p0 so that elements previously inactive remain inactive.

Conditional Updates

The described embodiments can encounter loop-carried dependencies that occur as the result of conditionally updating variables in loops. For example, incrementing a variable in every iteration is not considered a loop-carried dependency because the variable is a priori computable by a compiler. However, if the increment occurs conditionally, then a loop-carried dependency can be created.

EXAMPLE 5

Program Code Loop

```
y = 0;
for (x=0; x<KSIZE; ++x)
{
    B[x] = A[y];
    if (A[x] < FACTOR1)
        ++y;
    if (y >= FACTOR2)
        y = 0;
    C[x] = A[y];
}
```

Note that in Example 5, the variable y is used before being updated. This is a common occurrence, but this case presents another obstacle to vectorization: a vector y must be calculated to determine the values of y before y was calculated. This loop also uses y after y is updated.

This example conditionally updates the variable y either by incrementing y or resetting y to zero. Although y is a loop-carried dependency because y is conditionally updated, note that there are two situations where its value is predictable, thereby allowing parallelism: iterations where y is incremented but not reset, and iterations where y remains unchanged.

dest=IncrPropagate1(value, pred)

This instruction returns a vector corresponding to the values of a variable before the variable is incremented. Only the first active element of value is referenced in this calculation. The parameter pred designates the active elements. The post-increment value is propagated across inactive elements. For example:

| Entry: | value | = | {2 | 4 | 2 | 4 | 2 | 4 | 2 | 4} |
|---|---|---|---|---|---|---|---|---|---|---|
|  | pred | = | {0 | 1 | 1 | 1 | 0 | 0 | 1 | 1} |
| Exit: | dest | = | {2 | 4 | 5 | 6 | 7 | 7 | 7 | 8} |

As shown, the first element of the vector remains unchanged because the first value is inactive. The second element remains unchanged because the second element's value before the second element is incremented is unchanged. The first active element in value (the second element in this example) serves as the basis for calculating the remaining active elements.

dest=IncrPropagate2(value, pred)

This instruction returns a vector corresponding to the value of a variable after the variable is incremented. Only the first active element of value is referenced in this calculation. The parameter pred designates which elements are active. The post-increment value is propagated across inactive elements. For example:

| Entry: | value | = | {2 | 4 | 2 | 4 | 2 | 4 | 2 | 4} |
|---|---|---|---|---|---|---|---|---|---|---|
|  | pred | = | {0 | 1 | 1 | 1 | 0 | 0 | 1 | 1} |
| Exit: | dest | = | {2 | 5 | 6 | 7 | 7 | 7 | 8 | 9} | dest=DecrPropagate1(value, perd)

dest=DecrPropagate2(value, perd)

These instructions are the decrementing variants of IncrPropagate1 and IncrPropagate2, respectively. As described above, these instructions return a vector corresponding to the value of a variable before and after the variable is decremented, respectively. Only the first active element of value is referenced in this calculation. The parameter pred designates which elements are active. The post-decrement value is propagated across inactive elements.

FIG. 11 presents a vectorized loop from program code with conditional updates in accordance with the described embodiments. As shown in FIG. 11, the comparison with FACTOR1 determines whether the variable y is incremented, and the comparison with FACTOR2 determines if y is to be reset. In the vectorized code, speculative partitioning is used, speculating that variable y is not to be reset. In some embodiments, speculative partitioning always speculates in the direction that allows the most parallelism.

In the outer loop, Loop1, vector p2 is initially cleared in preparation for the GeneratePredicates instruction in Loop2. Because speculative partitioning is being used, however, any remaining elements should be determined before GeneratePredicates executes. The Remaining instruction determines the number of elements remaining to be processed. GeneratePredicates may reduce this further based on the determination of dependencies that were not available earlier.

Consolidation

It is common for variables calculated within loops to be used after the loop terminates. In the described embodiments, because the loops being vectorized are initially scalar, some vectors may need to be re-cast as scalars for subsequent use. We call this process "consolidation." These embodiments account for the case where a loop terminates prematurely and the most recent value written to a register may not be its final value. In this case, the final scalar value of a variable may be from an earlier write that alters an element corresponding to a later iteration. For example, in Example 6 below the final scalar value for the variable r is 15. This is easily determinable because the calculations are unconditional.

EXAMPLE 6

Program Code Loop

```
for (x=0; x<10; ++x)
{
    r = x * 3;
    if (x == 5)
        break;
    r = x * 2;
}
```

In the following loop, calculations of r are conditional, as are the conditions that can cause premature loop termination:

EXAMPLE 7

Program Code Loop

```
x = 0;
for (; x<KSIZE; ++x)
{
    r = 23;
    for (; x<KSIZE; ++x)
    {
        if (A[x] < FACTOR1)
            r = A[x];
        if (B[x] < FACTOR2)
            break;
        if (C[x] < FACTOR1)
            r = C[x];
        if (D[x] < FACTOR2)
            break;
        if (E[x] < FACTOR1)
            r = E[x];
        if (F[x] < FACTOR2)
            break;
    }
    if (x < KSIZE)
    {
        G[x] = r;
    }
}
``` dest=PreBreak(pred)

The PreBreak instruction evaluates the predicate pred, which indicates which iteration (if any) prematurely exits the loop via a C-style "break" instruction. The instruction returns a predicate indicating which loop iterations should be active before the break occurs. For example:

| Entry: | pred | = | { | 0 | 0 | 0 | 1 | 0 | 1 | 0 | 0 | } |
|---|---|---|---|---|---|---|---|---|---|---|---|---|
| Exit: | dest | = | { | 1 | 1 | 1 | 1 | 0 | 0 | 0 | 0 | } | dest=Break(pred)

The Break instruction evaluates the predicate pred, which indicates which iteration (if any) prematurely exits the loop via a C-style "break" instruction. The instruction returns a predicate indicating which loop iterations should be active after the break occurs and status flags reflecting this result. For example:

| Entry: | pred | = | { | 0 | 0 | 0 | 1 | 0 | 1 | 0 | 0 | } |
|---|---|---|---|---|---|---|---|---|---|---|---|---|
| Exit: | dest | = | { | 1 | 1 | 1 | 0 | 0 | 0 | 0 | 0 | } | dest=CopyPropagate(dest, src, pred)

The CopyPropagate instruction copies active elements of src, as determined by pred, into the destination dest. The copy operation effectively progresses left to right. Any inactive elements prior to the first active element remain unchanged in dest. From this point forward, active elements are copied from src to dest. For inactive elements, the last active element of src is propagated into dest. For example:

| Entry: | dest | = | { | 1 | 2 | 3 | 4 | 5 | 6 | 7 | 8 | } |
|---|---|---|---|---|---|---|---|---|---|---|---|---|
|  | src | = | { | 9 | A | B | C | D | E | F | 0 | } |
|  | pred | = | { | 0 | 1 | 1 | 1 | 0 | 0 | 1 | 1 | } |
| Exit: | dest | = | { | 1 | A | B | C | C | C | F | 0 | } |

FIGS. 12 and 13 present a vectorized loop from program code with consolidation in accordance with the described embodiments. In these figures, FIG. 12 includes the original source code, while FIGS. 13A-13B include the vectorized code.

FIGS. 12 and 13A-13B illustrate a general case of consolidating variables in the presence of premature loop termination. For each possible early termination, both the Break and PreBreak results are recorded, predicated on any prior termination condition. Before the array G[ ] can be written, the correct value of r should be consolidated from the various conditional reads that may have occurred. To accomplish this, the shortest extent of the PreBreak conditions is used to mask the conditional read predicates, which are OR-ed together. This indicates which element of r is propagated. The CopyPropagate operation then propagates this value to the end of the vector. The scalar value of r is then extracted using the PreBreak extent that was calculated earlier.

Interdependent Read-After-Write

Figure 14:
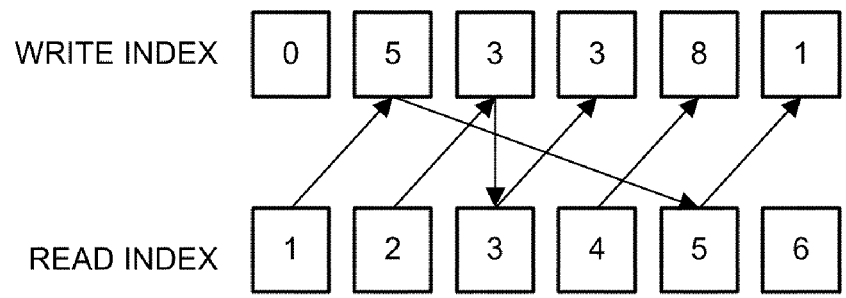
FIG. 14 presents an example loop from program code and a dependency chart in accordance with the described embodiments.

Data dependencies in scalar code generally occur in a simple "to-from" form. When such code is vectorized, dependencies between vector elements (corresponding to instances of scalar variables in time) remain in the to-from form. However, because executing the vector instructions can coalesce operations on variables that occur at different times in the scalar version of the code; paradoxical vector interdependencies can be created. For example, consider the example loop and the dependency chart shown in FIG. 14. In the example loop, the scalar dependencies are straightforward. The vectorization of this simple source code is complicated because in order to perform the write operation, the system needs a vector of t indices, but using the read operation to obtain a vector of t indices potentially depends on the write occurring first.

This situation is unique to vectorized code. Scalar code does not suffer this phenomenon because dependencies occur in different iterations at different times. Another situation that can cause a mutual dependency is when a write occurs before a conditional break from a loop. If the termination test depends on the write, a mutual dependency is created because the existence of the write depends on the loop not terminating prematurely.

Consider the two loops shown in Example 8A and 8B, below. Example 8A contains a write to A[ ] between two reads of A[ ]. Because the write depends on the variable k, and k is potentially dependent upon the write, a mutual dependence is created. Example 8B also has a mutual dependence, except that half of the mutual dependence is a control-flow dependency, while the other half is a data dependency. The write to B[ ] can only be allowed in iterations that should actually execute, but the break depends on the write to B[ ].

EXAMPLE 8A

Program Code Loop

```
k = 99;
for (x=0; x<KSIZE; ++x)
{
    j = A[D[x]];
    A[C[x]] = j + k;
    k = A[B[x]];
    E[x] = k;
}
```

EXAMPLE 8B

Program Code Loop

```
for (x=0; x<KSIZE; ++x)
{
    t = A[x];
    B[x] = t;
    if (B[t] < FACTOR)
        break;
    C[x] = B[t];
}
``` dest=CheckHazardPx(first, second, pred)

CheckHazardPx evaluates two vectors of addresses/indices for potential memory hazards, where the operations may be interdependent. This instruction is similar to the CheckHazardP instruction. Unlike CheckHazardP, where each element of first is checked only against lesser-ordered elements in second, CheckHazardPx also checks equal-numbered element positions in second. If these overlap then the element position with the hazard is recorded in the next highest element position. For example:

| Entry: | first | = | { | 1 | 2 | 3 | 4 | 5 | 6 | 7 | 8 | } |
|---|---|---|---|---|---|---|---|---|---|---|---|---|
|  | second | = | { | 3 | 1 | 2 | 3 | 5 | 4 | 5 | 6 | } |
|  | pred | = | { | 1 | 1 | 1 | 1 | 1 | 1 | 1 | 1 | } |
| Exit: | dest | = | { | 0 | 0 | 1 | 0 | 0 | 5 | 0 | 0 | } |

FIGS. 15-16 present two loops from program code with mutual dependences along with vectorized versions of these loops in accordance with the described embodiments. In the example shown in FIG. 15, before writing to A[C[x]] it is necessary to perform the potentially dependent read of A[B[x]] so that a vector of k can be calculated. This is accomplished with a vector-partitioning loop based on CheckHazardPx to break the vector where k actually depends on the write to A[ ]. To function correctly where a single memory location is written and then read in the same iteration, the original read is also required after the write. In practice this does not substantially affect performance because all values have been recently accessed and are in the cache. The dependence between A[D[x]] and A[B[x]] is handled with a CheckHazardP instruction. Because k is calculated in the iteration before k is used, the ShiftInRightP instruction is used to move the data into the correct element position.

In the example shown in FIG. 16, the loop may prematurely exit based on data read from B[t], which occurs after the write to B[x]. The same technique is applied as in FIG. 15, but the data read from B[t] is used to calculate whether a premature exit occurs and limit the write accordingly, thus ensuring that no writes occur for loop iterations that would not have executed in a sequential machine. Due to the possibility of premature exit, when B[t] is re-read the terminating condition should be re-calculated to ensure all loop exits are properly recognized.

Summation

A common operation is calculating the sum of a series of items. If the running sum result is referenced within the loop, the result should be calculated each step of the way. Consider the following loop where a conditional running sum is stored to array B[ ].

EXAMPLE 9

Program Code Loop

```
v = v2 = 0;
for (x=0; x<KSIZE; ++x)
{
    if (A[x] < FACTOR1)
        v = A[x];
    B[v] = v2;
    if (A[x] > FACTOR2 && A[x] < FACTOR3)
        continue;
    v2 += v;
}
``` dest=RunningSum1P(base, addend, pred)

This instruction returns a vector corresponding to the value of a variable before a recursive add is performed on the variable. Only the first active element of vector base is used in this calculation. The vector parameter addend holds the values that are added to base. The vector parameter pred designates which elements are active. The post-add value is propagated across inactive elements. For example:

| Entry: | value | = | { | 3 | 4 | 3 | 4 | 3 | 4 | 3 | 4 | } |
|---|---|---|---|---|---|---|---|---|---|---|---|---|
|  | addend | = | { | 2 | 3 | 2 | 3 | 2 | 3 | 2 | 3 | } |
|  | pred | = | { | 0 | 1 | 1 | 1 | 0 | 0 | 1 | 1 | } |
| Exit: | dest | = | { | 3 | 4 | 7 | 9 | 12 | 12 | 12 | 14 | } |

As shown above, the first element in the vector remains unchanged because the first element of the vector is inactive. The second element in the vector remains unchanged because the element retains its value before the addend is added to the element. The first active element in base (the second element in base) is the basis for the remaining calculations.

dest=RunningSum2P(base, addend, pred)

This instruction returns a vector corresponding to the value of a variable after an addend gets recursively added to it. Only the first active element of base is used in this calculation. The parameter addend holds the values that are added to base. The parameter pred designates which elements are active. The post-add value is propagated across inactive elements. For example:

| Entry: | value | = | { | 3 | 4 | 3 | 4 | 3 | 4 | 3 | 4 | } |
|---|---|---|---|---|---|---|---|---|---|---|---|---|
|  | addend | = | { | 2 | 3 | 2 | 3 | 2 | 3 | 2 | 3 | } |
|  | pred | = | { | 0 | 1 | 1 | 1 | 0 | 0 | 1 | 1 | } |
| Exit: | dest | = | { | 3 | 7 | 9 | 12 | 12 | 12 | 12 | 17 | } |

Along with the RunningSum operations, the described embodiments can support other operations that "run" across the vector. In these embodiments, there can be a number of instructions that encapsulate commonly used operations across the vector in a vector-length agnostic manner, thereby allowing the amount of parallelism to vary due to runtime dependencies. For example, some embodiments include a running bitwise shift instruction for those loops that perform successive shifts to process bits of a word. In these embodiments, the running-shift instruction takes the number of positions to shift as a vector parameter, as well as a predicate to indicate when shifts occur and when they do not. In addition, some embodiments include running bitwise and logical operations, such as AND/OR/XOR. Moreover, some embodiments include a running-multiply, which addresses common functions such as exponentiation, factorial, and Taylor-series expansion.

FIG. 17 presents a vectorized loop from program code with summation in accordance with the described embodiments. As shown in FIG. 17, when vectorizing the source code, the write of B[ ] is relocated to the bottom of the loop body, which allows a vector of v2 sums to be calculated before they are written. In the original loop, the value of v2 is used before the addition occurs, which first requires a RunningSum1P instruction to calculate a vector of v2 sums corresponding to the scalar values of v2 before the add occurs. After v2 is written, RunningSum2P is used to calculate a vector of v2 sums corresponding to the scalar values of v2 after the addition is performed. This second step is necessary so the next pass can use the final value, although it is often the case that the final value is also needed later in the same pass.

A Complex Example

Example 10, below, presents a loop in program code that includes many obstacles to conventional vectorization: pointer chasing, address aliasing, irregular memory addressing, a data-serial function, unpredictable loop exit conditions, and loop-carried dependencies. Previous examples have illustrated how the described embodiments (i.e., the Macroscalar architecture) address loop-carried dependencies, unpredictable loop termination, and irregular memory addressing. Example 10 introduces two varieties of data-serial dependency chains. The first is pointer-chasing, contained in the z=A[z] statement in the source code. While pointer-chasing itself cannot be vectorized, many loops containing pointer chasing can, as is shown in this example. The second data-serial chain is an inner loop which performs an integer square-root calculation. In this inner loop, every iteration depends on the results of the prior iteration, and the loop exit depends on the final iteration and, therefore, cannot be predicted.

EXAMPLE 10

Program Code Loop

```
y = z = 0;
for (x=0; x<LIMIT; ++x)
{
    z = A[z];
    t = B[z];
    tx = t;
    ty = t / tx;
    while (ty < tx)
    {
        tx = (tx + ty) / 2;
        ty = t / tx;
    }
    if (tx < FACTOR)
    {
        A[y++] = tx;
    }
}
``` dest=VectorReadIntFF(base, offset)

VectorReadIntFF is a first-faulting variant of VectorReadInt. This instruction does not generate a fault if an address is unmapped or otherwise illegal to access. Results corresponding to invalid addresses are noted in the fault status register. If the first active element of the address is unmapped, this instruction sets the ZF flag to indicate that no data was returned. Fault handling is described in more detail below.

FIGS. 18A-18B present a vectorized loop from program code with summation in accordance with the described embodiments. As shown in FIG. 18B, the instruction VectorIndex (0, 1) is used to create a DIV i2 that partitions the vector into single-element sub-vectors, serializing the pointer chase. Because the pointer chase in this case is speculative, both VectorReadIntFF and VectorReadIntNF are used to speculatively chase pointers at the beginning of the loop to build a full vector of possible pointers before proceeding with the rest of the loop. Note the use of the "above" conditional branch, which loops until the end of the vector, or until the first illegal read operation.

In all previous examples, vectorization was performed "horizontally," that is, each element of the Macroscalar vectors represents a corresponding iteration of the loop. In this example there are two loops: The outer "for" loop, and the inner "while" loop. The enclosing "for" loop is, as before, horizontally vectorized, but the inner "while" loop is vertically vectorized. In a vertically vectorized loop, the described embodiments process the iterations of the loop sequentially in time, just like a scalar loop, but the data is a vector rather than a scalar loop. In vertically vectorized loops, the vector of data being processed corresponds to multiple iterations of the enclosing loop. In other words, a horizontal vector built in the enclosing "for" loop is iterated sequentially until the termination conditions of the "while" loop are met for all elements of the vector.

Horizontal and Vertical Vectorization

In the preceding examples of the described embodiments, vertical vectorization was applied because horizontal vectorization was not possible due to serial dependence in the inner loop. However, vertical vectorization is an efficient vectorization technique in its own right, as demonstrated below.

EXAMPLE 11

Program Code Loop

```
for (x=0; x<LIMIT; ++x)
{
    t = A[x];
    s = 0;
    for (y=0; y<t; ++y)
    {
        s += A[x+y];
    }
    B[x] = s;
}
```

The loop in Example 11 encloses a simple summation loop, which is both horizontally and vertically vectorized to illustrate the operations performed by the described embodiments. When the inner loop is horizontally vectorized, a scalar region is generated around the inner loop that removes the inner loop from the surrounding vector context.

FIGS. 19A-19B present a vectorized loop from program code that has been vectorized both horizontally and vertically in accordance with the described embodiments. Note that the code from Example 11 above is the code that has been vectorized in the examples in FIGS. 19A-19B.

Classifying Loops

Some embodiments classify loops according to the dependencies that affect the vectorization of the loop. For example, in some embodiments, many loops, vectorizable or not, fall into one or more of these classifications:

Classically vectorizable loops: These loops contain no loop-carried dependencies (LCD's) other than induction variables.

Loops containing associative loop-carried dependencies (LCDs): These loops contain LCDs over an associative operation. The LCD may be executed conditionally or unconditionally. However, if the LCD is conditionally executed, the condition must not form part of the LCD chain. For example, these LCDs can be reduction operations.

Loops containing conditional LCDs: These loops contain LCDs that are executed conditionally, which may take the form of multiple conditionally-interacting LCDs or conditionally executed non-associative LCDs. For example, these LCDs can represent control-flow hazards.

Loops containing memory hazards (potential LCDs): These loops may contain actual address aliasing or addressing that the compiler could not adequately disambiguate aliasing for (may-alias).

Loops for which the degree of parallelism depends on LCD values: These are loops for which the values of the LCDs result in other run-time dependencies which affect the amount of available parallelism in the loop. These loops are typically vectorized using the above-described software speculation techniques.

Loops containing non-associative LCDs: This category includes LCDs such as Newton-Raphson convergence and pointer-chasing. These dependencies are generally vectorized using vertical vectorization. Where vertical vectorization is not possible, the loop may be partially vectorizable by serializing the loop-carried dependency and vectorizing the remainder of the loop.

Vectorizing Functions and Function Calls

In some embodiments, the compiler can replicate a function with a conventional scalar interface (i.e., a version of the function with scalar inputs and outputs) and create a secondary version with a vector interface (or can create a version with the vector interface alone). Such functions are typically vertically vectorized, for efficiency and simplicity, although horizontal vectorization may also be applied. In these embodiments, function vectorization is most easily achieved in cases where the function has no side effects on global, file-scope static, or function-local static storage. Functions using straight-line code (without loops) can also be vertically vectorized, operating on either full or partial vectors under the control of a predicate passed to the function in the compiler-generated vector interface.

If only "safe" functions are vectorized, the existence of the secondary variant guarantees that the function can safely and effectively be called from within a vectorized loop. Thus, in the described embodiments, Macroscalar vectorization techniques can be applied to vectorize commonly used functions such as sin( ), cos( ), tan( ), atan( ), sqrt( ), etc. Doing so enables loops using these functions to call vector variants with vector interfaces, rather than incurring the bottleneck of a scalar interface.

While the scheme above works for file-local functions, library functions like sin( ) have interfaces established through header files. Because compilers in the described embodiments generally do not make autonomous modification of header files, in some embodiments, an annotation mechanism, such as compiler-generated XML files stored in standardized locations, provides additional compiler-generated source-level input describing the secondary compiler-generated vector function interfaces. In these embodiments, the compiler attempts to open these annotation files implicitly upon inclusion of the appropriate header file. For example, upon inclusion of the header file <stdlib.h>, the compiler also attempts to load <stdlib.xml>. If the file did not exist, then the compiler presumes that no vector interfaces existed.

In the described embodiments, the annotation mechanism also has the potential to enable vectorization in other ways. For example, assume a loop calling two functions, one at the top of the loop body, foo( ), and the other near the bottom, bar( ). In the absence of any deep information about these functions beyond their interfaces, the compiler is forced to generate program code wherein the functions and the entire body of code between them execute serially, one element at a time. For example, foo( ) might call srand( ), while bar( ) might call rand( ). Calling srand( ) multiple times before calling rand( ) is incorrect. If, on the other hand, the functions modify no non-local state, the compiler vectorizes the code between the two function calls. The annotation scheme mentioned above can be extended to provide information about the functions and their descendants that enable the compiler to vectorize such code.

In the extended annotation scheme in the described embodiments, attributes of functions are propagated up through their callers to communicate key information to the compiler about all the functions called from a loop. Information as to whether the functions modify function-scope static variables, pointed-to function parameters, file-scope static variables, or global variables is enormously valuable. For file-scope static variables, for example, the type of reference (read or write), the name of the variable, and the file where they are located might be communicated. For global variables, only the name and type of reference is necessary. Knowledge that a function modifies no parameters or static state enables the compiler in the described embodiments to forgo enforcement of atomicity on that function, thereby removing that obstacle to vectorization.

The process in these embodiments is caller-guaranteed-correctness, assisted by trustable hints about the functions being called. The absence of a hint may cause the preclusion of an optimization, but is always safe. In these embodiments, annotations begin at the bottom level of the library, because non-annotated functions propagate uncertainty upward, disabling many opportunities for vectorization.

Fault Handling

In the described embodiments, certain types of instructions can generate exceptions (or interrupts) in response to a fault condition resulting from the operation being performed. For example, memory operations that cause a virtual-memory system in computer system 100 (not shown) to bring pages into memory or floating-point operations that invoke software fix-up handlers at run-time can cause computer system 100 to generate exceptions. In these embodiments, instructions that can generate fault conditions can classified as "all-faulting instructions," as "first-faulting instructions," or as "non-faulting instructions." All-faulting instructions generate an exception when the operation on any element position produces a fault. First-faulting instructions generate exceptions only if a fault occurs in the first active element, i.e., the first element for which the predicate is enabled. Non-faulting instructions suppress all exceptions that would otherwise have been generated from a fault in any element position.

In some embodiments processor 102 includes status and control registers or bits to that enable the management of faults and the resulting exceptions. For example, some embodiments include a Fault Status Register (FSR). The FSR is a bit-per-vector-element register that can be used to record that a faulting condition occurred at or before the corresponding element position when the actual exception is suppressed. A bit being set in this register also indicates that any further exceptions generated by faults in the corresponding element are to be suppressed.

Some embodiments include a Fault Type Register (FTR). The FTR is a register that indicates the type of fault that occurred at each element position when an actual exception is generated. Exceptions that have been masked by the FSR have no effect on this register.

Some embodiments include an Arithmetic Fault Mode (AFM) bit. This bit determines whether arithmetic instructions are to be processed in all-faulting or first-faulting mode.

Some embodiments include a Soft Terminate Mode (STM) bit. This bit determines how the OS should respond to normally fatal exceptions. If the STM bit is set, the OS treats normally fatal exceptions in a first-faulting manner; if the fatal exception comes from the first active position the program should be terminated. Otherwise, the OS should set the appropriate FSR bits and resume execution.

Software Speculation

In the described embodiments, for software speculation, a compiler can generate code that presumes all vector elements can safely be processed in parallel. Then, at runtime, when the dynamic conditions that determine actual parallelism are calculated, the vector size is reduced through predication to only the appropriate elements (i.e., the elements that can safely be processed in parallel). The reduction in vector size is due to a data dependency, which implies the remainder of the presumptive element processing would likely not have occurred in the scalar program. Because of this, any faulting conditions in these elements would also not have occurred in the scalar program. After the data dependency is resolved, software-speculative code loops back and once again presumes the remainder of the elements in the vector may all be processed in parallel until determining that the remainder of the elements in the vector cannot be processed in parallel. (Note that in this description, we use the term "fault" to mean an abnormal condition that would normally generate an exception in a scalar program. In addition, we use the term "exception" to mean an interruption in program execution that is generated as a result of an unmasked fault.)

The above-described "first-faulting" and "non-faulting" instructions provide mechanisms to prevent faults from generating exceptions that would not be generated by the scalar program. Information about elements that have faulting conditions is used to restrict the width of the vector being processed, possibly to even fewer elements than dictated by data dependencies. However the natural loop-back form of software-speculative code ensures that the faulting element eventually becomes the first active element, if the loop continues that far, thus guaranteeing that any legitimate exception occurs in the scalar code also occurs in the described embodiments. These embodiments can also prevent the VM system from bringing in (i.e., retrieving from memory) pages that would not have been referenced by the corresponding instruction(s) in the scalar program.

When an element in a first-faulting instruction encounters a faulting condition, and that element is not the first active element, a bit is set in the Fault Status Register (FSR) corresponding to the faulting element position. The Actual instruction can then consult this register to determine which elements were actually processed without faults and return a predicate indicating those element positions.

Arithmetic operations can generate faults during speculative processing. By default, some code disables exceptions on floating-point arithmetic faults. If a given program does not enable arithmetic faults, the described embodiments may not take them into consideration (provide handling for such faults). Some programs, however, enable arithmetic faults. For example, these programs can invoke floating-point fix-up handlers for some faults. An example is programs that need to calculate s in (x)/x at x=0. Such programs would enable the divide-by-zero exception and fix-up the result of the calculation to be 1.0 when the exception is taken.

In some embodiments, a solution for the enabling of faults in software-speculative loops is to set the AFM bit to cause arithmetic instructions to operate in a first-faulting mode of operation. This insures only the necessary arithmetic exceptions are taken, but also reduces the effective parallelism whenever these exceptions are taken and causes the exceptions to be taken serially.

Some embodiments leave the AFM bit cleared, which causes arithmetic instructions to operate in all-faulting mode. This method enables full vector parallelism even in the presence of exceptions. An entire vector of faults can be processed on one exception by having the exception handler to consult the Fault Type register (FTR). This can reduce the number of exceptions taken, although it can also cause exceptions to be taken that would not have occurred in the scalar program. To ensure that the program is not incorrectly terminated by one of these extraneous exceptions, the Soft Terminate Mode (STM) bit should be set. Exception handlers can then use this bit to determine how to handle potentially fatal exceptions. If the fatal exception was caused by the first active element, the program is terminated regardless of the state of the STM bit. However, if a fatal exception occurs in any subsequent position, the exception handler sets the corresponding bit in the FSR indicating that the exception was ignored. All bits in the FSR corresponding to subsequent element positions should also be set. This effectively masks further exceptions from the faulting element and any subsequent elements.

When the data dependency causing software speculation is resolved in these embodiments, the program may optionally employ the ActualFault instructions to ensure that fatal exceptions did not occur in element positions ahead of the dependency. These instructions ensure the program terminates if the scalar program would have terminated due to a fatal exception. If program termination is not desired, the ActualFault instruction can be omitted and the FSR cleared at the conclusion of the loop. Clearing the FSR at the conclusion of the loop eliminates the overhead of checking for program termination inside the loop.

Loop Termination

In the described embodiments, unpredictable loop termination conditions can result in the speculation that all elements are to be processed until it is determined that the loop actually terminates mid-vector. In these loops, the final vector being processed may read pages that the scalar program never read, potentially causing VM pages to be retrieved from disk unnecessarily, or possibly terminating the program based on a read from an illegal address. Consider the example below, where a full vector is read from array A before the loop termination condition can be calculated, an operation that may read an illegal page that the scalar program would not have accessed—potentially leading to program termination.

```
static double C[SIZE], B[SIZE], A[SIZE];
while (A[x] > 0)
{
    C[x] = B[x];
    ++x;
}
```

The described embodiments provide solutions for loops that have unpredictable termination conditions. However, some embodiments include mechanisms for avoiding these problems. For example, linkers in these embodiments can pad the end of the statically and dynamically allocated storage areas by an amount proportional to the hardware vector length of the machine. For example, padding by 8 bytes per vector element would allow the example above to negate the effects of reading past the end of the array. Padding by one additional 4K page would allow structures up to 512 bytes to be linearly accessed speculatively on a processor 102 that used 8-element vectors.

In these embodiments, simple padding does not absolve all loops of fault checking, as not all loops address arrays in linear fashion. However, in some embodiments, the loop above could be implemented using first-faulting read instructions in the loop to ensure that the loop does not read into an illegal page. While this behavior is correct, this behavior requires additional overhead to manipulate the predicates and loop until the vector is complete or the loop naturally terminates.

In these embodiments, using soft-termination mode, this loop can employ an all-faulting vector read that potentially reads an illegal page. If this occurs, rather than terminating the program, the operating system sets bits in the FSR in the position that faulted, as well as all subsequent positions, before resuming program execution. This ensures that these elements do not take unnecessary multiple exceptions as the program progresses. After the loop termination condition is calculated, the program can check to ensure that none of the active elements were responsible for the exception using the ActualFault instructions.

In these embodiments, during normal program execution, an illegal-address exception typically only occurs at loop termination time. Because of this, a compiler in these embodiments may choose to insert the Actual instruction into the loop itself, for debugging or robustness. Alternatively, the compiler may choose the place the Actual instruction at the end of the loop, thus virtually eliminating the overhead of fault checking and taking the risk that could result in a proper program termination not being recognized.

Instruction Definitions

The following section contains exemplary instructions used in the described embodiments (i.e., that are included in Macroscalar architecture). The described instructions demonstrate the concepts used in implementing the Macroscalar architecture and therefore do not comprise a complete list of the possible instructions. A person of skill in the art will recognize that these concepts may be implemented using different arrangements or types of instructions without departing from the spirit of the described embodiments.

Unlike conventional single-instruction-multiple-data (SIMD) coding, in some embodiments, Macroscalar code can combine vector variables with scalar registers or immediate values. Thus, in these embodiments, Macroscalar instructions can directly reference scalar registers and immediate values without making unnecessary vector copies of them. Note that this can help avoid unnecessary vector-register pressure within a loop because more vector registers can be available instead of being required for making vector copies of scalars or immediate values.

We describe these instructions using a signed-integer data type. However, in alternative embodiments, other data types or formats are used. Moreover, although Macroscalar instructions may take vector, scalar, or immediate arguments in practice, only vector arguments are shown here to avoid redundancy.

The descriptions of the instructions reference vector elements with a zero-based numbering system (i.e., element "0" is the first element). However, certain instructions, such as those involved in the processing of DIVs, express dependencies using 1-based element numbering, even though they are actually implemented using 0-based element numbering. Care should be taken to avoid confusing the language the results are expressed in from the language used to implement the instructions.

For the purposes of explanation, the vector data type is defined as a C++ class containing an array v[ ] of elements that comprise the vector. Within these descriptions, the variable VECLEN indicates the size of the vector. In some embodiments, VECLEN is constant.

In the following examples, predication is communicated to the instructions via two variables. The vector gPred is the predicate vector that affects the instruction and/or the assignment of the result vector. A scalar variable, gPredFlag, indicates whether gPred functions in a predication or zeroing capacity. This variable is set to 0 when a zeroing predicate is being applied, or is set to 1 otherwise. Additionally, some instructions may reference gPred to affect the operation of the instruction apart from the final assignment. If an instruction is not predicated, then all elements are considered active, and the vector gPred contains all true indicators.

Note that the format of the following instruction definitions is a statement of the instruction type followed by a description of the instruction that can include example code as well as one or more usage examples.

General-Purpose Vector Instructions

The instructions in this category perform the usual assortment of C-style (i.e., as found in the C programming language) arithmetic operations in vectors in an agnostic, predicated manner. The described embodiments contain some operations not usually found in vector instructions sets, such as integer division and modulo operators.

Vector-Vector Assignment

During vector assignment, active vector elements, as determined by optional predication, are copied into a destination vector. Inactive elements either remain unmodified, or are forced to zero, depending on the nature of the predication.

Predication and zeroing are applied at the assignment of the result vector. Final assignment of the result vector is an implicit or explicit part of every instruction that produces a result. Note that the assignment operator performs this function where predication or zeroing is not performed explicitly by the instruction.

```
const Vector Vector::operator = (const Vector &val)
{
    for (int x=0; x<VECLEN; ++x)
        if (gPred.v[x])
            v[x] = val.v[x];
        else
            v[x] &= -gPredFlag; // Not changed if
                                // predicated, 0 if zeroed
    return(*this);
}
```

Examples:

```
~p0; a = b;
On Entry:   p0 = { 0  0  1  1  1  1  0  0 }
            a  = { 9  9  9  9  9  9  9  9 }
            b  = { 1  2  3  4  5  6  7  8 }
On Exit:    a  = { 9  9  3  4  5  6  9  9 }
!p0; a = b;
On Entry:   p0 = { 0  0  1  1  1  1  0  0 }
            a  = { 9  9  9  9  9  9  9  9 }
            b  = { 1  2  3  4  5  6  7  8 }
On Exit:    a  = { 0  0  3  4  5  6  0  0 }
```

Vector-Scalar Assignment

A scalar register or immediate value is copied into active elements of the destination vector, as determined by optional predication. Inactive elements either remain unmodified, or are forced to zero, depending on the nature of the predication.

```
const Vector & Vector::operator = (const __nt val)
{
    int x;
    for (x=0; x<VECLEN; ++x)
        if (gPred.v[x])
            v[x] = val;
        else
            v[x] &= ~gPredFlag; // Not changed if
                                  predicated, 0 if zeroed
    return(*this);
}
```

Examples:

```
~p0; a = b;
On Entry:   p0 = { 0  0  1  1  1  1  0  0 }
            a  = { 9  9  9  9  9  9  9  9 }
            b  = 5
On Exit:    a  = { 9  9  5  5  5  5  9  9 }
!p0; a = b;
On Entry:   p0 = { 0  0  1  1  1  1  0  0 }
            a  = { 9  9  9  9  9  9  9  9 }
            b  = 5
On Exit:    a  = { 0  0  5  5  5  5  0  0 }
```

Scalar-Vector Assignment (Vector Cast to Scalar)

This instruction casts a vector of values into a scalar register. Only the last active element, as determined by optional predication, is copied to the scalar destination. If no elements are active, this instruction returns the first element of the vector.

```
Vector::operator int (void) const
{
    int x,rc;
    for (x=VECLEN-1; x>=0; --x) // Locate last
        active element
        if (gPred.v[x])
            break;
    rc = v[0]; // Use first element if there
                 are no active ones
    if (x >= 0)
        rc = v[x];
    return(rc);
}
```

Examples:

```
~p0; a = int(b);
On Entry:   p0 = { 0  0  1  1  1  1  0  0 }
            a  = 2
            b  = { 1  2  3  4  5  6  7  8 }
On Exit:    a  = 6
!p0; a = int(b);
On Entry:   p0 = { 0  0  1  1  1  1  0  0 }
            a  = 2
            b  = { 1  2  3  4  5  6  7  8 }
On Exit:    a  = 6
```

VectorNeg

This instruction mathematically negates active vector elements. Inactive elements either remain unmodified, or are forced to zero, depending on the nature of the predication. As shown below, in some embodiments, the instruction processes all elements equivalently; however, predication is performed by the assignment of the result, and should be considered an integral part of this instruction.

```
Vector VectorNeg(const Vector &ob)
{
    Vector result;
    for (int x=0; x<VECLEN; ++x)
        result.v[x] = -ob.v[x];
    return(result);
}
```

Examples:

```
~p0; a = -b;
On Entry:   p0 = {  0   0   1   1   1   1   0   0 }
            a  = {  9   9   9   9   9   9   9   9 }
            b  = { -3  -2  -1   0   1   2   3   4 }
On Exit:    a  = {  9   9   1   0  -1  -2   9   9 }
!p0; a = -b;
On Entry:   p0 = {  0   0   1   1   1   1   0   0 }
            a  = {  9   9   9   9   9   9   9   9 }
            b  = { -3  -2  -1   0   1   2   3   4 }
On Exit:    a  = {  0   0   1   0  -1  -2   0   0 }
```

VectorNot

This instruction logically negates active vector elements. Inactive elements either remain unmodified, or are forced to zero, depending on the nature of the predication. As shown below, in some embodiments, the instruction processes all elements equivalently; however, predication is performed by the assignment of the result, and should be considered an integral part of this instruction.

```
Vector VectorNot(const Vector &ob)
{
    Vector result;
    for (int x=0; x<VECLEN; ++x)
        result.v[x] = !ob.v[x];
    return(result);
}
```

Examples:

```
~p0; a = VectorNot(b);
On Entry:   p0 = { 0   0   1   1   1   1   0   0 }
            a  = { 9   9   9   9   9   9   9   9 }
            b  = { 0  -2  -1   0   1   2   3   0 }
On Exit:    a  = { 9   9   0   1   0   0   9   9 }
!p0; a = VectorNot(b);
On Entry:   p0 = { 0   0   1   1   1   1   0   0 }
            a  = { 9   9   9   9   9   9   9   9 }
            b  = { 0  -2  -1   0   1   2   3   0 }
On Exit:    a  = { 0   0   0   1   0   0   0   0 }
```

VectorInv

This instruction performs bitwise inversion active vector elements. Inactive elements either remain unmodified, or are forced to zero, depending on the nature of the predication. As shown below, in some embodiments, the instruction processes all elements equivalently; however, predication is performed by the assignment of the result, and should be considered an integral part of this instruction.

```
Vector VectorInv(const Vector &ob)
{
    Vector result;
    for (int x=0; x<VECLEN; ++x)
        result.v[x] = ~ob.v[x];
    return(result);
}
```

Examples:

```
~p0; a = ~b;
On Entry:  p0 = {  0  0  1  1  1  1  0  0 }
           a  = {  9  9  9  9  9  9  9  9 }
           b  = { -3 -2 -1  0  1  2  3  4 }
On Exit:   a  = {  9  9  0 -1 -2 -3  9  9 }
!p0; a = ~b;
On Entry:  p0 = {  0  0  1  1  1  1  0  0 }
           a  = {  9  9  9  9  9  9  9  9 }
           b  = { -3 -2 -1  0  1  2  3  4 }
On Exit:   a  = {  0  0  1  0 -1 -2  0  0 }
```

VectorAdd

This instruction performs addition on active vector elements. Inactive elements either remain unmodified, or are forced to zero, depending on the nature of the predication. In this implementation, the instruction takes the result vector as an input and performs predication explicitly.

```
Vector VectorAdd (const Vector &ob, const Vector &val,
Vector *result)
{
    for (int x=0; x<VECLEN; ++x)
        if (gPred.v[x])
            result->v[x] = (ob.v[x] + val.v[x]);
        else
            result->v[x] &= ~gPredFlag; // Not
                changed if predicated, 0 if zeroed
    return(*result);
}
```

Examples:

```
~p0; a = b + c;
On Entry:  p0 = { 0  0  1  1  1  1  0  0 }
           a  = { 9  9  9  9  9  9  9  9 }
           b  = { 8  7  6  5  4  3  2  1 }
           c  = { 0  1  2  3  4  5  6  7 }
On Exit:   a  = { 9  9  8  8  8  8  9  9 }
!p0; a = b + c;
On Entry:  p0 = { 0  0  1  1  1  1  0  0 }
           a  = { 9  9  9  9  9  9  9  9 }
           b  = { 8  7  6  5  4  3  2  1 }
           c  = { 0  1  2  3  4  5  6  7 }
On Exit:   a  = { 0  0  8  8  8  8  0  0 }
```

VectorSub

This instruction performs subtraction on active vector elements. Inactive elements either remain unmodified, or are forced to zero, depending on the nature of the predication. This implementation of the instruction takes the result vector as an input and performs predication explicitly.

```
Vector VectorSub (const Vector &ob, const Vector &val,
Vector *result)
{
    for (int x=0; x<VECLEN; ++x)
        if (gPred.v[x])
            result->v[x] = (ob.v[x] - val.v[x]);
        else
            result->v[x] &= ~gPredFlag; // Not
                changed if predicated, 0 if zeroed
    return(*result);
}
```

Examples:

```
~p0; a = b - c;
On Entry:  p0 = { 0  0  1  1  1  1  0  0 }
           a  = { 9  9  9  9  9  9  9  9 }
           b  = { 8  7  6  5  4  3  2  1 }
           c  = { 0  1  2  3  4  5  6  7 }
On Exit:   a  = { 9  9  4  2  0 -2  9  9 }
!p0; a = b - c;
On Entry:  p0 = { 0  0  1  1  1  1  0  0 }
           a  = { 9  9  9  9  9  9  9  9 }
           b  = { 8  7  6  5  4  3  2  1 }
           c  = { 0  1  2  3  4  5  6  7 }
On Exit:   a  = { 0  0  4  2  0 -2  0  0 }
```

VectorMult

This instruction performs multiplication on active vector elements. Inactive elements either remain unmodified, or are forced to zero, depending on the nature of the predication. This implementation of the instruction takes the result vector as an input and performs predication explicitly.

```
Vector VectorMult (const Vector &ob, const Vector
&val, Vector *result)
{
    for (int x=0; x<VECLEN; ++x)
        if (gPred.v[x])
            result->v[x] = (ob.v[x] * val.v[x]);
        else
            result->v[x] &= ~gPredFlag; // Not
                changed if predicated, 0 if zeroed
    return(*result);
}
```

Examples:

```
~p0; a = b * c;
On Entry:  p0 = { 0  0  1  1  1  1  0  0 }
           a  = { 9  9  9  9  9  9  9  9 }
           b  = { 8  7  6  5  4  3  2  1 }
           c  = { 0  1  2  3  4  5  6  7 }
On Exit:   a  = { 9  9 12 15 16 15  9  9 }
!p0; a = b * c;
On Entry:  p0 = { 0  0  1  1  1  1  0  0 }
           a  = { 9  9  9  9  9  9  9  9 }
           b  = { 8  7  6  5  4  3  2  1 }
           c  = { 0  1  2  3  4  5  6  7 }
On Exit:   a  = { 0  0 12 15 16 15  0  0 }
```

VectorDiv

This instruction performs division on active vector elements. Inactive elements either remain unmodified, or are forced to zero, depending on the nature of the predication. This implementation of the instruction takes the result vector as an input and performs predication explicitly.

```
Vector VectorDiv (const Vector &ob, const Vector &val,
Vector *result)
{
    for (int x=0; x<VECLEN; ++x)
        if (gPred.v[x])
            result->v[x] = (ob.v[x] / val.v[x]);
        else
            result->v[x] &= ~gPredFlag; // Not
            changed if predicated, 0 if Zeroed
    return(*result);
}
```

Examples:

```
~p0; a = b / c;
On Entry:   p0  = { 0 0 1 1 1 1 0 0 }
            a   = { 9 9 9 9 9 9 9 9 }
            b   = { 8 7 6 5 4 3 2 1 }
            c   = { 0 1 2 3 4 5 6 7 }
On Exit:    a   = { 9 9 3 1 1 0 9 9 }
!p0; a = b / c;
On Entry:   p0  = { 0 0 1 1 1 1 0 0 }
            a   = { 9 9 9 9 9 9 9 9 }
            b   = { 8 7 6 5 4 3 2 1 }
            c   = { 0 1 2 3 4 5 6 7 }
On Exit:    a   = { 0 0 3 1 1 0 0 0 }
```

VectorMod

This instruction performs a modulus operation on active vector elements. Inactive elements either remain unmodified, or are forced to zero, depending on the nature of the predication. This implementation of the instruction takes the result vector as an input and performs predication explicitly.

```
Vector VectorMod (const Vector &ob, const Vector &val,
Vector *result)
{
    for (int x=0; x<VECLEN; ++x)
        if (gPred.v[x])
            result->v[x] = (ob.v[x] % val.v[x]);
        else
            result->v[x] &= ~gPredFlag; // Not
            changed if predicated, 0 if Zeroed
    return(*result);
}
```

Examples:

```
~p0; a = b % c;
On Entry:   p0  = { 0 0 1 1 1 1 0 0 }
            a   = { 9 9 9 9 9 9 9 9 }
            b   = { 8 7 6 5 4 3 2 1 }
            c   = { 0 1 2 3 4 5 6 7 }
On Exit:    a   = { 9 9 0 2 0 3 9 9 }
!p0; a = b % c;
On Entry:   p0  = { 0 0 1 1 1 1 0 0 }
            a   = { 9 9 9 9 9 9 9 9 }
            b   = { 8 7 6 5 4 3 2 1 }
            c   = { 0 1 2 3 4 5 6 7 }
On Exit:    a   = { 0 0 0 2 0 3 0 0 }
```

VectorAnd

This instruction performs a bitwise "and" on active vector elements. Inactive elements either remain unmodified, or are forced to zero, depending on the nature of the predication. This implementation of the instruction takes the result vector as an input and performs predication explicitly.

```
Vector VectorAnd (const Vector &ob, const Vector &val,
Vector *result)
{
    for (int x=0; x<VECLEN; ++x)
        if (gPred.v[x])
            result->v[x] = (ob.v[x] & val.v[x]);
        else
            result->v[x] &= ~gPredFlag; // Not
            changed if predicated, 0 if zeroed
    return(*result);
}
```

Examples:

```
~p0; a = b & c;
On Entry:   p0  = { 0 0 1 1 1 1 0 0 }
            a   = { 9 9 9 9 9 9 9 9 }
            b   = { 8 7 6 5 4 3 2 1 }
            c   = { 0 1 2 3 4 5 6 7 }
On Exit:    a   = { 9 9 2 1 4 1 9 9 }
!p0; a = b & c;
On Entry:   p0  = { 0 0 1 1 1 1 0 0 }
            a   = { 9 9 9 9 9 9 9 9 }
            b   = { 8 7 6 5 4 3 2 1 }
            c   = { 0 1 2 3 4 5 6 7 }
On Exit:    a   = { 0 0 2 1 4 1 0 0 }
```

VectorOr

This instruction performs a bitwise "or" on active vector elements. Inactive elements either remain unmodified, or are forced to zero, depending on the nature of the predication. This implementation of the instruction takes the result vector as an input and performs predication explicitly.

```
Vector VectorOr (const Vector &ob, const Vector &val,
Vector *result)
{
    for (int x=0; x<VECLEN; ++x)
        if (gPred.v[x])
            result->v[x] = (ob.v[x] | val.v[x]);
        else
            result->v[x] &= ~gPredFlag; // Not
            changed if predicated, 0 if zeroed
    return(*result);
}
```

Examples:

```
~p0; a = b | c;
On Entry:   p0  = { 0 0 1 1 1 1 0 0 }
            a   = { 9 9 9 9 9 9 9 9 }
            b   = { 8 7 6 5 4 3 2 1 }
            c   = { 0 1 2 3 4 5 6 7 }
On Exit:    a   = { 9 9 6 7 4 7 9 9 }
!p0; a = b | c;
On Entry:   p0  = { 0 0 1 1 1 1 0 0 }
            a   = { 9 9 9 9 9 9 9 9 }
            b   = { 8 7 6 5 4 3 2 1 }
            c   = { 0 1 2 3 4 5 6 7 }
On Exit:    a   = { 0 0 6 7 4 7 0 0 }
```

VectorXor

This instruction performs a bitwise "xor" on active vector elements. Inactive elements either remain unmodified, or are forced to zero, depending on the nature of the predication. This implementation of the instruction takes the result vector as an input and performs predication explicitly.

```
Vector VectorXor (const Vector &ob, const Vector &val,
Vector *result)
{
    for (int x=0; x<VECLEN; ++x)
        if (gPred.v[x])
            result->v[x] = (ob.v[x] ^ val.v[x]);
        else
            result->v[x] &= ~gPredFlag; // Not
            changed if predicated, 0 if zeroed
    return(*result);
}
```

Examples:

```
~p0; a = b ^ c;
On Entry:   p0 = { 0 0 1 1 1 1 0 0 }
            a  = { 9 9 9 9 9 9 9 9 }
            b  = { 8 7 6 5 4 3 2 1 }
            c  = { 0 1 2 3 4 5 6 7 }
On Exit:    a  = { 9 9 4 6 0 6 9 9 }
!p0; a = b ^ c;
On Entry:   p0 = { 0 0 1 1 1 1 0 0 }
            a  = { 9 9 9 9 9 9 9 9 }
            b  = { 8 7 6 5 4 3 2 1 }
            c  = { 0 1 2 3 4 5 6 7 }
On Exit:    a  = { 0 0 4 6 0 6 0 0 }
```

VectorShL

This instruction performs a bitwise left-shift on active vector elements. Inactive elements either remain unmodified, or are forced to zero, depending on the nature of the predication. This implementation of the instruction takes the result vector as an input and performs predication explicitly.

```
Vector VectorShL (const Vector &ob, const Vector &val,
Vector *result)
{
    for (int x=0; x<VECLEN; ++x)
        if (gPred.v[x])
            result->v[x] = (ob.v[x] << val.v[x]);
        else
            result->v[x] &= ~gPredFlag; // Not
            changed if predicated, 0 if zeroed
    return(*result);
}
```

Examples:

```
~p0; a = b << c;
On Entry:   p0 = { 0 0 1 1 1 1 0 0 }
            a  = { 9 9 9 9 9 9 9 9 }
            b  = { 8 7 6 5 4 3 2 1 }
            c  = { 0 1 2 3 4 5 6 7 }
On Exit:    a  = { 9 9 24 40 64 96 9 9 }
!p0; a = b << c;
On Entry:   p0 = { 0 0 1 1 1 1 0 0 }
            a  = { 9 9 9 9 9 9 9 9 }
            b  = { 8 7 6 5 4 3 2 1 }
            c  = { 0 1 2 3 4 5 6 7 }
On Exit:    a  = { 0 0 24 40 64 96 0 0 }
```

VectorShR

This instruction performs a bitwise right-shift on active vector elements. Inactive elements either remain unmodified, or are forced to zero, depending on the nature of the predication. This implementation of the instruction takes the result vector as an input and performs predication explicitly.

```
Vector VectorShR (const Vector &ob, const Vector &val,
Vector *result)
{
    for (int x=0; x<VECLEN; ++x)
        if (gPred.v[x])
            result->v[x] = (ob.v[x] >> val.v[x]);
        else
            result->v[x] &= ~gPredFlag; // Not
            changed if predicated, 0 if zeroed
    return(*result);
}
```

Examples:

```
~p0; a = b ^ c;
On Entry:   p0 = { 0 0 1 1 1 1 0 0 }
            a  = { 9 9 9 9 9 9 9 9 }
            b  = { 8 7 6 5 4 3 2 1 }
            c  = { 0 1 2 3 4 5 6 7 }
On Exit:    a  = { 9 9 1 0 0 0 9 9 }
!p0; a = b ^ c;
On Entry:   p0 = { 0 0 1 1 1 1 0 0 }
            a  = { 9 9 9 9 9 9 9 9 }
            b  = { 8 7 6 5 4 3 2 1 }
            c  = { 0 1 2 3 4 5 6 7 }
On Exit:    a  = { 0 0 1 0 0 0 0 0 }
```

VectorMin

This instruction performs a "min" operation on active vector elements. Inactive elements either remain unmodified, or are forced to zero, depending on the nature of the predication. As shown below, in some embodiments, the instruction processes all elements equivalently; however, predication is performed by the assignment of the result, and should be considered an integral part of this instruction.

```
Vector VectorMin(Vector &a, Vector &b)
{
    Vector r;
    for (int x=0; x<VECLEN; ++x)
        if (a.v[x] < b.v[x])
            r.v[x] = a.v[x];
        else
            r.v[x] = b.v[x];
    return(r);
}
```

Examples:

```
~p0; a = VectorMin(b,c);
On Entry:   p0 = { 0 0 1 1 1 1 0 0 }
            a  = { 9 9 9 9 9 9 9 9 }
            b  = { 8 7 6 5 4 3 2 1 }
            c  = { 0 1 2 3 4 5 6 7 }
On Exit:    a  = { 9 9 2 3 4 3 9 9 }
!p0; a = VectorMin(b,c);
On Entry:   p0 = { 0 0 1 1 1 1 0 0 }
            a  = { 9 9 9 9 9 9 9 9 }
            b  = { 8 7 6 5 4 3 2 1 }
            c  = { 0 1 2 3 4 5 6 7 }
On Exit:    a  = { 0 0 2 3 4 3 0 0 }
```

VectorMax

This instruction performs a "max" operation on active vector elements. Inactive elements either remain unmodified, or are forced to zero, depending on the nature of the predication. As shown below, in some embodiments, the instruction processes all elements equivalently; however, predication is performed by the assignment of the result, and should be considered an integral part of this instruction.

```
Vector VectorMax(Vector &a, Vector &b)
{
    Vector r;
    for (int x=0; x<VECLEN; ++x)
        if (a.v[x] > b.v[x])
            r.v[x] = a.v[x];
        else
            r.v[x] = b.v[x];
    return(r);
}
```

Examples:

```
~p0; a = VectorMax(b,c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 9 9 6 5 4 5 9 9 }
!p0; a = VectorMax(b,c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 0 0 6 5 4 5 0 0 }
```

Predicate Testing and Manipulation

Some of the following instructions test and generate predicate vectors, setting processor processor status flags to reflect the results. If the instruction generating the predicates is itself predicated, then the flags reflect the status of the active elements only. Each instruction may set some or all of the flags, and different instructions set different flags.

```
(ZF) NONE   - Set if no active elements of the vector
              are true
(PF) ALL    - Set if all of the active elements of the
              vector are true
(SF) FIRST  - Set if the first active element of the
              vector is true
(OF) LAST   - Set if the last active element of the
              vector is true
(CF) CARRY  - Set if the last active element of
              GeneratePredicates( ) output is true
     ANY    - Logical inverse of NONE (!ZF)
     ABOVE  - This condition is calculated from ((CF
              == 0) && (ZF == 0))
     GREATER - Calculated from (ZF == 0) && (SF ==
              OF)
     LOWER  - Calculated from (SF != OF)
```

VectorTest

This instruction tests the input predicate vector and sets the processor status flags accordingly.

```
gNone   NONE - Used to indicates that no active
        predicates have been set
gFirs   FIRST - Used to indicate that the first
        active predicates is set
gLast   LAST - Used to indicates that the last
        active predicate is set
gAll    ALL - Used to indicate that all active
        predicates are set
```

-continued

```
Flags:  ZF - Set if no active elements are true.
             Cleared otherwise.
        SF/OF/PF - Indicates whether the
             First/Last/All active elements of the result
             are true.
void VectorTest(Vector &p)
{
    int x,s,t;
    s = 0;
    for (x=0; x<VECLEN; ++x)
    {
        s = (gPred.v[x] && p.v[x]);
        if (gPred.v[x])
            break;
    }
    gFirst = s;
    s = 0;
    for (x=VECLEN-1; x>=0; --x)
    {
        s = (gPred.v[x] && p.v[x]);
        if (gPred.v[x])
            break;
    }
    gLast = s;
    s = t = 0;
    for (x=0; x<VECLEN; ++x)
    {
        t += (gPred.v[x]);
        s += (gPred.v[x] && p.v[x]);
    }
    gNone = (s == 0);
    gAll = (s == t);
    return;
}
```

VectorEQ

This instruction compares active vector elements and returns a result vector indicating whether the elements of the first parameter are equal to elements of the second parameter. Inactive elements either remain unmodified, or are forced to zero, depending on the nature of the predication. This implementation of the instruction takes the result vector as an input and performs predication explicitly.

```
Flags:  ZF - Set if no active elements are true.
             Cleared otherwise.
        SF/OF/PF - Indicates whether the
             First/Last/All active elements of the result
             are true.
Vector VectorEQ (const Vector &ob, const Vector &val)
{
    Vector result;
    for (int x=0; x<VECLEN; ++x)
        result.v[x] = (ob.v[x] == val.v[x]);
    VectorTest(result);
    return(result);
}
```

Examples:

```
~p0; a = (b == c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 9 9 0 0 1 0 9 9 }
!p0; a = (b == c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 0 0 0 0 1 0 0 0 }
```

VectorGT

This instruction compares active vector elements and returns a result vector indicating whether the elements of the first parameter are greater-than elements of the second parameter. Inactive elements either remain unmodified, or are forced to zero, depending on the nature of the predication. This implementation of the instruction takes the result vector as an input and performs predication explicitly.

```
Flags:  ZF - Set if no active elements are true.
        Cleared otherwise.
        SF/OF/PF - Indicates whether the
        First/Last/All active elements of the result
        are true.
Vector VectorGT (const Vector &ob, const Vector &val)
{
    Vector result;
    for (int x=0; x<VECLEN; ++x)
        result.v[x] = (ob.v[x] > val.v[x]);
    VectorTest(result);
    return(result);
}
```

Examples:

```
~p0; a = (b > c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 9 9 1 1 0 0 9 9 }
!p0; a = (b > c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 0 0 1 1 0 0 0 0 }
```

VectorGE

This instruction compares active vector elements and returns a result vector indicating whether the elements of the first parameter are greater-than or equal-to elements of the second parameter. Inactive elements either remain unmodified, or are forced to zero, depending on the nature of the predication. This implementation of the instruction takes the result vector as an input and performs predication explicitly.

```
Flags:  ZF - Set if no active elements are true.
        Cleared otherwise.
        SF/OF/PF - Indicates whether the
        First/Last/All active elements of the result
        are true.
Vector VectorGE (const Vector &ob, const Vector &val)
{
    Vector result;
    for (int x=0; x<VECLEN; ++x)
        result.v[x] = (ob.v[x] >= val.v[x]);
    VectorTest(result);
    return(result);
}
```

Examples:

```
~p0; a = (b >= c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 9 9 1 1 1 0 9 9 }
!p0; a = (b >= c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 0 0 1 1 1 0 0 0 }
```

VectorNEQ

This instruction compares active vector elements and returns a result vector indicating whether the elements of the first parameter are non-equal to elements of the second parameter. Inactive elements either remain unmodified, or are forced to zero, depending on the nature of the predication. This implementation of the instruction takes the result vector as an input and performs predication explicitly.

```
Flags:  ZF - Set if no active elements are true.
        Cleared otherwise.
        SF/OF/PF - Indicates whether the
        First/Last/All active elements of the result
        are true.
Vector VectorNEQ (const Vector &ob, const Vector &val)
{
    Vector result;
    for (int x=0; x<VECLEN; ++x)
        result.v[x] = (ob.v[x] != val.v[x]);
    VectorTest(result);
    return(result);
}
```

Examples:

```
~p0; a = (b != c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 9 9 1 1 0 1 9 9 }
!p0; a = (b != c);
On Entry:  p0 = { 0 0 1 1 1 1 0 0 }
           a  = { 9 9 9 9 9 9 9 9 }
           b  = { 8 7 6 5 4 3 2 1 }
           c  = { 0 1 2 3 4 5 6 7 }
On Exit:   a  = { 0 0 1 1 0 1 0 0 }
```

Continue

This instruction logically negates active vector elements. Inactive elements either remain unmodified, or are forced to zero, depending on the nature of the predication. As shown below, in some embodiments, the instruction processes all elements equivalently; however, predication is performed by the assignment of the result, and should be considered an integral part of this instruction.

```
Flags:  ZF - Set if no active elements are true.
        Cleared otherwise.
        SF/OF/PF - Indicates whether the
        First/Last/All active elements of the result
        are true.
Vector Continue(Vector &p)
{
    Vector r;
    for (int x=0; x<VECLEN; ++x)
        r.v[x] = !p.v[x];
```

-continued

```
        VectorTest(r);
        return(r);
}
```

Examples:

```
~p0; a = Continue(b);
On Entry:  p0  = { 0  0  1  1  1  1  0  0 }
           a   = { 9  9  9  9  9  9  9  9 }
           b   = { 0 -2 -1  0  1  2  3  0 }
On Exit:   a   = { 9  9  0  1  0  0  9  9 }
!p0; a = Continue(b);
On Entry:  p0  = { 0  0  1  1  1  1  0  0 }
           a   = { 9  9  9  9  9  9  9  9 }
           b   = { 0 -2 -1  0  1  2  3  0 }
On Exit:   a   = { 0  0  0  1  0  0  0  0 }
```

Break

This instruction returns a vector containing ones in all positions before the first non-zero element position of its input, and zeroes all other positions. Predication is performed by the assignment of the result, and should be considered an integral part of this instruction.

```
Flags:  ZF - Set if no active elements are true.
        Cleared otherwise.
        SF/OF/PF - Indicates whether the
        First/Last/All active elements of the result
        are true.
Vector Break(Vector &p)
{
    Vector r = 0;
    for (int x=0; x<VECLEN; ++x)
    {
        if (p.v[x])
            break;
        r.v[x] = 1;
    }
    VectorTest(r);
    return(r);
}
```

Examples:

```
~p0; a = Break(b);
On Entry:  p0  = { 0  0  1  1  1  1  0  0 }
           a   = { 9  9  9  9  9  9  9  9 }
           b   = { 0  1  0  0  1  0  0  0 }
On Exit:   a   = { 9  9  1  1  0  0  9  9 }
!p0; a = Break(b);
On Entry:  p0  = { 0  0  1  1  1  1  0  0 }
           a   = { 9  9  9  9  9  9  9  9 }
           b   = { 0  1  0  0  1  0  0  0 }
On Exit:   a   = { 0  0  1  1  0  0  0  0 }
```

PreBreak

This instruction returns a vector containing zeroes in all positions after the first non-zero element position of its input, and ones in all other positions. Predication is performed by the assignment of the result, and should be considered an integral part of this instruction.

```
Flags:  ZF - Set if no active elements are true.
        Cleared otherwise.
        SF/OF/PF - Indicates whether the
        First/Last/All active elements of the result
        are true.
Vector PreBreak(Vector &p)
{
    Vector r = 0;
    for (int x=0; x<VECLEN; ++x)
    {
        r.v[x] = 1;
        if (p.v[x])
            break;
    }
    VectorTest(r);
    return(r);
}
```

Examples:

```
~p0; a = PreBreak(b);
On Entry:  p0  = { 0  0  1  1  1  1  0  0 }
           a   = { 9  9  9  9  9  9  9  9 }
           b   = { 0  1  0  0  1  0  0  0 }
On Exit:   a   = { 9  9  1  1  1  0  9  9 }
!p0; a = PreBreak(b);
On Entry:  p0  = { 0  0  1  1  1  1  0  0 }
           a   = { 9  9  9  9  9  9  9  9 }
           b   = { 0  1  0  0  1  0  0  0 }
On Exit:   a   = { 0  0  1  1  1  0  0  0 }
```

Remaining

This instruction sets all elements after the last non-zero element to 1, and all other elements to zero. An input vector of all zero elements returns all ones, and a vector of all non-zero returns all zeroes. As shown below, in some embodiments, the instruction processes all elements equivalently; however, predication is performed by the assignment of the result, and should be considered an integral part of this instruction.

```
Flags:  ZF - Set if no active elements are true.
        Cleared otherwise.
        SF/OF/PF - Indicates whether the
        First/Last/All active elements of the result
        are true.
Vector Remaining(Vector &p)
{
    Vector r = 0;
    int x;
    for (x=VECLEN-1; x>=0; --x)
        if (p.v[x])
            break;
    ++x;
    if(x == VECLEN)
        x = 0;
    for (; x<VECLEN; ++x)
        r.v[x] = 1;
    VectorTest(r);
    return(r);
}
```

Examples:

```
~p0; a = Remaining(b);
On Entry:  p0  = { 0  0  1  1  1  1  0  0 }
           a   = { 9  9  9  9  9  9  9  9 }
           b   = { 0  1  0  1  0  0  1  0 }
```

```
On Exit:     a  = { 9 9 0 0 1 1 9 9 }
!p0; a = Remaining(b);
On Entry:   p0  = { 0 0 1 1 1 1 0 0 }
            a   = { 9 9 9 9 9 9 9 9 }
            b   = { 0 1 0 1 0 0 1 0 }
On Exit:    a   = { 0 0 0 0 1 1 0 0 }
```

GeneratePredicates

This instruction takes a dependency index vector, DIV, and generates predicates corresponding to the next group of elements that may safely be processed in parallel, given the previous group that was processed which is indicated by prev. If no elements of prev are active, predicates are generated for the first group of elements that may safely be processed in parallel. If prev indicates that the final elements of the vector have been processed, then a result vector of inactive predicates is returned. The definition of GeneratePredicates follows. As shown below, in some embodiments, the instruction processes all elements equivalently; however, predication is performed by the assignment of the result, and should be considered an integral part of this instruction. (Note that GeneratePredicates uses the destination register as one of its inputs.)

```
Flags:  ZF - Set if no active elements are true.
        Cleared otherwise.
        SF/OF/PF - Indicates whether the
        First/Last/All active elements of the result
        are true
        CF - Indicates Last or None (CF = OF || ZF)
Vector GeneratePredicates(Vector &prev, Vector &index)
{
    Vector r = 0;
    int x, pos;
    for (pos=VECLEN-1; pos>=0; --pos)
        if (prev.v[pos])
            break;
    for (++pos; pos<VECLEN; ++pos) // start at next
    active position
        if (gPred.v[pos])
            break;
    for (x=pos; x<VECLEN; ++x)
    {
        if (index.v[x] > pos) // compare DIV (1-
        based) value to position (0-based)
            break;
        r.v[x] = 1;
    }
    VectorTest(r);
    gCarry = gLast || gNone;
    return(r);
}
```

Examples:

```
~p0; p1 = GeneratePredicates(p1,ix);
On Entry:   p0  = { 1 1 1 1 1 1 1 0 }
            p1  = { 0 0 0 0 0 0 0 0 }
            ix  = { 0 0 0 2 1 3 4 0 }
On Exit1:   p1  = { 1 1 1 0 0 0 0 0 }
On Entry:   p1  = { 1 1 1 0 0 0 0 0 }
On Exit2:   p1  = { 0 0 0 1 1 1 0 0 }
On Entry:   p1  = { 0 0 0 1 1 1 0 0 }
On Exit3:   p1  = { 0 0 0 0 0 0 1 0 }
!p0; p1 = GeneratePredicates(p1,ix);
On Entry:   p0  = { 1 1 1 1 1 1 1 0 }
            p1  = { 0 0 0 0 0 0 0 0 }
            ix  = { 0 0 0 2 1 3 4 0 }
```

```
On Exit1:   p1  = { 1 1 1 0 0 0 0 0 }
On Entry:   p1  = { 1 1 1 0 0 0 0 0 }
On Exit2:   p1  = { 0 0 0 1 1 1 0 0 }
On Entry:   p1  = { 0 0 0 1 1 1 0 0 }
On Exit3:   p1  = { 0 0 0 0 0 0 1 0 }
```

Actual

This instruction is employed by loops that use first-faulting instructions in speculation, in order to determine which elements were actually processed without masked faults, and narrow the vector size down to elements that are not affected by the masked faults. This instruction calculates which elements specified by the predicate parameter p have been processed without any faulting conditions. This is accomplished by consulting the fault-status register (see the description of the fault status register, above), and turning off (i.e., zeroing) elements of p that have either exhibited a faulting condition, or are in positions higher than an element that has exhibited a faulting condition. This instruction also resets the FSR registers to their default condition.

```
Flags:  ZF - Set if no active elements of the result
        are true. Cleared otherwise
        SF/OF/PF - Indicates whether the
        First/Last/All active elements of the result
        are true.
        CF - Indicates Last or None (CF = OF || ZF)
        FSR - Reset to default (no faulting
        conditions).
Vector Actual(const Vector &p)
{
    Vector r = 0;
    int x;
    for (x=0; x<VECLEN; ++x)
        if (gFSR[x] && gPred.v[x])
            break;
        else
            r.v[x] = p.v[x];
    VectorTest(r);
    gCarry = gLast || gNone;
    ResetFSR( );
    return(r);
}
```

Examples:

```
~p0; a = Actual(b);
On Entry:   FSR = { 0 0 0 0 0 1 0 0 }
            p0  = { 0 1 1 1 1 1 1 0 }
            a   = { 9 9 9 9 9 9 9 9 }
            b   = { 0 1 0 1 1 1 0 0 }
On Exit:    a   = { 9 1 0 1 1 0 0 9 }
            FSR = { 0 0 0 0 0 0 0 0 }
!p0; a = Actual(b);
On Entry:   FSR = { 0 0 0 0 0 1 0 0 }
            p0  = { 0 1 1 1 1 1 1 0 }
            a   = { 9 9 9 9 9 9 9 9 }
            b   = { 0 1 0 1 1 1 0 0 }
On Exit:    a   = { 0 1 0 1 1 0 0 0 }
            FSR = { 0 0 0 0 0 0 0 0 }
```

ActualFault1

This instruction is employed by loops that employ All-Faulting instructions in speculation and use Soft-Terminate Mode to avoid premature termination of the program. The ActualFault1 instruction is used where code is expected to execute when the loop termination condition is true, such as Do-While loops or after a PreBreak instruction. This instruction checks the loop-termination predicate p against the FSR and generates an exception if program should be terminated. This instruction also resets the FSR to its default state. This instruction does not modify any flags or registers.

```
Flags: FSR - Reset to default state.
void ActualFault1(const Vector &p)
{
    int x,s;
    for (s=0; s<VECLEN; ++s)
        if (gPred.v[s])
            break;
    for (x=s; x<VECLEN; ++x)
        if (gPred.v[x] && gFSR[x])
        {
            if (p.v[x])
                TriggerFault("ActualFault1");
            break;
        }
    ResetFSR( );
    return;
}
```

ActualFault2

This instruction is employed by loops that employ All-Faulting instructions in speculation and use Soft-Terminate Mode to avoid premature termination of the program. The ActualFault2 instruction is used where execution is not expected when the loop termination condition is true, such as While-Do loops or after a Break instruction. This instruction checks the loop-termination predicate p against the FSR and generates an exception if program should be terminated. This instruction also resets the FSR to its default state. This instruction does not modify any flags or registers.

```
Flags: FSR - Reset to default state.
void ActualFault2(const Vector &p)
{
    int x,s;
    for (s=0; s<VECLEN; ++s)
        if (gPred.v[s])
            break;
    for (x=s; x<VECLEN; ++x)
        if (gPred.v[x] && gFSR[x])
        {
            if (x > s)
                if (p.v[x-1] && gPred.v[x-1])
                    TriggerFault("ActualFault2"
                    );
            if (p.v[x])
                TriggerFault("ActualFault2");
            break;
        }
    ResetFSR( );
    return;
}
```

Hazard-Checking Instructions

The hazard-checking instructions enable a compiler to generate code that partitions the vector at run-time according to dynamic data and control-flow hazards that are unpredictable at compile time.

CheckHazardP

This instruction examines two vectors of memory addresses (or array indices), corresponding to two memory operations, for potential data dependencies through memory. The vector first holds addresses for the first memory operation, and the vector second holds addresses for the second operation. The predicate pred indicates which elements of second are to be operated upon. This instruction checks for addresses that overlap between each element of first and lower-numbered elements of second. In the case of multiple matches, only the highest-numbered position is recorded. As shown below, in some embodiments, the instruction processes all elements equivalently; however, predication is performed by the assignment of the result, and should be considered an integral part of this instruction.

The 1-based element position corresponding to the iteration that generates the data that is depended upon is stored in the destination vector at the element position corresponding to the iteration that is dependent upon the data. If no data dependency exists, a zero is stored in the destination vector at the element position corresponding to the iteration that does not have the dependency. Variants of this instruction should account for overlap between various sizes of data types.

The CheckHazardP instruction only supports zeroing predication. Non-zeroing predication is not allowed.

```
Vector CheckHazardP(Vector &first, Vector &second,
Vector &p)
{
    Vector result = 0;
    int x,y;
    for (x=0; x<VECLEN; ++x)
        for (y=0; y<x; ++y)
            if (p.v[y])
                if (OVERLAP(first.v[x], second.v[y]))
                    result.v[x] = y + 1;
    return(result);
}
```

Examples:

```
!p0; a = CheckHazardP(b,c,p1);
On Entry:  p0 = { 1  1  1  1  1  1  0  0 }
           a  = { 9  9  9  9  9  9  9  9 }
           b  = { 1  2  1  2  2  1  5  6 }
           c  = { 1  1  2  2  4  5  6  7 }
           p1 = { 1  1  0  1  1  1  1  1 }
On Exit:   a  = { 0  0  2  0  4  2  0  0 }
```

CheckHazardPx

This instruction examines two vectors of memory addresses (or array indices), corresponding to two memory operations, for potential data dependencies through memory. The vector first holds addresses for the first memory operation, and vector second holds addresses for the second operation. The predicate pred indicates which elements of second are to be operated upon. This instruction checks for addresses that overlap between each element of first, and lesser-or-equal-numbered elements of second. In the case of multiple matches, only the highest-numbered position is recorded. In the case of a match against an equal-numbered element position, the dependency is recorded in the next-highest position in the result. As shown below, in some embodiments, the instruction processes all elements equivalently; however, predication is performed by the assignment of the result, and should be considered an integral part of this instruction.

The 1-based element position corresponding to the iteration that generates the data that is depended upon is stored in the destination vector at the element position corresponding to the iteration that is dependent upon the data. If no data dependency exists, a zero is stored in the destination vector at the element position corresponding to the iteration that does not have the dependency. Variants of this instruction should account for overlap between various sizes of data types.

The CheckHazardPX instruction only supports zeroing predication. Non-zeroing predication is not allowed.

```
Vector CheckHazardPx(Vector &first, Vector &second,
Vector &p)
{
    Vector result = 0;
    int x,y;
    for (x=1; x<VECLEN; ++x)
    {
        for (y=0; y<x; ++y)
            if (p.v[y])
                if (OVERLAP(first.v[x],
    second.v[y]))
                    result.v[x] = y + 1;
                if ((OVERLAP(first.v[x−1], second.v[x−
    1]) && p.v[x−1]))
                    result.v[x] = x;
    }
    return(result);
}
```

Examples:

```
!p0; a = CheckHazardPx(b,c,p1);
On Entry:  p0  = { 1  1  1  1  1  1  1  0 }
           a   = { 9  9  9  9  9  9  9  9 }
           b   = { 1  1  2  2  5  6  3  6 }
           c   = { 1  2  2  3  4  5  6  6 }
           p1  = { 0  1  1  1  1  1  1  1 }
On Exit:   a   = { 0  0  2  3  0  0  4  0 }
```

ConditionalStop

This instruction takes the scalar parameter mode, which indicates any number of four possible transitions between true and false values of adjacent elements in predicate p that imply data dependencies. The parameter mode is a 4-bit field, the bits of which are defined as follows:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The 1-based (i.e., considering the vector as starting with element "1") element position corresponding to the iteration that generates the data that is depended upon is stored in the destination vector at the element position corresponding to the iteration that depends on the data. If no data dependency exists, a value of 0 is stored in the destination vector at that element. Note that the ConditionalStop instruction supports only zeroing; non-zeroing predication is illegal.

```
Vector ConditionalStop(Vector &p, int mode)
{
    Vector r = 0;
    for (int x=1; x<VECLEN; ++x) // Skip the first
    element
    {
        if (p.v[x−1] == 0 && p.v[x] == 0)
```

-continued

```
        {
            if (mode & kFF)
                r.v[x] = x;
        }
        else if (p.v[x−1] == 0 && p.v[x] == 1)
        {
            if (mode & kFT)
                r.v[x] = x;
        }
        else if (p.v[x−1] == 1 && p.v[x] == 0)
        {
            if (mode & kTF)
                r.v[x] = x;
        }
        else
        {
            if (mode & kTT)
                r.v[x] = x;
        }
    }
    return(r);
}
```

Examples:

```
!p0; a = ConditionalStop(b, kTF|kFT);
On Entry:  p0  = { 0  0  1  1  1  1  0  0 }
           a   = { 9  9  9  9  9  9  9  9 }
           b   = { 0  1  0  1  1  0  1  0 }
On Exit:   a   = { 0  0  2  3  0  5  0  0 }
```

Value Copy Propagation
PropagatePostT

This instruction propagates the value of active elements in s, as determined by predicate p, to subsequent inactive elements in the destination. Active elements remain unchanged, and any inactive elements that precede the first active element also remain unchanged. As shown below, in some embodiments, the instruction processes all elements equivalently; however, predication is performed by the assignment of the result, and should be considered an integral part of this instruction. Note that the PropagatePostT uses the destination register as one if its inputs.

```
Vector PropagatePostT(Vector &d, Vector &s, Vector &p)
{
    Vector r = 0;
    int x,y;
    for (x=0; x<VECLEN; ++x) // Until first active
    predicate, preserve dest
    {
        y = x;
        r.v[x] = d.v[x];
        if (gPred.v[x] && p.v[x])
            break;
    }
    for (++x; x<VECLEN; ++x)
        if (gPred.v[x] && p.v[x])
        {
            r.v[x] = d.v[x]; // While predicate ==
            1, preserve dest
            y = x;
        }
        else
            r.v[x] = s.v[y]; // While predicate ==
            0, copy final from source
    return(r);
}
```

Examples:

```
~p0; a = PropagatePostT(a,b,p1);
On Entry:  p0  = { 0  1  1  1  1  1  1  1 }
           a   = { 8  9  A  B  C  D  E  F }
           b   = { 0  1  2  3  4  5  6  7 }
           p1  = { 0  0  1  1  0  0  1  0 }
On Exit:   a   = { 8  9  A  B  3  3  E  6 }
!p0; a = PropagatePostT(a,b,p1);
On Entry:  p0  = { 0  1  1  1  1  1  1  1 }
           a   = { 8  9  A  B  C  D  E  F }
           b   = { 0  1  2  3  4  5  6  7 }
           p1  = { 0  0  1  1  0  0  1  0 }
On Exit:   a   = { 0  9  A  B  3  3  E  6 }
```

PropagatePriorF

This instruction propagates the value of the inactive elements of src, as determined by predicate p, into subsequent active elements. Inactive elements are copied from src to the destination. If the first element of predicate is active, then the last element of src is propagated to that position. As shown below, in some embodiments, the instruction processes all elements equivalently; however, predication is performed by the assignment of the result, and should be considered an integral part of this instruction.

```
Vector PropagatePriorF(Vector &src, Vector &p)
{
    Vector r = 0;
    int x,y;
    y = VECLEN – 1; // y is position of element to
    propagate
    for (x=0; x<VECLEN; ++x) // Destination unchanged
    until first active predicate
    {
        if (gPred.v[x] && p.v[x])
            break;
        r.v[x] = src.v[x];
        y = x;
    }
    for (; x<VECLEN; ++x)
    {
        if (gPred.v[x] && p.v[x])
        {
            r.v[x] = src.v[y]; // Propagate on
            active predicates
        }
        else
        {
            r.v[x] = src.v[x]; // Copy on inactive
            predicates
            y = x;
        }
    }
    return(r);
}
```

Examples:

```
~p0; a = PropagatePriorF(b,p1);
On Entry:  p0  = { 0  1  1  1  1  1  1  0 }
           a   = { 9  9  9  9  9  9  9  9 }
           b   = { 1  2  3  4  5  6  7  8 }
           p1  = { 0  0  1  1  0  0  1  0 }
On Exit:   a   = { 9  2  2  2  5  6  6  9 }
On Entry:  p0  = { 1  1  1  1  1  1  1  0 }
           a   = { 9  9  9  9  9  9  9  9 }
           b   = { 1  2  3  4  5  6  7  8 }
           p1  = { 1  1  0  1  0  0  1  1 }
On Exit:   a   = { 8  8  3  3  5  6  6  9 }
!p0; a = PropagatePriorF(b,p1);
On Entry:  p0  = { 0  1  1  1  1  1  1  0 }
           a   = { 9  9  9  9  9  9  9  9 }
           b   = { 1  2  3  4  5  6  7  8 }
           p1  = { 0  0  1  1  0  0  1  0 }
On Exit:   a   = { 0  2  2  2  5  6  6  0 }
On Entry:  p0  = { 1  1  1  1  1  1  1  0 }
           a   = { 9  9  9  9  9  9  9  9 }
           b   = { 1  2  3  4  5  6  7  8 }
           p1  = { 1  1  1  1  0  0  1  1 }
On Exit:   a   = { 8  8  3  3  5  6  6  0 }
```

CopyPropagate

This instruction copies active elements, as determined by p, from src to the destination register. Active elements are propagated into inactive elements in the process. Any initial inactive elements remain unchanged in the destination. As shown below, in some embodiments, the instruction processes all elements equivalently; however, predication is performed by the assignment of the result, and should be considered an integral part of this instruction. Note that CopyPropagate uses the destination register as one of its inputs.

```
Vector CopyPropagate(Vector &dest, Vector &src, Vector
&p)
{
    Vector r;
    int x,y;
    y = 0;
    for (x=0; x<VECLEN; ++x) // Find first active
    pred, dest unchanged
        if (p.v[x] && gPred.v[x])
            break;
        else
        {
            r.v[x] = dest.v[x];
            y = x;
        }
    for (; x<VECLEN; ++x) // If active: copy.   If
    inactive: propagate
    {
        if (p.v[x] && gPred.v[x])
        {
            r.v[x] = src.v[x];
            y = x;
        }
        else
            r.v[x] = src.v[y];
    }
    return(r);
}
```

Examples:

```
~p0; a = CopyPropagate(a,b,p1);
On Entry:  p0  = { 0  1  1  1  1  1  1  1 }
           a   = { 9  9  9  9  9  9  9  9 }
           b   = { 1  2  3  4  5  6  7  8 }
           p1  = { 0  0  1  1  0  0  1  0 }
On Exit:   a   = { 9  9  3  4  4  4  7  7 }
!p0; a = CopyPropagate(a,b,p1);
On Entry:  p0  = { 0  1  1  1  1  1  1  1 }
           a   = { 9  9  9  9  9  9  9  9 }
           b   = { 1  2  3  4  5  6  7  8 }
           p1  = { 0  0  1  1  0  0  1  0 }
On Exit:   a   = { 0  9  3  4  4  4  7  7 }
```

ShiftInRightP

This instruction shifts vector elements to the right, or propagates active values, as determined by input predicate p.

The first active element receives the input scalar j. The resulting vector is stored to the destination register. As shown below, in some embodiments, the instruction processes all elements equivalently; however, predication is performed by the assignment of the result, and should be considered an integral part of this instruction.

```
Vector ShiftInRightP(int j, const Vector &v, int &p)
{
    Vector r = 0;
    int x;
    r = v;
    for(x=0; x<VECLEN; ++x)
        if(gPred.v[x])
            break;
    r.v[x] = j;
    for (++x; x<VECLEN; ++x)
    {
        if (gPred.v[x] && p.v[x-1])
            r.v[x] = v.v[x-1];
        else if (gPred.v[x])
            r.v[x] = r.v[x-1];
        else
            r.v[x] = v.v[x-1];
    }
    return(r);
}
```

Examples:

```
~p0; a = ShiftInRightP(j,b,p1);
On Entry:   j  = 9
            p0 = { 0 0 1 1 1 1 1 1 }
            a  = { 1 2 3 4 5 6 7 8 }
            p1 = { 0 1 1 1 0 0 1 1 }
On Exit:    a  = { 1 2 9 3 4 4 4 7 }
!p0; a = ShiftInRightP(j,b,p1);
On Entry:   j  = 9
            p0 = { 0 0 1 1 1 1 1 1 }
            a  = { 1 2 3 4 5 6 7 8 }
            p1 = { 0 1 1 1 0 0 1 1 }
On Exit:    a  = { 0 0 9 3 4 4 4 7 }
```

ShiftInRight

This instruction shifts vector elements to the right, or propagates active values, as determined by input predicate p. The first element receives the input scalar j. The resulting vector is stored to the destination register. As shown below, in some embodiments, the instruction processes all elements equivalently; however, predication is performed by the assignment of the result, and should be considered an integral part of this instruction.

```
Vector ShiftInRight(int j, const Vector &v, int &p)
{
    Vector r = 0;
    int x;
    r.v[0] = j;
    for (x=1; x<VECLEN; ++x)
    {
        if (gPred.v[x] && p.v[x-1])
            r.v[x] = v.v[x-1];
        else if (gPred.v[x])
            r.v[x] = r.v[x-1];
        else
            r.v[x] = v.v[x-1];
    }
    return(r);
}
```

Examples:

```
~p0; a = ShiftInRightP(j,b,p1);
On Entry:   j  = 9
            p0 = { 0 0 1 1 1 1 1 1 }
            a  = { 1 2 3 4 5 6 7 8 }
            p1 = { 0 1 1 1 0 0 1 1 }
On Exit:    a  = { 1 2 9 3 4 4 4 7 }
!p0; a = ShiftInRightP(j,b,p1);
On Entry:   j  = 9
            p0 = { 0 0 1 1 1 1 1 1 }
            a  = { 1 2 3 4 5 6 7 8 }
            p1 = { 0 1 1 1 0 0 1 1 }
On Exit:    a  = { 0 0 9 3 4 4 4 7 }
```

ShiftRight

This instruction shift vector elements to the right, populating the first element with the input scalar j. The resulting vector is stored to the destination register.

```
Vector ShiftInRight(int j, const Vector &v)
{
    Vector r = 0;
    int x;
    r.v[0] = j;
    for (++x; x<VECLEN; ++x)
    {
        r.v[x] = v.v[x-1];
    }
    return(r);
}
```

Examples:

```
~p0; a = ShiftRight(j,b);
On Entry:   j  = 9
            p0 = { 1 1 1 0 0 1 1 1 }
            a  = { A A A A A A A A }
            b  = { 1 2 3 4 5 6 7 8 }
On Exit:    a  = { 9 1 2 A A 5 6 7 }
!p0; a = ShiftRight(j,b);
On Entry:   j  = 9
            p0 = { 1 1 1 0 0 1 1 1 }
            a  = { A A A A A A A A }
            b  = { 1 2 3 4 5 6 7 8 }
On Exit:    a  = { 9 1 2 0 0 5 6 7 }
```

SelectLast

Use of the ShiftInRightP instruction often requires that the shifted-out element be captured to be shifted in during the next pass. Normally this is accomplished using a simple scalar cast prior to the use of ShiftInRightP. In cases where the shifted-out value may come from more than one vector under control of predication, the SelectLast instruction is used to capture the last element from one of two vectors. Note that the final active element determines which element position p is evaluated for. This instruction is also useful at the end of nested loops and when consolidating vectors back into scalar variables at the end of a loop, or within loops that call functions that may reference global scalar variables.

```
int SelectLast(cont Vector &v1, const Vector &v2,
    const Vector &p)
{
    Vector r = 0;
    int x;
```

-continued

```
        for (x=VECLEN-1; x>=0; --x)
            if (gPred.v[x])
                break;
        if (x >= 0)
            if (p.v[x])
                r = v2.v[x];
            else
                r = v1.v[x];
        return(r);
}
```

Examples:

```
~p0; a = SelectLast(b,c,p1);
On Entry:   a  = 9
            p0 = { 1 1 0 0 1 1 0 0 }
            b  = { 1 2 3 4 5 6 7 8 }
            c  = { 9 8 7 6 5 4 3 2 }
            p1 = { 0 0 1 1 1 0 0 1 }
On Exit:    a  = 6
!p0; a = SelectLast(b,c,p1);
On Entry:   a  = 9
            p0 = { 1 1 0 0 1 1 0 0 }
            b  = { 1 2 3 4 5 6 7 8 }
            c  = { 9 8 7 6 5 4 3 2 }
            p1 = { 0 0 1 1 1 1 0 1 }
On Exit:    a  = 4
```

SelectFirst

The SelectFirst instruction selects the first actively predicated from either v1 or v2, as determined by the value of corresponding element in p. This instruction is useful at the end of nested loops and when consolidating vectors back into scalar variables at the end of a loop, or within loops that call functions that may reference global scalar variables.

```
int SelectFirst(cont Vector &v1, const Vector &v2,
                const Vector &p)
{
    Vector r = 0;
    int x;
    for (x=0; x<VECLEN; ++x)
        if (gPred.v[x])
            break;
        if (p.v[x])
            r = v2.v[x];
        else
            r = v1.v[x];
    return(r);
}
```

Examples:

```
~p0; a = SelectFirst(b,c,p1);
On Entry:   a  = 9
            p0 = { 0 0 1 1 0 0 1 1 }
            b  = { 1 2 3 4 5 6 7 8 }
            c  = { 9 8 7 6 5 4 3 2 }
            p1 = { 0 0 0 1 1 0 0 1 }
On Exit:    a  = 3
!p0; a = SelectFirst(b,c,p1);
On Entry:   a  = 9
            p0 = { 0 0 1 1 0 0 1 1 }
            b  = { 1 2 3 4 5 6 7 8 }
            c  = { 9 8 7 6 5 4 3 2 }
            p1 = { 0 0 1 1 1 1 0 1 }
On Exit:    a  = 7
```

Associative Reduction Operations

By encapsulating conditionally executed associative reduction operations, these instructions allow the compiler to eliminate some loop-carried dependencies altogether, replacing them with the single vector instruction that can be executed in parallel. Each of these instructions comes in two variants. One variant produces a vector of result values corresponding to the reduction value just before the operation is applied. The other variant produces a vector of result values corresponding to the reduction value just after the operation is applied. Both variants are often needed to vectorize loops.

IncrPropagate1

Using the value of the first active element in s as a basis, this instruction cumulatively increments this basis for every active element specified by predicate p. Inactive elements prior to the first active elements are copied into the destination. This instruction stores the values prior to being incremented into the destination register. As shown below, in some embodiments, the instruction processes all elements equivalently; however, predication is performed by the assignment of the result, and should be considered an integral part of this instruction.

```
Vector IncrPropagate1(Vector &s, Vector &p)
{
    Vector r;
    int x,v;
    for (x=0; x<VECLEN; ++x)
    {
        if (gPred.v[x] && p.v[x])
        {
            v = s.v[x];
            break;
        }
        r.v[x] = s.v[x];
    }
    for (; x<VECLEN; ++x)
    {
        r.v[x] = v;
        if (gPred.v[x] && p.v[x])
            ++v;
    }
    return(r);
}
```

Examples:

```
~p0; a = IncrPropagate1(b,p1);
On Entry:   p0 = { 1 1 1 1 1 1 1 0 }
            a  = { 9 9 9 9 9 9 9 9 }
            b  = { 3 3 3 3 3 3 3 3 }
            p1 = { 0 1 1 0 0 1 1 0 }
On Exit:    a  = { 3 3 4 5 5 5 6 9 }
!p0; a = IncrPropagate1(b,p1);
On Entry:   p0 = { 1 1 1 1 1 1 1 0 }
            a  = { 9 9 9 9 9 9 9 9 }
            b  = { 3 3 3 3 3 3 3 3 }
            p1 = { 0 1 1 0 0 1 1 0 }
On Exit:    a  = { 3 3 4 5 5 5 6 0 }
```

IncrPropagate2

Using the value of the first active element in s as a basis, this instruction cumulatively increments this basis for every active element specified by predicate p. Inactive elements prior to the first active elements are copied into the destination. This instruction stores the values after being incremented into the destination register. As shown below, in some embodiments, the instruction processes all elements equivalently; however, predication is performed by the assignment of the result, and should be considered an integral part of this instruction.

```
Vector IncrPropagate2(Vector &s, Vector &p)
{
    Vector r;
    int x,v;
    for (x=0; x<VECLEN; ++x)
    {
        if (gPred.v[x] && p.v[x])
        {
            v = s.v[x];
            break;
        }
        r.v[x] = s.v[x];
    }
    for (; x<VECLEN; ++x)
    {
        if (gPred.v[x] && p.v[x])
            ++v;
        r.v[x] = v;
    }
    return(r);
}
```

Examples:

```
~p0; a = IncrPropagate2(b,p1);
On Entry:   p0  = { 1 1 1 1 1 1 1 0 }
            a   = { 9 9 9 9 9 9 9 9 }
            b   = { 3 3 3 3 3 3 3 3 }
            p1  = { 0 1 1 0 0 1 1 0 }
On Exit:    a   = { 3 4 5 5 5 6 7 9 }
!p0; a = IncrPropagate2(b,p1);
On Entry:   p0  = { 1 1 1 1 1 1 1 0 }
            a   = { 9 9 9 9 9 9 9 9 }
            b   = { 3 3 3 3 3 3 3 3 }
            p1  = { 0 1 1 0 0 1 1 0 }
On Exit:    a   = { 3 4 5 5 5 6 7 0 }
```

DecrPropagate1

Using the value of the first active element in s as a basis, this instruction cumulatively decrements this basis for every active element specified by predicate p. Inactive elements prior to the first active elements are copied into the destination. This instruction stores the values prior to being decremented into the destination register. As shown below, in some embodiments, the instruction processes all elements equivalently; however, predication is performed by the assignment of the result, and should be considered an integral part of this instruction.

```
Vector DecrPropagate1(Vector &s, Vector &p)
{
    Vector r;
    int x,v;
    for (x=0; x<VECLEN; ++x)
    {
        if (gPred.v[x] && p.v[x])
        {
            v = s.v[x];
            break;
        }
        r.v[x] = s.v[x];
    }
    for (; x<VECLEN; ++x)
    {
        r.v[x] = v;
        if (gPred.v[x] && p.v[x])
            --v;
    }
    return(r);
}
```

Examples:

```
~p0; a = DecrPropagate1(b,p1);
On Entry:   p0  = { 1 1 1 1 1 1 1 0 }
            a   = { 9 9 9 9 9 9 9 9 }
            b   = { 7 7 7 7 7 7 7 7 }
            p1  = { 0 1 1 0 0 1 1 0 }
On Exit:    a   = { 7 7 6 5 5 5 4 9 }
!p0; a = DecrPropagate1(b,p1);
On Entry:   p0  = { 1 1 1 1 1 1 1 0 }
            a   = { 9 9 9 9 9 9 9 9 }
            b   = { 7 7 7 7 7 7 7 7 }
            p1  = { 0 1 1 0 0 1 1 0 }
On Exit:    a   = { 7 7 6 5 5 5 4 0 }
```

DecrPropagate2

Using the value of the first active element in s as a basis, this instruction cumulatively decrements this basis for every active element specified by predicate p. Inactive elements prior to the first active elements are copied into the destination. This instruction stores the values after being decremented into the destination register. As shown below, in some embodiments, the instruction processes all elements equivalently; however, predication is performed by the assignment of the result, and should be considered an integral part of this instruction.

```
Vector DecrPropagate2(Vector &s, Vector &p)
{
    Vector r;
    int x,v;
    for (x=0; x<VECLEN; ++x)
    {
        if (gPred.v[x] && p.v[x])
        {
            v = s.v[x];
            break;
        }
        r.v[x] = s.v[x];
    }
    for (; x<VECLEN; ++x)
    {
        if (gPred.v[x] && p.v[x])
            --v;
        r.v[x] = v;
    }
    return(r);
}
```

Examples:

```
~p0; a = DecrPropagate2(b,p1);
On Entry:   p0  = { 1 1 1 1 1 1 1 0 }
            a   = { 9 9 9 9 9 9 9 9 }
            b   = { 7 7 7 7 7 7 7 7 }
            p1  = { 0 1 1 0 0 1 1 0 }
On Exit:    a   = { 7 6 5 5 5 4 3 9 }
!p0; a = DecrPropagate2(b,p1);
On Entry:   p0  = { 1 1 1 1 1 1 1 0 }
            a   = { 9 9 9 9 9 9 9 9 }
            b   = { 7 7 7 7 7 7 7 7 }
            p1  = { 0 1 1 0 0 1 1 0 }
On Exit:    a   = { 7 6 5 5 5 4 3 0 }
```

RunningSum1P

Using the value of the first active element in a as a basis, this instruction adds the cumulative amounts specified by active elements in b to this basis. Predicate p determines which elements participate in the accumulation of addends.

Inactive elements prior to the first active elements are copied into the destination. This instruction stores the values prior to being added into the destination register. As shown below, in some embodiments, the instruction processes all elements equivalently; however, predication is performed by the assignment of the result, and should be considered an integral part of this instruction. Note that the RunningSum1P instruction uses the destination register as one of its inputs.

```
Vector RunningSum1P(const Vector &a, const Vector &b,
const Vector &p)
{
    Vector r;
    int s, x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        r.v[x] = s;
        if ((gPred.v[x]) && (p.v[x]))
            s += b.v[x];
    }
    return(r);
}
```

Examples:

```
~p0; a = RunningSum1P(a,b,p1);
On Entry:  p0 = { 1  1  1  1  1  0  1  0 }
           a  = { 0  1  2  3  4  5  6  7 }
           b  = { 1  2  3  4  5  6  7  8 }
           p1 = { 1  0  1  0  1  1  1  0 }
On Exit:   a  = { 0  1  1  4  4  5  9  7 }
!p0; a = RunningSum1P(a,b,p1);
On Entry:  p0 = { 1  1  1  1  1  0  1  0 }
           a  = { 0  1  2  3  4  5  6  7 }
           b  = { 1  2  3  4  5  6  7  8 }
           p1 = { 1  0  1  0  1  1  1  0 }
On Exit:   a  = { 0  1  1  4  4  0  9  0 }
```

RunningSum2P

Using the value of the first active element in a as a basis, this instruction adds the cumulative amounts specified by active elements in b to this basis. Predicate p determines which elements participate in the accumulation of addends. Inactive elements prior to the first active elements are copied into the destination. This instruction stores the values after being added into the destination register. As shown below, in some embodiments, the instruction processes all elements equivalently; however, predication is performed by the assignment of the result, and should be considered an integral part of this instruction. Note that the RunningSum2P instruction uses the destination register as one of its inputs.

```
Vector RunningSum2P(const Vector &a, const Vector &b,
const Vector &p)
{
    Vector r;
    int s, x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        if ((gPred.v[x]) && (p.v[x]))
            s += b.v[x];
        r.v[x] = s;
    }
    return(r);
}
```

Examples:

```
~p0; a = RunningSum2P(a,b,p1);
On Entry:  p0 = { 1  1  1  1  1  0  1  0 }
           a  = { 0  1  2  3  4  5  6  7 }
           b  = { 1  2  3  4  5  6  7  8 }
           p1 = { 1  0  1  0  1  1  1  0 }
On Exit:   a  = { 1  1  4  4  9  5 16  7 }
!p0; a = RunningSum2P(a,b,p1);
On Entry:  p0 = { 1  1  1  1  1  0  1  0 }
           a  = { 0  1  2  3  4  5  6  7 }
           b  = { 1  2  3  4  5  6  7  8 }
           p1 = { 1  0  1  0  1  1  1  0 }
On Exit:   a  = { 1  1  4  4  9  0 16  0 }
```

RunningShift1R

Using the value of the first active element in a as a basis, this instruction right-shifts this basis by the cumulative number of bits specified by active elements in b. Predicate p determines which elements participate in the accumulation of shift-counts. Inactive elements prior to the first active elements are copied into the destination. This instruction stores the values prior to being shifted into the destination register. As shown below, in some embodiments, the instruction processes all elements equivalently; however, predication is performed by the assignment of the result, and should be considered an integral part of this instruction. Note that the RunningShift1R instruction uses the destination register as one of its inputs.

```
Vector RunningShift1R(const Vector &a, const Vector
&b, const Vector &p)
{
    Vector r;
    int s, x;
    s = 0;
    for (x=0; x<VECLEN; ++x)
    {
        if (gPred.v[x] && p.v[x])
        {
            s = a.v[x];
            break;
        }
        else
            r.v[x] = a.v[x];
    }
    for (; x<VECLEN; ++x)
    {
        r.v[x] = s;
```

```
        if (gPred.v[x] && p.v[x])
            s >>= b.v[x];
    }
    return(r);
}
```

Examples:

```
~p0; a = RunningShift1R(a,b,p1);
On Entry:   p0  = { 1  1  1  1  1  1  1  0 }
            a   = { 64 64 64 64 64 64 64 64 }
            b   = { 0  1  1  2  2  3  3  4 }
            p1  = { 0  1  1  0  0  1  1  0 }
On Exit:    a   = { 64 64 32 16 16 16 2  64 }
!p0; a = RunningShift1R(a,b,p1);
On Entry:   p0  = { 1  1  1  1  1  1  1  0 }
            a   = { 64 64 64 64 64 64 64 64 }
            b   = { 0  1  1  2  2  3  3  4 }
            p1  = { 0  1  1  0  0  1  1  0 }
On Exit:    a   = { 64 64 32 16 16 16 2  0 }
```

RunningShift2R

Using the value of the first active element in a as a basis, this instruction right-shifts this basis by the cumulative number of bits specified by active elements in b. Predicate p determines which elements participate in the accumulation of shift-counts. Inactive elements prior to the first active elements are copied into the destination. This instruction stores the values after being shifted into the destination register. As shown below, in some embodiments, the instruction processes all elements equivalently; however, predication is performed by the assignment of the result, and should be considered an integral part of this instruction. Note that the RunningShift2R instruction uses the destination register as one of its inputs.

```
Vector RunningShift2R(const Vector &a, const Vector
&b, const Vector &p)
{
    Vector r;
    int s, x;
    s = 0;
    for (x=0; x<VECLEN; ++x)
    {
        if (gPred.v[x] && p.v[x])
        {
            s = a.v[x];
            break;
        }
        else
            r.v[x] = a.v[x];
    }
    for (; x<VECLEN; ++x)
    {
        if (gPred.v[x] && p.v[x])
            s >>= b.v[x];
        r.v[x] = s;
    }
    return(r);
}
```

Examples:

```
~p0; a = RunningShift2R(a,b,p1);
On Entry:   p0  = { 1  1  1  1  1  1  1  0 }
            a   = { 64 64 64 64 64 64 64 64 }
            b   = { 0  1  1  2  2  3  3  4 }
            p1  = { 0  1  1  0  0  1  1  0 }
On Exit:    a   = { 64 32 16 16 16 2  0  64 }
!p0; a = RunningShift2R(a,b,p1);
On Entry:   p0  = { 1  1  1  1  1  1  1  0 }
            a   = { 64 64 64 64 64 64 64 64 }
            b   = { 0  1  1  2  2  3  3  4 }
            p1  = { 0  1  1  0  0  1  1  0 }
On Exit:    a   = { 64 32 16 16 16 2  0  0 }
```

RunningShift1L

Using the value of the first active element in a as a basis, this instruction left-shifts this basis by the cumulative number of bits specified by active elements in b. Predicate p determines which elements participate in the accumulation of shift-counts. Inactive elements prior to the first active elements are copied into the destination. This instruction stores the values prior to being shifted into the destination register. As shown below, in some embodiments, the instruction processes all elements equivalently; however, predication is performed by the assignment of the result, and should be considered an integral part of this instruction. Note that the RunningShift1L instruction uses the destination register as one of its inputs.

```
Vector RunningShift1L(const Vector &a, const Vector
&b, const Vector &p)
{
    Vector r;
    int s, x;
    s = 0;
    for (x=0; x<VECLEN; ++x)
    {
        if (gPred.v[x] && p.v[x])
        {
            s = a.v[x];
            break;
        }
        else
            r.v[x] = a.v[x];
    }
    for (; x<VECLEN; ++x)
    {
        r.v[x] = s;
        if (gPred.v[x] && p.v[x])
            s <<= b.v[x];
    }
    return(r);
}
```

Examples:

```
~p0; a = RunningShift1L(a,b,p1);
On Entry:   p0  = { 1  1  1  1  1  1  1  0 }
            a   = { 0  1  2  3  4  5  6  7 }
            b   = { 0  1  1  1  2  2  2  3 }
            p1  = { 0  1  1  0  0  1  1  0 }
On Exit:    a   = { 0  1  2  4  4  4  16 7 }
!p0; a = RunningShift1L(a,b,p1);
On Entry:   p0  = { 1  1  1  1  1  1  1  0 }
            a   = { 0  1  2  3  4  5  6  7 }
            b   = { 0  1  1  1  2  2  2  3 }
            p1  = { 0  1  1  0  0  1  1  0 }
On Exit:    a   = { 0  1  2  4  4  4  16 0 }
```

RunningShift2L

Using the value of the first active element in a as a basis, this instruction left-shifts this basis by the cumulative number of bits specified by active elements in b. Predicate p determines which elements participate in the accumulation of shift-counts. Inactive elements prior to the first active elements are copied into the destination. This instruction stores the values after being shifted into the destination register. As shown below, in some embodiments, the instruction processes all elements equivalently; however, predication is performed by the assignment of the result, and should be considered an integral part of this instruction. Note that the RunningShift2L instruction uses the destination register as one of its inputs.

```
Vector RunningShift2L(const Vector &a, const Vector
&b, const Vector &p)
{
    Vector r;
    int s, x;
    s = 0;
    for (x=0; x<VECLEN; ++x)
    {
        if (gPred.v[x] && p.v[x])
        {
            s = a.v[x];
            break;
        }
        else
            r.v[x] = a.v[x];
    }
    for (; x<VECLEN; ++x)
    {
        if (gPred.v[x] && p.v[x])
            s <<= b.v[x];
        r.v[x] = s;
    }
    return(r);
}
```

Examples:

```
~p0; a = RunningShift2L(a,b,p1);
On Entry:  p0 = { 1  1  1  1  1  1  1  0 }
           a  = { 0  1  2  3  4  5  6  7 }
           b  = { 0  1  1  1  2  2  2  3 }
           p1 = { 0  1  1  0  0  1  1  0 }
On Exit:   a  = { 0  2  4  4  4 16 64  7 }
!p0; a = RunningShift2L(a,b,p1);
On Entry:  p0 = { 1  1  1  1  1  1  1  0 }
           a  = { 0  1  2  3  4  5  6  7 }
           b  = { 0  1  1  1  2  2  2  3 }
           p1 = { 0  1  1  0  0  1  1  0 }
On Exit:   a  = { 0  2  4  4  4 16 64  0 }
```

RunningMin1P

Using the value of the first active element in a as a basis, the RunningMin1P instruction calculates the cumulative minima with active elements in b from this basis. Predicate p determines which elements participate in the accumulation of addends. Inactive elements prior to the first active elements are copied into the destination. This instruction stores the values prior to being added into the destination register. As shown below, in some embodiments, the instruction processes all elements equivalently; however, predication is performed by the assignment of the result, and should be considered an integral part of this instruction. Note that RunningMin1P uses the destination register as one of its inputs.

```
Vector RunningMin1P(const Vector &a, const Vector &b,
const Vector &p)
{
    Vector r;
    int s, x;
    s = 0;
```

```
for (x=0; x<VECLEN; ++x)
{
    if ((gPred.v[x]) && (p.v[x]))
    {
        s = a.v[x];
        break;
    }
    else
        r.v[x] = a.v[x];
}
for (; x<VECLEN; ++x)
{
    r.v[x] = s;
    if ((gPred.v[x]) && (p.v[x]))
        s = MIN(s, b.v[x]);
}
return(r);
}
```

Examples:

```
~p0; a = RunningMin1P(a,b,p1);
On Entry:  p0 = { 0  0  1  1  0  1  1  1 }
           a  = { 0  1  D  C  B  A  9  8 }
           b  = { 2  3  4  5  2  5  3  1 }
           p1 = { 1  0  1  0  0  1  1  0 }
On Exit:   a  = { 0  1  D  4  B  4  4  3 }
!p0; a = RunningMin1P(a,b,p1);
On Entry:  p0 = { 0  0  1  1  0  1  1  1 }
           a  = { 0  1  D  C  B  A  9  8 }
           b  = { 2  3  4  5  2  5  3  1 }
           p1 = { 1  0  1  0  0  1  1  0 }
On Exit:   a  = { 0  0  D  4  0  4  4  3 }
```

RunningMin2P

Using the value of the first active element in a as a basis, the RunningMin2P instruction calculates the cumulative minima with active elements in b from this basis. Predicate p determines which elements participate in the accumulation of addends. Inactive elements prior to the first active elements are copied into the destination. This instruction stores the values after being added into the destination register. As shown below, in some embodiments, the instruction processes all elements equivalently; however, predication is performed by the assignment of the result, and should be considered an integral part of this instruction. Note that RunningMin2P uses the destination register as one of its inputs.

```
Vector RunningMin2P(const Vector &a, const Vector &b,
const Vector &p)
{
    Vector r;
    int s, x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        if ((gPred.v[x]) && (p.v[x]))
            s = MIN(s, b.v[x]);
        r.v[x] = s;
```

-continued

```
        }
        return(r);
}
```

Examples:

```
~p0; a = RunningMin2P(a,b,p1);
On Entry:  p0 =  { 0  0  1  1  0  1  1  1 }
           a  =  { 0  1  D  C  B  A  9  8 }
           b  =  { 2  3  4  5  2  5  3  1 }
           p1 =  { 1  0  1  0  0  1  1  0 }
On Exit:   a  =  { 0  1  4  4  B  4  3  3 }
!p0; a =   RunningMin2P(a,b,p1);
On Entry:  p0 =  { 0  0  1  1  0  1  1  1 }
           a  =  { 0  1  D  C  B  A  9  8 }
           b  =  { 2  3  4  5  2  5  3  1 }
           p1 =  { 1  0  1  0  0  1  1  0 }
On Exit:   a  =  { 0  0  4  4  0  4  3  3 }
```

RunningMax1P

Using the value of the first active element in a as a basis, the RunningMax1P instruction calculates the cumulative maxima with active elements in b from this basis. Predicate p determines which elements participate in the accumulation of addends. Inactive elements prior to the first active elements are copied into the destination. This instruction stores the values prior to being added into the destination register. As shown below, in some embodiments, the instruction processes all elements equivalently; however, predication is performed by the assignment of the result, and should be considered an integral part of this instruction. Note that RunningMax1P uses the destination register as one of its inputs.

```
Vector RunningMax1P(const Vector &a, const Vector &b,
    const Vector &p)
{
    Vector r;
    int s,x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        r.v[x] = s;
        if ((gPred.v[x]) && (p.v[x]))
            s = MAX(s, b.v[x]);
    }
    return(r);
}
```

Examples:

```
~p0; a = RunningMax1P(a,b,p1);
On Entry:  p0 =  { 0  0  1  1  0  1  1  1 }
           a  =  { 6  7  2  3  4  5  6  7 }
           b  =  { 8  9  1  4  5  6  7  8 }
           p1 =  { 1  0  1  0  1  1  1  0 }
On Exit:   a  =  { 6  7  2  2  4  2  6  7 }
!p0; a = RunningMax1P(a,b,p1);
On Entry:  p0 =  { 0  0  1  1  0  1  1  1 }
           a  =  { 6  7  2  3  4  5  6  7 }
           b  =  { 8  9  1  4  5  6  7  8 }
           p1 =  { 1  0  1  0  1  1  1  0 }
On Exit:   a  =  { 0  0  2  2  0  2  6  7 }
```

RunningMax2P

Using the value of the first active element in a as a basis, the RunningMax2P instruction calculates the cumulative maxima with active elements in b from this basis. Predicate p determines which elements participate in the accumulation of addends. Inactive elements prior to the first active elements are copied into the destination. This instruction stores the values after being added into the destination register. As shown below, in some embodiments, the instruction processes all elements equivalently; however, predication is performed by the assignment of the result, and should be considered an integral part of this instruction. Note that RunningMax2P uses the destination register as one of its inputs.

```
Vector RunningMax2P(const Vector &a, const Vector &b,
    const Vector &p)
{
    Vector r;
    int s,x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        if ((gPred.v[x]) && (p.v[x]))
            s = MAX(s, b.v[x]);
        r.v[x] = s;
    }
    return(r);
}
```

Examples:

```
~p0; a = RunningMax2P(a,b,p1);
On Entry:  p0 =  { 0  0  1  1  0  1  1  1 }
           a  =  { 6  7  2  3  4  5  6  7 }
           b  =  { 8  9  1  4  5  6  7  8 }
           p1 =  { 1  0  1  0  1  1  1  0 }
On Exit:   a  =  { 6  7  2  2  4  6  7  7 }
!p0; a = RunningMax2P(a,b,p1);
On Entry:  p0 =  { 0  0  1  1  0  1  1  1 }
           a  =  { 6  7  2  3  4  5  6  7 }
           b  =  { 8  9  1  4  5  6  7  8 }
           p1 =  { 1  0  1  0  1  1  1  0 }
On Exit:   a  =  { 0  0  2  2  0  6  7  7 }
```

RunningAnd1P

Using the value of the first active element in a as a basis, the RunningAnd1P instruction calculates the cumulative bitwise AND with active elements in b from this basis. Predicate p determines which elements participate in the AND operation. Inactive elements prior to the first active elements are copied into the destination. This instruction stores the values prior to being ANDed into the destination register. As shown below, in some embodiments, the instruction processes all elements equivalently; however, predication is performed by the assignment of the result, and should be considered an integral part of this instruction. Note that RunningAnd1P uses the destination register as one of its inputs.

```
Vector RunningAnd1P(const Vector &a, const Vector &b,
const Vector &p)
{
    Vector r;
    int s, x;
    s = -1;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        r.v[x] = s;
        if ((gPred.v[x]) && (p.v[x]))
            s &= b.v[x];
    }
    return(r);
}
```

Examples:

```
~p0; a = RunningAnd1P(a,b,p1);
On Entry:  p0 = { 1  1  1  1  1  0  1  0 }
           a  = { 7 15  0  1  2  3  4  5 }
           b  = { 7 15  7  1  6  1  4  7 }
           p1 = { 0  1  1  0  1  1  1  0 }
On Exit:   a  = { 7 15 15  7  7  3  6  5 }
!p0; a = RunningAnd1P(a,b,p1);
On Entry:  p0 = { 1  1  1  1  1  0  1  0 }
           a  = { 7 15  0  1  2  3  4  5 }
           b  = { 7 15  7  1  6  1  4  7 }
           p1 = { 0  1  1  0  1  1  1  0 }
On Exit:   a  = { 7 15 15  7  7  0  6  0 }
```

RunningAnd2P

Using the value of the first active element in a as a basis, this instruction calculates the cumulative bitwise AND with active elements in b from this basis. Predicate p determines which elements participate in the AND operation. Inactive elements prior to the first active elements are copied into the destination. This instruction stores the values after being ANDed into the destination register. As shown below, in some embodiments, the instruction processes all elements equivalently; however, predication is performed by the assignment of the result, and should be considered an integral part of this instruction. Note that RunningAnd2P uses the destination register as one of its inputs.

```
Vector RunningAnd2P(const Vector &a, const Vector &b,
const Vector &p)
{
    Vector r;
    int s, x;
    s = -1;
    for (x=0; x<VECLEN; ++x)
    {
```

```
        if ((gPred.v[x]) && (p.v[x]))
        {
            s = a.v[x];
            break;
        }
        else
            r.v[x] = a.v[x];
    }
    for (; x<VECLEN; ++x)
    {
        if ((gPred.v[x]) && (p.v[x]))
            s &= b.v[x];
        r.v[x] = s;
    }
    return(r);
}
```

Examples:

```
~p0; a = RunningAnd2P(a,b,p1);
On Entry:  p0 = { 1  1  1  1  1  0  1  0 }
           a  = { 7 15  0  1  2  3  4  5 }
           b  = { 7 15  7  1  6  1  4  7 }
           p1 = { 0  1  1  0  1  1  1  0 }
On Exit:   a  = { 7 15  7  7  6  3  4  5 }
!p0; a = RunningAnd2P(a,b,p1);
On Entry:  p0 = { 1  1  1  1  1  0  1  0 }
           a  = { 7 15  0  1  2  3  4  5 }
           b  = { 7 15  7  1  6  1  4  7 }
           p1 = { 0  1  1  0  1  1  1  0 }
On Exit:   a  = { 7 15  7  7  6  0  4  0 }
```

RunningOr1P

Using the value of the first active element in a as a basis, this instruction calculates the cumulative bitwise OR with active elements in b from this basis. Predicate p determines which elements participate in the OR operation. Inactive elements prior to the first active elements are copied into the destination. This instruction stores the values prior to being ORed into the destination register. As shown below, in some embodiments, the instruction processes all elements equivalently; however, predication is performed by the assignment of the result, and should be considered an integral part of this instruction. Note that RunningOr1P uses the destination register as one of its inputs.

```
Vector RunningOr1P(const Vector &a, const Vector &b,
const Vector &p)
{
    Vector r;
    int s, x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        r.v[x] = s;
        if ((gPred.v[x]) && (p.v[x]))
            s |= b.v[x];
    }
    return(r);
}
```

Examples:

```
~p0; a = RunningOr1P(a,b,p1);
On Entry:  p0 = { 1  1  1  1  1  0  1  0 }
           a  = { 7  1  9  9  9  9  9  9 }
           b  = { 7  2  1  2  3  4  5  6 }
           p1 = { 0  1  1  0  1  1  1  0 }
On Exit:   a  = { 7  1  3  3  3  9  3  9 }
!p0; a = RunningOr1P(a,b,p1);
On Entry:  p0 = { 1  1  1  1  1  0  1  0 }
           a  = { 7  1  9  9  9  9  9  9 }
           b  = { 7  2  1  2  3  4  5  6 }
           p1 = { 0  1  1  0  1  1  1  0 }
On Exit:   a  = { 7  1  3  3  3  0  3  0 }
```

RunningOr2P

Using the value of the first active element in a as a basis, this instruction calculates the cumulative bitwise OR with active elements in b from this basis. Predicate p determines which elements participate in the OR operation. Inactive elements prior to the first active elements are copied into the destination. This instruction stores the values after being ORed into the destination register. As shown below, in some embodiments, the instruction processes all elements equivalently; however, predication is performed by the assignment of the result, and should be considered an integral part of this instruction. Note that RunningOr2P uses the destination register as one of its inputs.

```
Vector RunningOr2P(const Vector &a, const Vector &b,
  const Vector &p)
{
    Vector r;
    int s, x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        if ((gPred.v[x]) && (p.v[x]))
            s |= b.v[x];
        r.v[x] = s;
    }
    return(r);
}
```

Examples:

```
~p0; a = RunningOr2P(a,b,p1);
On Entry:  p0 = { 1  1  1  1  1  0  1  0 }
           a  = { 7  1  9  9  9  9  9  9 }
           b  = { 7  2  1  2  3  4  5  6 }
           p1 = { 0  1  1  0  1  1  1  0 }
On Exit:   a  = { 7  3  3  3  3  9  7  9 }
!p0; a = RunningOr2P(a,b,p1);
On Entry:  p0 = { 1  1  1  1  1  0  1  0 }
           a  = { 7  1  9  9  9  9  9  9 }
           b  = { 7  2  1  2  3  4  5  6 }
           p1 = { 0  1  1  0  1  1  1  0 }
On Exit:   a  = { 7  3  3  3  3  0  7  0 }
```

RunningXor1P

Using the value of the first active element in a as a basis, this instruction calculates the cumulative bitwise XOR with active elements in b from this basis. Predicate p determines which elements participate in the XOR operation. Inactive elements prior to the first active elements are copied into the destination. This instruction stores the values prior to being XORed into the destination register. As shown below, in some embodiments, the instruction processes all elements equivalently; however, predication is performed by the assignment of the result, and should be considered an integral part of this instruction. Note that RunningXor1P uses the destination register as one of its inputs.

```
Vector RunningXor1P(const Vector &a, const Vector &b,
  const Vector &p)
{
    Vector r;
    int s, x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        r.v[x] = s;
        if ((gPred.v[x]) && (p.v[x]))
            s ^= b.v[x];
    }
    return(r);
}
```

Examples:

```
~p0; a = RunningXor1P(a,b,p1);
On Entry:  p0 = { 1  1  1  1  1  0  1  0 }
           a  = { 7  6  5  4  3  2  1  0 }
           b  = { 7  2  1  2  3  4  5  6 }
           p1 = { 0  1  1  0  1  1  1  0 }
On Exit:   a  = { 7  6  4  5  5  2  6  0 }
!p0; a = RunningXor1P(a,b,p1);
On Entry:  p0 = { 1  1  1  1  1  0  1  0 }
           a  = { 7  6  5  4  3  2  1  0 }
           b  = { 7  2  1  2  3  4  5  6 }
           p1 = { 0  1  1  0  1  1  1  0 }
On Exit:   a  = { 7  6  4  5  5  0  6  0 }
```

RunningXor2P

Using the value of the first active element in a as a basis, this instruction calculates the cumulative bitwise XOR with active elements in b from this basis. Predicate p determines which elements participate in the XOR operation. Inactive elements prior to the first active elements are copied into the destination. This instruction stores the values after being XORed into the destination register. As shown below, in some embodiments, the instruction processes all elements equivalently; however, predication is performed by the assignment of the result, and should be considered an integral part of this instruction. Note that RunningXor2P uses the destination register as one of its inputs.

```
Vector RunningXor2P(const Vector &a, const Vector &b,
const Vector &p)
{
    Vector r;
    int s, x;
    s = 0;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        if ((gPred.v[x]) && (p.v[x]))
            s ^= b.v[x];
        r.v[x] = s;
    }
    return(r);
}
```

Examples:

```
~p0; a = RunningXor2P(a,b,p1);
On Entry:  p0 = { 1  1  1  1  1  0  1  0 }
           a  = { 7  6  5  4  3  2  1  0 }
           b  = { 7  2  1  2  3  4  5  6 }
           p1 = { 0  1  1  0  1  1  1  0 }
On Exit:   a  = { 7  4  5  5  6  2  3  0 }
!p0; a = RunningXor2P(a,b,p1);
On Entry:  p0 = { 1  1  1  1  1  0  1  0 }
           a  = { 7  6  5  4  3  2  1  0 }
           b  = { 7  2  1  2  3  4  5  6 }
           p1 = { 0  1  1  0  1  1  1  0 }
On Exit:   a  = { 7  4  5  5  6  0  3  0 }
```

RunningMul1P

Using the value of the first active element in a as a basis, this instruction calculates the cumulative multiplication with active elements in b from this basis. Predicate p determines which elements participate in the multiplication operation. Inactive elements prior to the first active elements are copied into the destination. This instruction stores the values prior to being multiplied into the destination register. As shown below, in some embodiments, the instruction processes all elements equivalently; however, predication is performed by the assignment of the result, and should be considered an integral part of this instruction. Note that RunningMul1P uses the destination register as one of its inputs.

```
Vector RunningMul1P(const Vector &a, const Vector &b,
const Vector &p)
{
    Vector r;
    int s, x;
    s = 1;
    for (x=0; x<VECLEN; ++x)
    {
        if ((gPred.v[x]) && (p.v[x]))
        {
            s = a.v[x];
            break;
        }
        else
            r.v[x] = a.v[x];
    }
```

```
    for (; x<VECLEN; ++x)
    {
        r.v[x] = s;
        if ((gPred.v[x]) && (p.v[x]))
            s *= b.v[x];
    }
    return(r);
}
```

Examples:

```
~p0; a = RunningMul1P(a,b,p1);
On Entry:  p0 = { 1  1  1  1  1  0  1  0 }
           a  = { 7  6  5  4  3  2  1  0 }
           b  = { 7  2  1  2  3  4  2  6 }
           p1 = { 0  1  1  0  1  1  1  0 }
On Exit:   a  = { 7  6 12 12 12  2 36  0 }
!p0; a = RunningMul1P(a,b,p1);
On Entry:  p0 = { 1  1  1  1  1  0  1  0 }
           a  = { 7  6  5  4  3  2  1  0 }
           b  = { 7  2  1  2  3  4  2  6 }
           p1 = { 0  1  1  0  1  1  1  0 }
On Exit:   a  = { 7  6 12 12 12  0 36  0 }
```

RunningMul2P

Using the value of the first active element in a as a basis, this instruction calculates the cumulative multiplication with active elements in b from this basis. Predicate p determines which elements participate in the multiplication. Inactive elements prior to the first active elements are copied into the destination. This instruction stores the values after being multiplied into the destination register. As shown below, in some embodiments, the instruction processes all elements equivalently; however, predication is performed by the assignment of the result, and should be considered an integral part of this instruction. Note that RunningMul2P uses the destination register as one of its inputs.

```
Vector RunningMul2P(const Vector &a, const Vector &b,
const Vector &p)
{
    Vector r;
    int s, x;
    s = 1;
    for (x=0; x<VECLEN; ++x)
    {
        if ((gPred.v[x]) && (p.v[x]))
        {
            s = a.v[x];
            break;
        }
        else
            r.v[x] = a.v[x];
    }
    for (; x<VECLEN; ++x)
    {
        if ((gPred.v[x]) && (p.v[x]))
            s *= b.v[x];
        r.v[x] = s;
    }
    return(r);
}
```

Examples:

```
~p0; a = RunningMul2P(a,b,p1);
On Entry:  p0 = { 1  1  1  1  1  0  1  0 }
           a  = { 7  6  5  4  3  2  1  0 }
           b  = { 7  2  1  2  3  4  2  6 }
           p1 = { 0  1  1  0  1  1  1  0 }
On Exit:   a  = { 7 12 12 12 36  2 72  0 }
!p0; a = RunningMul2P(a,b,p1);
On Entry:  p0 = { 1  1  1  1  1  0  1  0 }
           a  = { 7  6  5  4  3  2  1  0 }
           b  = { 7  2  1  2  3  4  2  6 }
           p1 = { 0  1  1  0  1  1  1  0 }
On Exit:   a  = { 7 12 12 12 36  0 72  0 }
```

Vector Read/Write Instructions

The following section describes instructions for performing memory operations in accordance with the described embodiments. For clarity, these example instructions are described using a single data type and a single addressing mode. Thus, the described instructions provide a basic understanding of the read/write operations used in the described embodiments. In some embodiments, these instructions are extended to support different data types, addressing modes, etc. Some embodiments provide support for a virtual memory system in these instructions.

VectorRead

This instruction reads a vector of data from a vector of addresses calculated from the instruction's inputs. A vector of offsets in offset are scaled by 1, 2, 4, or 8 according to type, and added to the scalar address specified in ptr. Data is returned in the destination register, and either sign-extended or zero-padded depending on whether signed or unsigned data is loaded. If this instruction is predicated, only addresses corresponding to active elements are read. This instruction faults on any attempt to read an unmapped page. Depending on the setting of the STM bit, the operating system may choose to set bits in the FSR in response to illegal memory operations in other than the first active element. The syntax for this instruction is:

Vector VectorRead<type>(void *ptr, Vector offset);

VectorReadFF

This instruction reads a vector of data from a vector of addresses calculated from its inputs. Only the first active element can generate a memory fault or exception. A vector of offsets in offset are scaled by 1, 2, 4, or 8, according to type, and added to the scalar address specified in ptr. Data is returned in the destination register. If this instruction is predicated, only addresses corresponding to active elements are read.

This instruction only takes a page fault if the first active address is illegal or otherwise unmapped. If a faulting condition occurs in positions subsequent to the first active element, no exception is generated and corresponding bits in the FSR are set. This allows subsequent elements to avoid paging-in data from mass storage when the data is not certain to be used.

The interface for this instruction is:

Vector VectorRead<type>FF(void *ptr, Vector offset);

VectorReadNF

This instruction reads a vector of data from a vector of addresses calculated from its inputs. This instruction does not generate any memory faults, and thus may not actually read memory if a fault should have occurred. A vector of offsets in offset are scaled by 1, 2, 4, or 8, according to type, and added to the scalar address specified in ptr. Data is returned in the destination register. If this instruction is predicated, only addresses corresponding to active elements are read.

This instruction does not fault if an address is illegal or otherwise unmapped. If a faulting condition occurs, no exception is generated and corresponding bits in the FSR are set. This provides a mechanism for software speculation to avoid paging-in data from mass storage when the data is not certain to be used. This instruction is useful when speculatively pointer chasing, and to prefetch data that may not be accessed.

The interface for this instruction is:

Vector VectorRead<type>NF(void *ptr, Vector offset);
Flags: NONE: Set if no elements read; cleared otherwise.

VectorWriteInt

This instruction writes a vector of data in values to a vector of addresses calculated from the instruction's inputs. A vector of offsets in offset are scaled by 1, 2, 4, or 8, and added to the scalar address specified in ptr. If this instruction is predicated, only addresses corresponding to active elements are written. Write addresses should be valid, and there is no avoidance of program termination in the event of a write to an illegal or protected address. The syntax for this instruction is:

Vector VectorWriteInt(void *ptr, Vector offset, Vector values);

Sequential Vector Reads and Writes

Although the embodiments described above primarily operate on memory using a gather/scatter model, alternative embodiments include a set of sequential memory read/write instructions to handle the case where memory is addressed sequentially. In these embodiments, these memory operations: (1) support predication and zeroing; (2) work on naturally aligned boundaries for any data type; and (3) support normal and first-faulting variants (to support software speculation).

VectorLEA

This instruction calculates a vector of addresses from its inputs. A vector of offsets in offset are scaled by 1, 2, 4, or 8, and added to the scalar address specified in ptr. The syntax for this instruction is:

Vector VectorLEA(void *ptr, Vector offset);

VectorIndex

This instruction populates a vector by monotonically increasing a by b for each vector position. The given value of a is stored in the first element of the destination, and b is added to every position thereafter. While the example below processes all elements, predication is performed by the assignment of the result, and should be considered an integral part of this instruction. The syntax for this instruction is:

Vector VectorIndex(int a, int b)

This instruction operates as follows:

```
Vector VectorIndex(int a, int b)
{
    Vector r = 0;
    int x;
    for (x=0; x<VECLEN; ++x)
        r.v[x] = a + b * x;
    return(r);
}
```

Examples:

```
~p0; a = VectorIndex(1,2);
On Entry:  p0  = { 0  1  1  1  1  1  1  0 }
           a   = { 9  9  9  9  9  9  9  9 }
On Exit:   a   = { 9  3  5  7  9  11 13 9 }
!p0; a = VectorIndex(1,2);
On Entry:  p0  = { 1  1  1  1  1  1  1  0 }
           a   = { 9  9  9  9  9  9  9  9 }
On Exit:   a   = { 0  3  5  7  9  11 13 0 }
```

Executing Program Code

Figure 20:
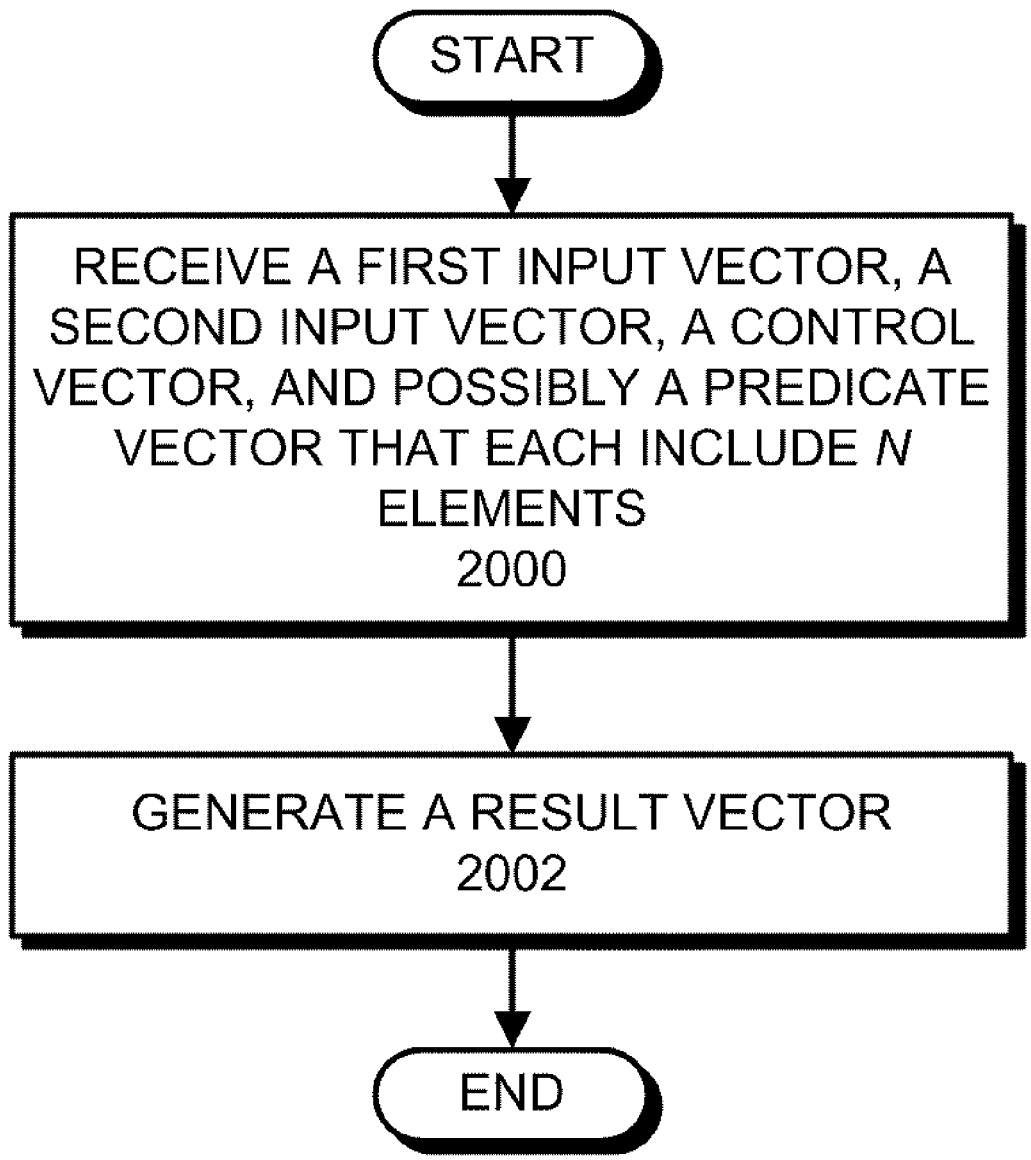
FIG. 20 presents a flowchart illustrating a process for executing program code in accordance with the described embodiments.

FIG. 20 presents a flowchart illustrating a process for executing program code in accordance with the described embodiments. As can be seen in FIG. 20, when executing program code, processor 102 receives a first input vector, a second input vector, a control vector, and possibly a predicate vector that each include N elements (step 2000). Next, using the vectors, processor 102 generates a result vector (step 2002). Generally, when generating the result vector, processor 102 first captures a "base" value from a key element in the second input vector. Processor 102 then writes a result of an associative Boolean operation or a multiplication operation for which the inputs are the base value and a value in selected relevant elements of the first input vector to selected elements in the result vector. In these embodiments, the associative Boolean operation is a bitwise logical operation that can be performed using two or more values from given vector elements as inputs. For example, in some embodiments, the associative Boolean operations include OR, AND, and XOR. (The generation of the result vector is described in detail below.)

In the following examples, we describe "possibly" receiving a predicate vector. Although the described embodiments can use a predicate vector when generating the result vector, these embodiments do not need to receive a predicate vector in order to generate the result vector (i.e., the predicate vector is optional). In these embodiments, if no predicate vector is received, processor 102 assumes a predicate vector for which each element contains a non-zero value.

In some embodiments, when generating the result vector, processor 102 performs some or all of a set of operations for generating the result vector in parallel (e.g., using vector execution unit 204). Hence, in these embodiments, the values to be written to the result vector can be determined in parallel for all the elements of the result vector and written to the elements of the result vector in parallel. However, in alternative embodiments, one or more of the operations for generating the result vector can be performed in series with other operations for generating the result vector. For example, see the definitions of the RunningAnd1P, RunningAnd2P, RunningOr1P, RunningOr2P, RunningXor1P, RunningXor2P, RunningMul1P, and RunningMul2P instructions above, where a result vector is generated using series operations. Although different embodiments can perform the operations in different ways, for clarity and brevity, we describe embodiments that perform the operations in parallel.

In the following examples, we use zero and non-zero values to describe the configuration of vectors and the performance of operations, however, in different embodiments, other values can be used. In addition, although we refer to embodiments that use "left" and "right" directions to determine elements in vectors when performing operations, in alternative embodiments, the directional references could be reversed.

In the following examples, we describe "relevant" elements. In the described embodiments, if the predicate vector is received, a relevant element in the result vector is an element in the result vector for which the corresponding element in the predicate vector and the corresponding element in the control vector contain non-zero values. Otherwise, a relevant element in the result vector is an element in the result vector for which the corresponding element in the control vector contains a non-zero value.

RunningAnd1P

Figure 21A:
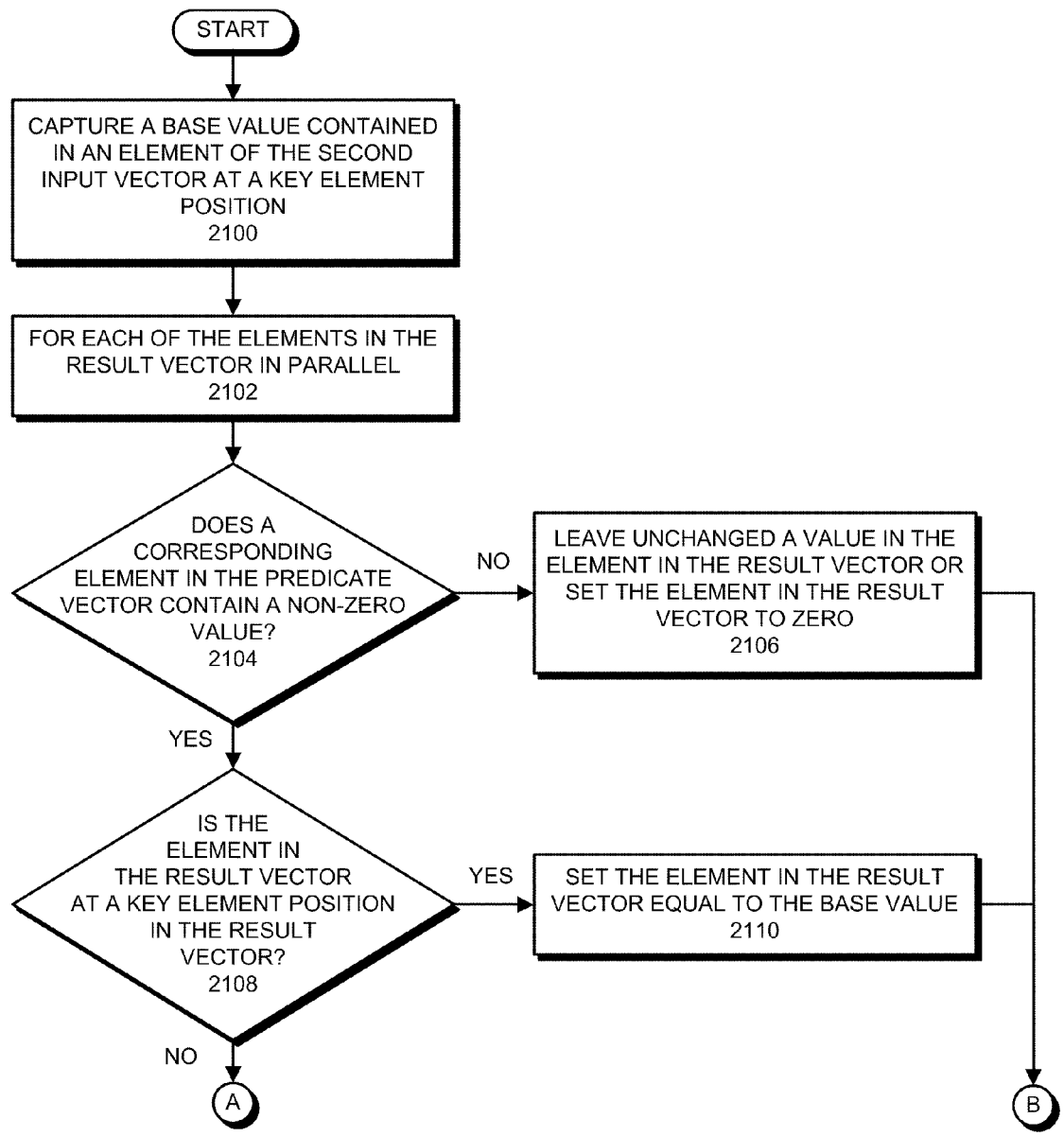
FIGS. 21A-21B presents a flowchart illustrating a process for generating a result vector in accordance with the described embodiments.
Figure 21B:
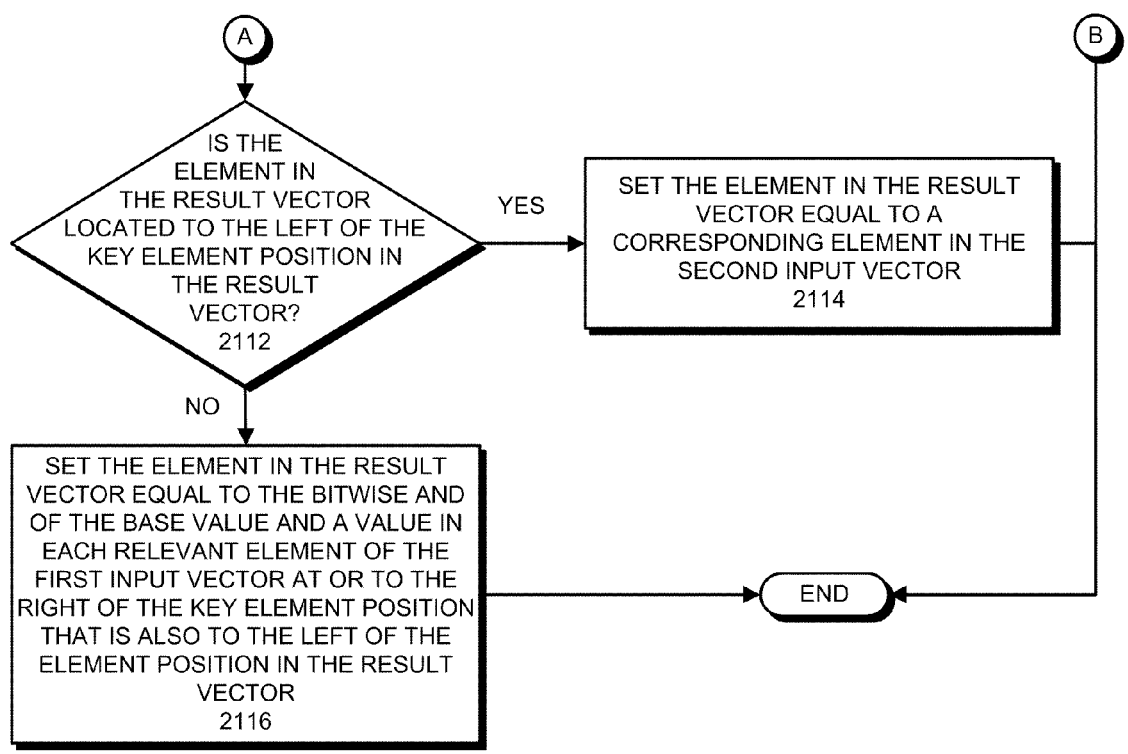

FIGS. 21A-21B (collectively, "FIG. 21") present a flowchart illustrating a process for generating a result vector in accordance with the described embodiments. More specifically, the flowchart in FIG. 21 shows operations performed for embodiments of the RunningAnd1P instruction. In these embodiments, the operations shown in FIG. 21 are performed as part of step 2002 in FIG. 20. Thus, for the purposes of describing the operations shown in FIG. 21, we assume that the first input vector, the second input vector, the control vector, and possibly a predicate vector have been received, as shown in step 2000 in FIG. 20.

Recall that in the described embodiments, the predicate vector is optional and thus may not be received. If a predicate vector is not received, processor 102 assumes a predicate vector where each element contains a non-zero value and performs the operations in FIG. 21 accordingly. In other words, the predicate vector described below (e.g., with respect to step 2104, etc.) can be an assumed predicate vector.

As shown in FIG. 21, processor 102 first captures a base value contained in an element of the second input vector at a key element position (step 2100). In some embodiments, the key element position is the leftmost element position where both the predicate vector and the control vector contain non-zero values. For example, assuming the control vector (cv) and the predicate vector (pred) contain the values shown, the key element position is located at the fourth element:

```
pred  =  { 0  1  0  1  1  1  1  1 }
cv    =  { 0  0  1  1  1  1  0  1 }
```

Note that the key element position does not indicate any element in a particular vector, but instead indicates a location of an element that can apply to any of the vectors. Moreover, note that in alternative embodiments, the key element position is at a different location. (Note that, as described below, a key element position may not exist in the given vectors.)

Next, for each of the elements of the result vector in parallel (step 2102), processor 102 determines if a corresponding element of the predicate vector contains a non-zero value (step 2104). If not, processor 102 either leaves unchanged the element in the result vector (predication) or writes a zero in the element of the result vector (zeroing) (step 2106). For example, assuming that the first input vector (iv1), the second input vector (iv2), cv, and pred contain the values shown, the result vector (res) could be generated as follows for zeroing:

```
iv1   =  { 1  2  3  4  5  6  7  8 }
iv2   =  { 8  7  6  5  4  3  2  1 }
pred  =  { 0  0  0  1  1  1  0  1 }
cv    =  { 0  0  1  1  1  1  1  1 }
res   =  { 0  0  0  X  X  X  0  X }
```

Note that zeroing and predication do not depend on the value held in a corresponding element in the control vector (i.e., for predication and zeroing, the value in the control vector is irrelevant).

In some embodiments, the result vector can include one or more elements that contain initial values that were computed during an earlier operation. Alternatively, the result vector can include one or more elements that contain initial values that were copied to the result vector from another vector during the generation of the result vector. The initial values in these elements are the values that are left unchanged according to predication.

Although we show performing the bitwise AND operation and the predication/zeroing operations together in FIG. 21, in some embodiments these operations can occur separately. More specifically, in some embodiments, the operations shown in steps 2108-2116 in FIG. 21 can be performed in one (parallel) operation to generate a result vector with values for elements in the same locations as elements where predicate vector contains a non-zero value. A separate operation can then be performed to copy the result vector to a destination, with the predication/zeroing shown in steps 2104-2106 being performed during the copy operation. In the following description, for clarity and brevity, we describe embodiments where the performing the bitwise AND operation and the predication take place in a single (parallel) operation.

Processor 102 then determines if the element in the result vector is at a key element position in the result vector (step 2108). If so, processor 102 sets the element in the result vector equal to the base value (step 2110). For example, assuming iv2, cv, and pred contain the values shown, res could be generated as follows:

```
iv2   = { 8  7  6  5  4  3  2  1 }
pred  = { 0  0  1  1  1  1  1  1 }
cv    = { 0  0  1  1  1  0  0  1 }
res   = { X  X  6  X  X  X  X  X }
```

This example shows an exemplary element in the key element position (i.e., a leftmost element where both pred[x] and cv[x] contain a non-zero values) for which the base value from iv2[x] has been copied to res[x]. For clarity, other elements in res are marked with an X.

Note that a key element position may not exist (i.e., there may be no element position where both pred[x] and cv[x] contain a non-zero values). In these cases, each element in the result vector is set equal to the corresponding element in the second input vector, as is described below with respect to step 2114.

If the element in the result vector is not at the key element position, processor 102 determines if the element in the result vector is located to the left of the key element position in the result vector (step 2112). If so, processor 102 sets the element in the result vector equal to a corresponding element in the second input vector (step 2114). For example, assuming iv2, cv, and pred contain the values shown, res could be generated as follows:

```
iv2   = { 8  7  6  5  4  3  2  1 }
pred  = { 1  0  1  1  1  1  1  1 }
cv    = { 0  0  0  1  1  0  0  1 }
res   = { 8  X  6  X  X  X  X  X }
```

This example shows elements to the left of the key element position for which iv[x] has been copied to res[x]. For clarity, other elements in res are marked with an X. Note that, as described above, a key element position need not be present in the result vector. In other words, there may be no element position in both the predicate vector and the control vector where both vectors contain a non-zero value. If this case occurs, the values from iv2 are simply copied to each element in res where the corresponding element in pred contains a non-zero value (which could be all of the elements in the result vector).

If the element in the result vector is not located to the left of the key element position (step 2112), processor 102 sets the element in the result vector equal to the bitwise AND of the base value and a value in each relevant element in the first input vector at or to the right of the key element position that is also to the left of the element position in the result vector (step 2116). In other words, processor 102 determines the value held in elements in the first input vector for which both a corresponding element in pred and a corresponding element in cv contain non-zero values (i.e., "relevant elements") that are located to the left of the element in the result vector. Processor 102 then sets the element in res equal to the result of a bitwise AND operation wherein the base value and each of the determined values is ANDed together. For example, assuming iv1, iv2, cv, and pred contain the values shown, res could be generated as follows:

```
iv1   = { 1  2  15  4   5  6  7  8 }
iv2   = { 8  7  15  7   3  3  2  1 }
pred  = { 1  1  1   1   1  1  1  1 }
cv    = { 0  0  1   1   1  0  0  1 }
res   = { X  X  15  15  7  3  3  3 }
```

As this example shows, processor 102 writes the base value of 15 that was captured from the element in the second input vector at the key element position to the element in the result vector in the key element position (as described with respect to steps 2108-2110). For each of the remaining elements in res to the right of the key element position, processor 102 determines the relevant elements at or to the right of the key element position that are also to the left of the element position in the result vector. Processor then performs a bitwise AND operation for which the inputs are the base value and a value from each of the determined relevant elements in the first input vector, and writes the result of the bitwise AND operation value to the result vector. For example, for the fifth element in res, processor 102 determines that there are 2 relevant elements to the left of the fifth element in the result vector (i.e., the third and fourth elements). Processor 102 then determines that the values in the third and fourth elements of the first input vector are 15 and 7, respectively (or, bitwise, 00001111 and 00000111, assuming an 8-bit data type). Processor 102 next writes the result of 15&15&7=7 (00001111&00001111&00000111=00000111) into the fifth element of res. The remaining elements are handled by processor 102 in the same way. For clarity, elements that are not written to during this operation are marked with an X in res.

RunningAnd2P

Figure 22A:
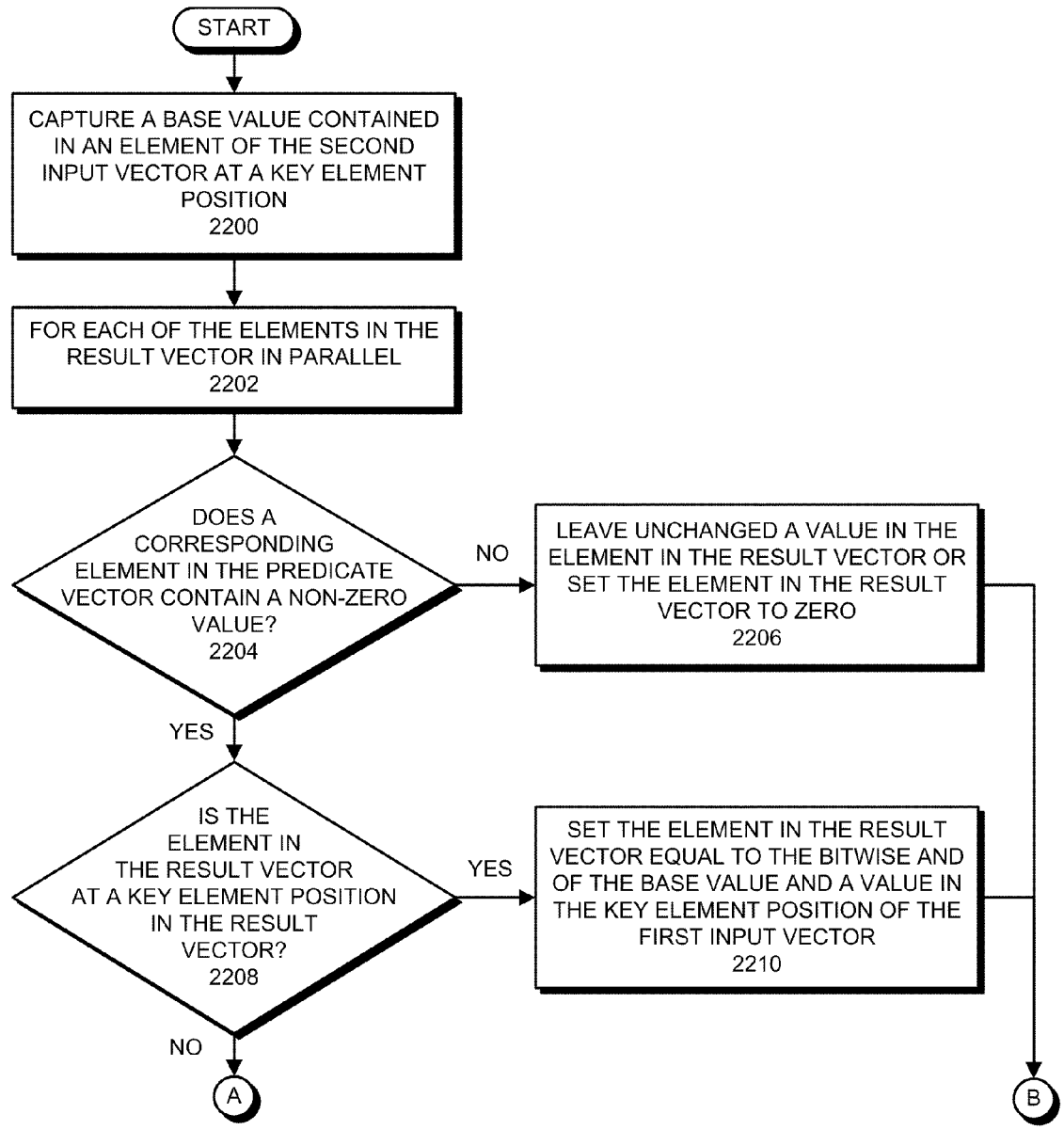
FIGS. 22A-22B presents a flowchart illustrating a process for generating a result vector in accordance with the described embodiments.
Figure 22B:
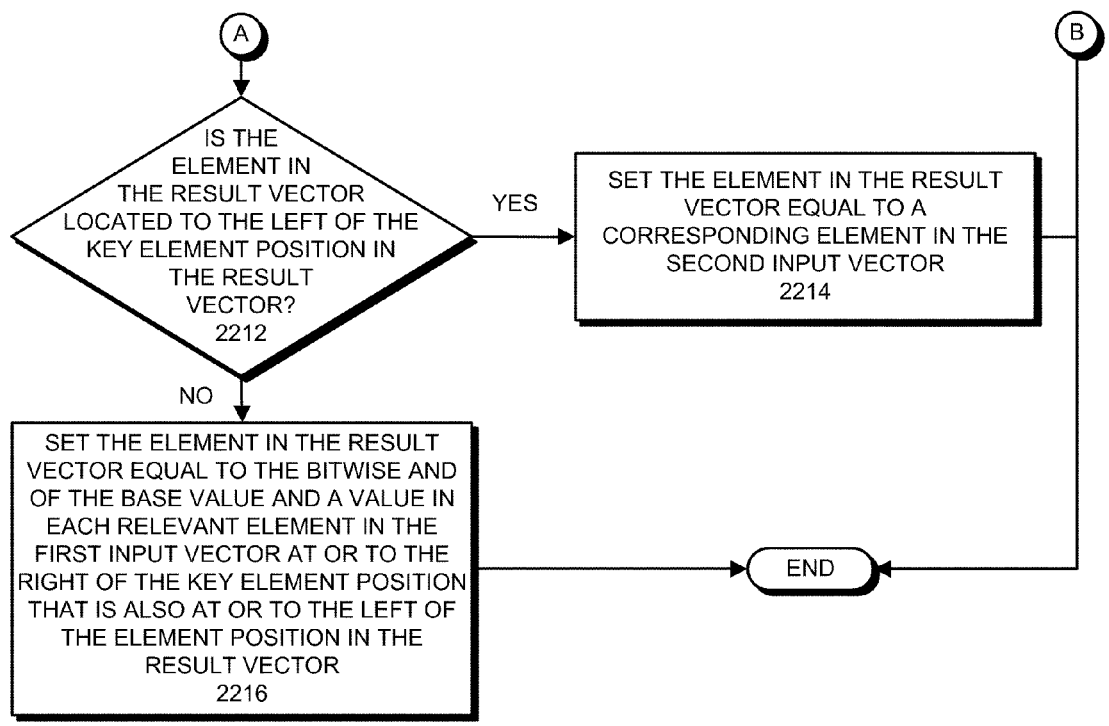

FIGS. 22A-22B (collectively, "FIG. 22") present a flowchart illustrating a process for generating a result vector in accordance with the described embodiments. More specifically, the flowchart in FIG. 22 shows operations performed for embodiments of the RunningAnd2P instruction. In these embodiments, the operations shown in FIG. 22 are performed as part of step 2002 in FIG. 20. Thus, for the purposes of describing the operations shown in FIG. 22, we assume that the first input vector, the second input vector, the control vector, and possibly a predicate vector have been received, as shown in step 2000 in FIG. 20.

Recall that in the described embodiments, the predicate vector is optional and hence may not be received. If a predicate vector is not received, processor 102 assumes a predicate vector where each element contains a non-zero value and performs the operations in FIG. 22 accordingly. In other words, the predicate vector described below (e.g., with respect to step 2204, etc.) can be an assumed predicate vector.

As shown in FIG. 22, processor 102 first captures a base value contained in an element of the second input vector at a key element position (step 2200).

Next, for each of the elements of the result vector in parallel (step 2202), processor 102 determines if a corresponding element of the predicate vector contains a non-zero value (step 2204). If not, processor 102 either leaves unchanged the element in the result vector (predication) or writes a zero in the element of the result vector (zeroing) (step 2206). For example, assuming that the first input vector (iv1), second input vector (iv2), cv, and pred contain the values shown, the result vector (res) could be generated as follows for zeroing:

| iv1 | = | { | 1 | 2 | 3 | 4 | 5 | 6 | 7 | 8 | } |
|---|---|---|---|---|---|---|---|---|---|---|---|
| iv2 | = | { | 8 | 7 | 6 | 5 | 4 | 3 | 2 | 1 | } |
| pred | = | { | 0 | 0 | 0 | 1 | 1 | 1 | 0 | 1 | } |
| cv | = | { | 0 | 0 | 1 | 1 | 1 | 1 | 1 | 1 | } |
| res | = | { | 0 | 0 | 0 | X | X | X | 0 | X | } |

In some embodiments, the result vector can include one or more elements that contain initial values that were computed during an earlier operation. Alternatively, the result vector can include one or more elements that contain initial values that were copied to the result vector from another vector during the generation of the result vector. The initial values in these elements are the values that are left unchanged according to predication.

Although we show performing the bitwise AND operation and the predication/zeroing operations together in FIG. 22, these operations can occur in separately in some embodiments. More specifically, in some embodiments, the operations shown in steps 2208-2216 in FIG. 22 can be performed in one (parallel) operation to generate a result vector with values for elements in the same locations as elements where predicate vector contains a non-zero value. A separate operation can then be performed to copy the result vector to a destination, with the predication/zeroing shown in steps 2204-2206 being performed during the copy operation. In the following description, for clarity and brevity, we describe embodiments where the bitwise AND operation and the predication take place in a single (parallel) operation.

Processor 102 then determines if the element in the result vector is at a key element position in the result vector (step 2208). If so, processor 102 sets the element in the result vector equal to the bitwise AND of the base value and a value in the key element position in a first input vector (step 2210). For example, assuming iv1, iv2, cv, and pred contain the values shown, res could be generated as follows:

| iv1 | = | { | 1 | 2 | 15 | 4 | 5 | 6 | 7 | 8 | } |
|---|---|---|---|---|---|---|---|---|---|---|---|
| iv2 | = | { | 8 | 7 | 15 | 7 | 3 | 3 | 2 | 1 | } |

-continued

| pred | = | { | 0 | 0 | 1 | 1 | 1 | 1 | 1 | 1 | } |
|---|---|---|---|---|---|---|---|---|---|---|---|
| cv | = | { | 0 | 0 | 1 | 1 | 1 | 0 | 0 | 1 | } |
| res | = | { | X | X | 15 | X | X | X | X | X | } |

This example shows an exemplary element in the key element position (i.e., a leftmost element where both pred[x] and cv[x] contain a non-zero values) for which the base value from iv2[x] bitwise-ANDed with the value from iv1[x] has been written to res[x]. For clarity, other elements in res are marked with an X.

Note that a key element position may not exist (i.e., there may be no element position where both pred[x] and cv[x] contain a non-zero values). In these cases, each element in the result vector is set equal to the corresponding element in the input vector, as is described below with respect to step 2214.

If the element in the result vector is not at the key element position, processor 102 determines if the element in the result vector is located to the left of the key element position in the result vector (step 2212). If so, processor 102 sets the element in the result vector equal to a corresponding element in the second input vector (step 2214). For example, assuming iv2, cv, and pred contain the values shown, res could be generated as follows:

| iv2 | = | { | 8 | 7 | 6 | 5 | 4 | 3 | 2 | 1 | } |
|---|---|---|---|---|---|---|---|---|---|---|---|
| pred | = | { | 1 | 0 | 1 | 1 | 1 | 1 | 1 | 1 | } |
| cv | = | { | 0 | 0 | 0 | 1 | 1 | 0 | 0 | 1 | } |
| res | = | { | 8 | X | 6 | X | X | X | X | X | } |

This example shows elements to the left of the key element position for which iv2[x] has been copied to res[x]. For clarity, other elements in res are marked with an X. As described above, a key element position need not exist in the result vector. In other words, there may be no element position in both the predicate vector and the control vector where both the vectors contain a non-zero value. If this case occurs, the values from iv2 are simply copied to each element in res where the corresponding element in pred contains a non-zero value.

If the element in the result vector is not located to the left of the key element position (step 2212), processor 102 sets the element in the result vector equal to the bitwise AND of the base value and a value in each relevant element of the first input vector at or to the right of the key element position that is also at or to the left of the element position in the result vector (step 2216). In other words, processor 102 determines the value held in elements in the first input vector for which both a corresponding element in pred and a corresponding element in cv contain non-zero values (i.e., "relevant elements") that are located at or to the left of the element in the result vector. Processor 102 then sets the element in res equal to the bitwise AND of the base value and the value in each determined relevant element in the first input vector. For example, assuming iv1, iv2, cv, and pred contain the values shown, res could be generated as follows:

| iv1 | = | { | 1 | 2 | 15 | 4 | 5 | 6 | 7 | 8 | } |
|---|---|---|---|---|---|---|---|---|---|---|---|
| iv2 | = | { | 8 | 7 | 15 | 7 | 3 | 3 | 2 | 1 | } |
| pred | = | { | 1 | 1 | 1 | 1 | 1 | 1 | 1 | 1 | } |
| cv | = | { | 0 | 0 | 1 | 1 | 1 | 0 | 0 | 1 | } |
| res | = | { | X | X | 15 | 7 | 3 | 3 | 3 | 1 | } |

As this example shows, processor 102 sets the element in the result vector in the key element position equal to 15, which is the bitwise AND of the base value, 15, and a value in the key element position in a first input vector, 15 (as described with respect to steps 2208-2210). For each of the remaining elements in res to the right of the key element position, processor 102 determines the relevant elements at or to the right of the key element position that are also at or to the left of the element position in the result vector. Processor then performs a bitwise AND operation for which the inputs are the base value and a value from each of the determined relevant elements in the first input vector, and writes the result of the bitwise AND operation value to the result vector. For example, for the fifth element in res, processor 102 determines that there are 3 relevant elements at or to the left of the fifth element in the result vector (i.e., the third, fourth, and fifth elements). Processor 102 then determines that the values in the third, fourth, and fifth elements of the first input vector are 15, 7, and 3, respectively (or, bitwise, 00001111, 00000111, and 00000011, assuming an 8-bit data type). Processor 102 next writes the result of 15&15&7&3=3 (00001111&00001111&00000111& 00000011=00000011) into the fifth element of res. The remaining elements are handled by processor 102 in the same way. For clarity, elements that are not written to during this operation are marked with an X in res.

RunningOr1P/RunningOr2P and RunningXor1P/RunningXor2P

The described embodiments include the RunningOr1P and RunningOr2P, and RunningXor1P and RunningXor2P instructions. Generally, the RunningOr1P and RunningXor1P instructions operate in a similar way to the above-described RunningAnd1P instruction, and the RunningOr2P and the RunningXor2P instructions operate in a similar way to the above-described RunningAnd2P instruction. Thus, the operations performed by processor 102 in executing the RunningOr1P and the RunningXor1P instructions are similar to those performed by processor 102 in executing the RunningAnd1P instruction, and the operations performed by processor 102 in executing the RunningOr2P and the RunningXor2P instructions are similar to those performed by processor 102 in executing the RunningAnd2P instruction. However, the RunningOr1P and the RunningXor1P instructions differ from the RunningAnd1P instruction in that the instructions involve bitwise OR and a bitwise XOR, respectively, instead of the bitwise AND used in the RunningAnd1P instruction. The RunningOr2P and the RunningXor2P instructions differ from the RunningAnd2P instruction in the same way.

For more detail, we refer the reader to the flowcharts presented in FIG. 21, which would be similar for the RunningOr1P and RunningXor1P instructions, and FIG. 22, which would be similar for the RunningOr2P and RunningXor2P instructions. However, as described above, steps 2116 in FIGS. 21, and 2210 and 2216 in FIG. 22 would differ in the associative Boolean operation used in the steps.

RunningMul1P

Figure 23A:
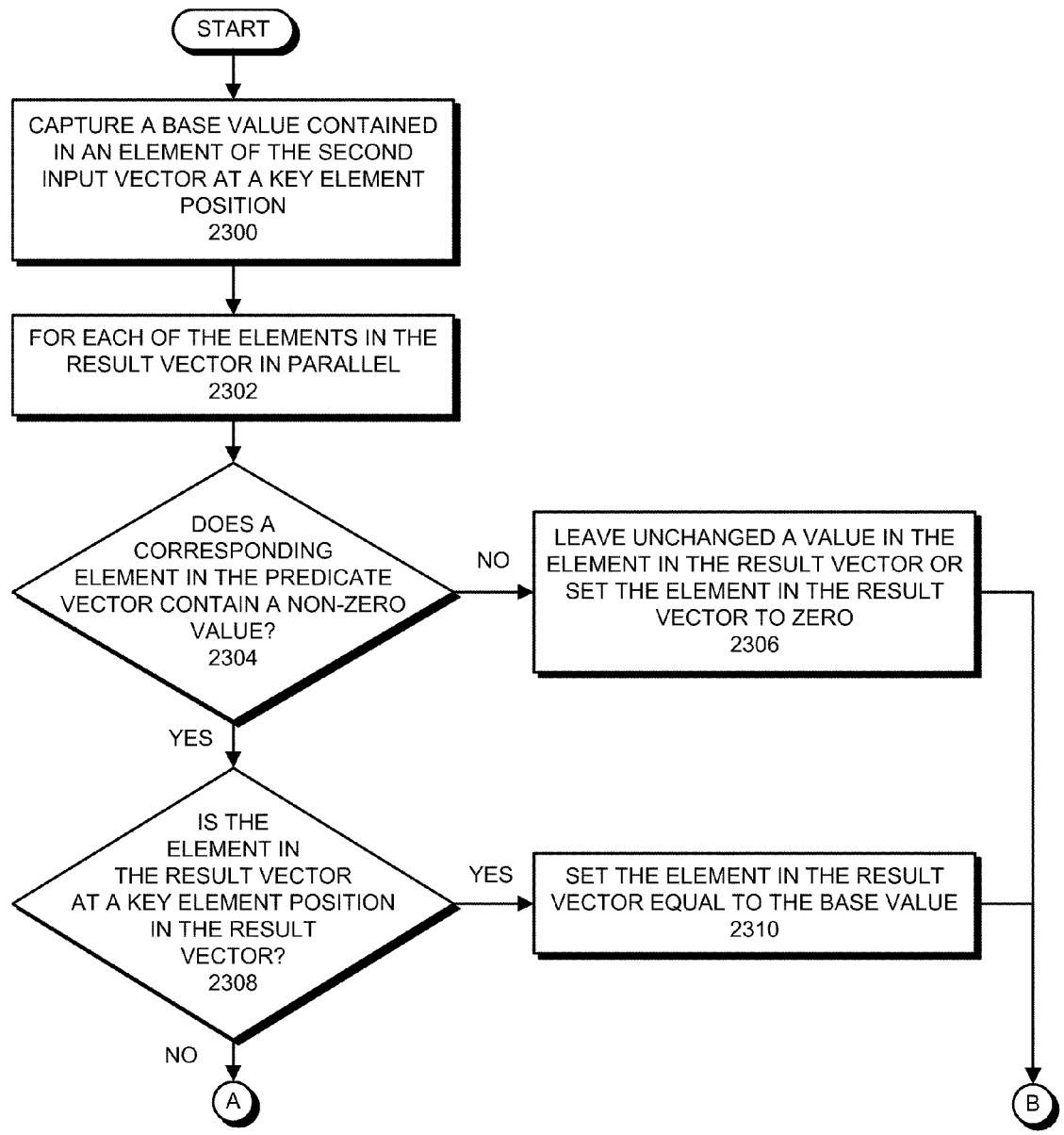
FIGS. 23A-23B presents a flowchart illustrating a process for generating a result vector in accordance with the described embodiments.
Figure 23B:
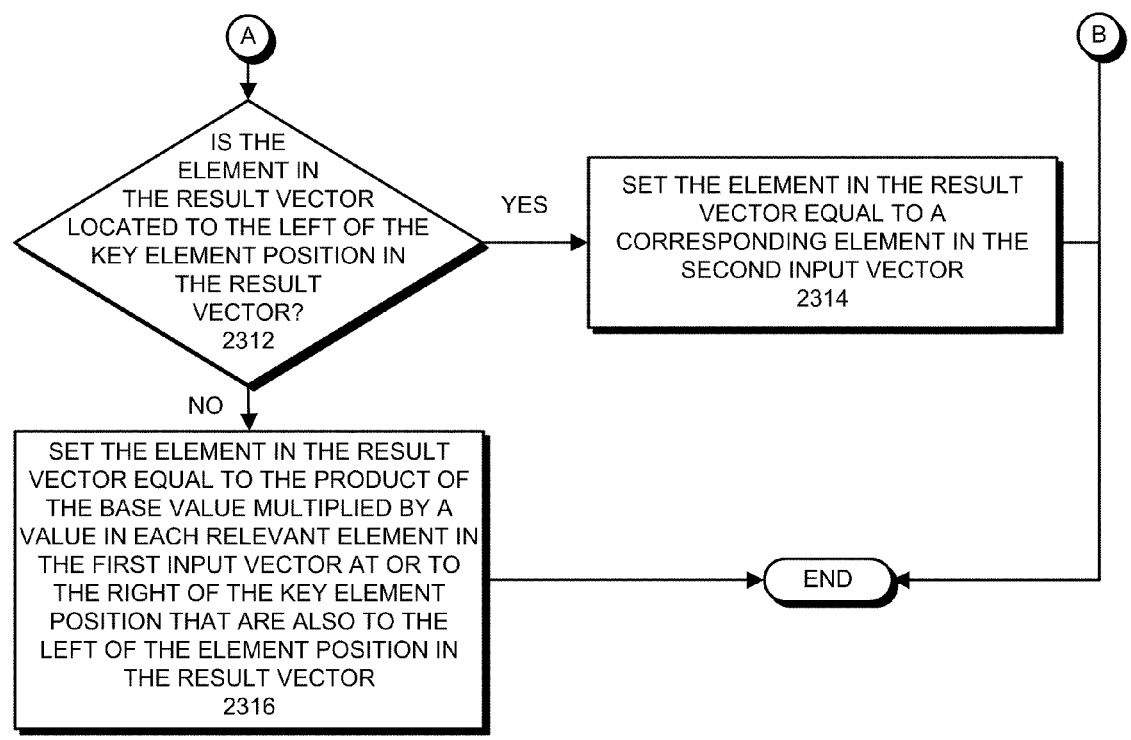

FIGS. 23A-23B (collectively, "FIG. 23") present a flowchart illustrating a process for generating a result vector in accordance with the described embodiments. More specifically, the flowchart in FIG. 23 shows operations performed for embodiments of the RunningMul1P instruction. In these embodiments, the operations shown in FIG. 23 are performed as part of step 2002 in FIG. 20. Thus, for the purposes of describing the operations shown in FIG. 23, we assume that the first input vector, the second input vector, the control vector, and possibly a predicate vector have been received, as shown in step 2000 in FIG. 20.

Recall that in the described embodiments, the predicate vector is optional and thus may not be received. If a predicate vector is not received, processor 102 assumes a predicate vector where each element contains a non-zero value and performs the operations in FIG. 23 accordingly. In other words, the predicate vector described below (e.g., with respect to step 2304, etc.) can be an assumed predicate vector.

As shown in FIG. 23, processor 102 first captures a base value contained in an element of the second input vector at a key element position (step 2300).

Next, for each of the elements of the result vector in parallel (step 2302), processor 102 determines if a corresponding element of the predicate vector contains a non-zero value (step 2304). If not, processor 102 either leaves unchanged the element in the result vector (predication) or writes a zero in the element of the result vector (zeroing) (step 2306). For example, assuming that the first input vector (iv1), the second input vector (iv2), cv, and pred contain the values shown, the result vector (res) could be generated as follows for zeroing:

| iv1 | = | { | 1 | 2 | 3 | 4 | 5 | 6 | 7 | 8 | } |
|---|---|---|---|---|---|---|---|---|---|---|---|
| iv2 | = | { | 8 | 7 | 6 | 5 | 4 | 3 | 2 | 1 | } |
| pred | = | { | 0 | 0 | 0 | 1 | 1 | 1 | 0 | 1 | } |
| cv | = | { | 0 | 0 | 1 | 1 | 1 | 1 | 1 | 1 | } |
| res | = | { | 0 | 0 | 0 | X | X | X | 0 | X | } |

Note that zeroing and predication do not depend on the value held in a corresponding element in the control vector (i.e., for predication and zeroing, the value in the control vector is irrelevant).

In some embodiments, the result vector can include one or more elements that contain initial values that were computed during an earlier operation. Alternatively, the result vector can include one or more elements that contain initial values that were copied to the result vector from another vector during the generation of the result vector. The initial values in these elements are the values that are left unchanged according to predication.

Although we show the multiplication and the predication/zeroing operations together in FIG. 23, in some embodiments these operations can occur separately. More specifically, in some embodiments, the operations shown in steps 2308-2316 in FIG. 23 can be performed in one (parallel) operation to generate a result vector with values for elements in the same locations as elements where predicate vector contains a non-zero value. A separate operation can then be performed to copy the result vector to a destination, with the predication/zeroing shown in steps 2304-2306 being performed during the copy operation. In the following description, for clarity and brevity, we describe embodiments where the multiplication and the predication take place in a single (parallel) operation.

Processor 102 then determines if the element in the result vector is at a key element position in the result vector (step 2308). If so, processor 102 sets the element in the result vector equal to the base value (step 2310). For example, assuming iv2, cv, and pred contain the values shown, res could be generated as follows:

| iv2 | = | { | 8 | 7 | 6 | 5 | 4 | 3 | 2 | 1 | } |
|---|---|---|---|---|---|---|---|---|---|---|---|
| pred | = | { | 0 | 0 | 1 | 1 | 1 | 1 | 1 | 1 | } |
| cv | = | { | 0 | 0 | 1 | 1 | 1 | 0 | 0 | 1 | } |
| res | = | { | X | X | 6 | X | X | X | X | X | } |

This example shows an exemplary element in the key element position (i.e., a leftmost element where both pred[x] and cv[x]

contain a non-zero values) for which the base value from iv2[x] has been copied to res[x]. For clarity, other elements in res are marked with an X.

Note that a key element position may not exist (i.e., there may be no element position where both pred[x] and cv[x] contain a non-zero values). In these cases, each element in the result vector is set equal to the corresponding element in the second input vector, as is described below with respect to step 2314.

If the element in the result vector is not at the key element position, processor 102 determines if the element in the result vector is located to the left of the key element position in the result vector (step 2312). If so, processor 102 sets the element in the result vector equal to a corresponding element in the second input vector (step 2314). For example, assuming iv2, cv, and pred contain the values shown, res could be generated as follows:

|  |  |  |  |  |  |  |  |  |  |
|---|---|---|---|---|---|---|---|---|---|
| iv2 | = | { | 8 | 7 | 6 | 5 | 4 | 3 | 2 | 1 | } |
| pred | = | { | 1 | 0 | 1 | 1 | 1 | 1 | 1 | 1 | } |
| cv | = | { | 0 | 0 | 0 | 1 | 1 | 0 | 0 | 1 | } |
| res | = | { | 8 | X | 6 | X | X | X | X | X | } |

This example shows elements to the left of the key element position for which iv[x] has been copied to res[x]. For clarity, other elements in res are marked with an X. Note that, as described above, a key element position need not be present in the result vector. In other words, there may be no element position in both the predicate vector and the control vector where both vectors contain a non-zero value. If this case occurs, the values from iv2 are simply copied to each element in res where the corresponding element in pred contains a non-zero value (which could be all of the elements in the result vector).

If the element in the result vector is not located to the left of the key element position (step 2312), processor 102 sets the element in the result vector equal to the product of the base value multiplied by a value in each relevant element in the first input vector at or to the right of the key element position that are also to the left of the element position in the result vector (step 2316). In other words, processor 102 determines the value held in elements in the first input vector for which both a corresponding element in pred and a corresponding element in cv contain non-zero values (i.e., "relevant elements") that are located to the left of the element in the result vector. Processor 102 then sets the element in res equal to the product of the base value multiplied by the values in each determined relevant element in the first input vector. For example, assuming iv1, iv2, cv, and pred contain the values shown, res could be generated as follows:

|  |  |  |  |  |  |  |  |  |  |  |
|---|---|---|---|---|---|---|---|---|---|---|
| iv1 | = | { | 1 | 1 | 2 | 3 | 2 | 9 | 7 | 2 | } |
| iv2 | = | { | 8 | 7 | 3 | 5 | 4 | 3 | 2 | 1 | } |
| pred | = | { | 1 | 1 | 1 | 1 | 1 | 1 | 1 | 1 | } |
| cv | = | { | 0 | 0 | 1 | 1 | 1 | 0 | 0 | 1 | } |
| res | = | { | X | X | 3 | 6 | 18 | 36 | 36 | 36 | } |

As this example shows, processor 102 writes the base value of 3 that was captured from the element in the second input vector at the key element position to the element in the result vector in the key element position (as described with respect to steps 2308-2310). For each of the remaining elements in res to the right of the key element position, processor 102 determines the relevant elements at or to the right of the key element position that are also to the left of the element position in the result vector. Processor then multiplies the base value by a value from each of the determined relevant elements in the first input vector and writes the product to the result vector. For example, for the fifth element in res, processor 102 determines that there are 2 relevant elements to the left of the fifth element in the result vector (i.e., the third and fourth elements). Processor 102 then determines that the values in the third and fourth elements of the first input vector are 3 and 2, respectively. Processor 102 next writes 3*3*2=18 into the fifth element of res. The remaining elements are handled by processor 102 in the same way. For clarity, elements that are not written to during this operation are marked with an X in res.

RunningMul2P

Figure 24A:
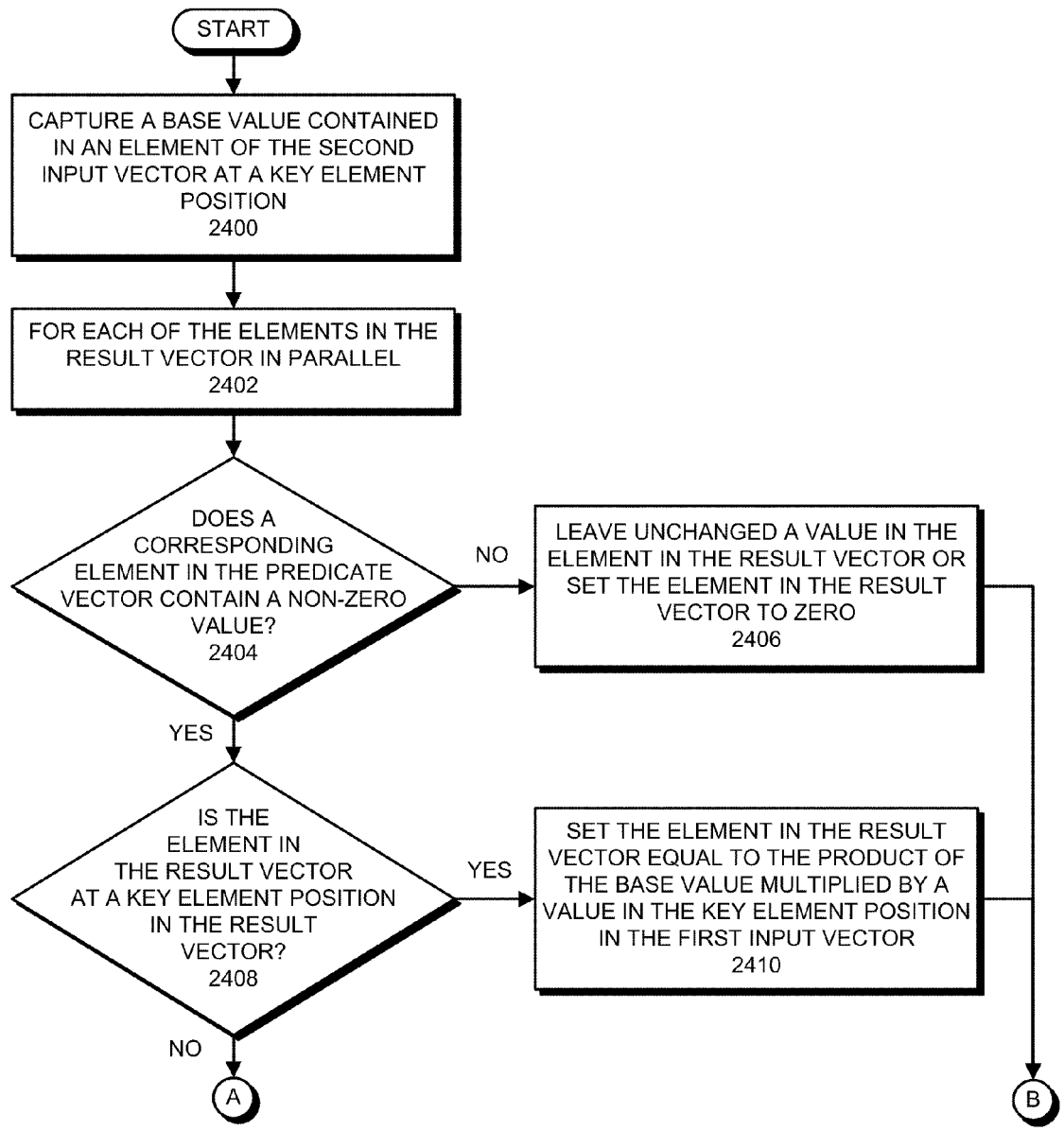
FIGS. 24A-24B presents a flowchart illustrating a process for generating a result vector in accordance with the described embodiments.
Figure 24B:
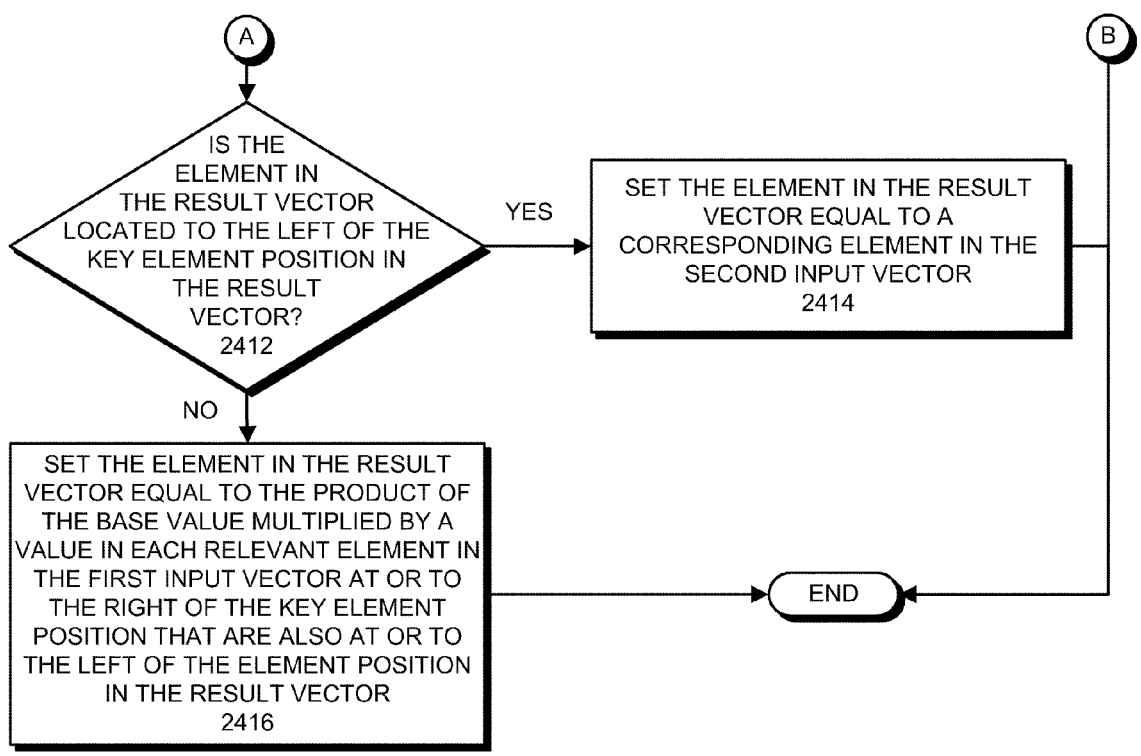

FIGS. 24A-24B (collectively, "FIG. 24") present a flowchart illustrating a process for generating a result vector in accordance with the described embodiments. More specifically, the flowchart in FIG. 24 shows operations performed for embodiments of the RunningMul2P instruction. In these embodiments, the operations shown in FIG. 24 are performed as part of step 2002 in FIG. 20. Thus, for the purposes of describing the operations shown in FIG. 24, we assume that the first input vector, the second input vector, the control vector, and possibly a predicate vector have been received, as shown in step 2000 in FIG. 20.

Recall that in the described embodiments, the predicate vector is optional and hence may not be received. If a predicate vector is not received, processor 102 assumes a predicate vector where each element contains a non-zero value and performs the operations in FIG. 24 accordingly. In other words, the predicate vector described below (e.g., with respect to step 2404, etc.) can be an assumed predicate vector.

As shown in FIG. 24, processor 102 first captures a base value contained in an element of the second input vector at a key element position (step 2400).

Next, for each of the elements of the result vector in parallel (step 2402), processor 102 determines if a corresponding element of the predicate vector contains a non-zero value (step 2404). If not, processor 102 either leaves unchanged the element in the result vector (predication) or writes a zero in the element of the result vector (zeroing) (step 2406). For example, assuming that the first input vector (iv1), second input vector (iv2), cv, and pred contain the values shown, the result vector (res) could be generated as follows for zeroing:

|  |  |  |  |  |  |  |  |  |  |  |
|---|---|---|---|---|---|---|---|---|---|---|
| iv1 | = | { | 1 | 2 | 3 | 4 | 5 | 6 | 7 | 8 | } |
| iv2 | = | { | 8 | 7 | 6 | 5 | 4 | 3 | 2 | 1 | } |
| pred | = | { | 0 | 0 | 0 | 1 | 1 | 1 | 0 | 1 | } |
| cv | = | { | 0 | 0 | 1 | 1 | 1 | 1 | 1 | 1 | } |
| res | = | { | 0 | 0 | 0 | X | X | X | 0 | X | } |

In some embodiments, the result vector can include one or more elements that contain initial values that were computed during an earlier operation. Alternatively, the result vector can include one or more elements that contain initial values that were copied to the result vector from another vector during the generation of the result vector. The initial values in these elements are the values that are left unchanged according to predication.

Although we show the multiplication and the predication/zeroing operations together in FIG. 24, these operations can occur in separately in some embodiments. More specifically, in some embodiments, the operations shown in steps 2408-2416 in FIG. 24 can be performed in one (parallel) operation to generate a result vector with values for elements in the same locations as elements where predicate vector contains a non-zero value. A separate operation can then be performed to copy the result vector to a destination, with the predication/zeroing shown in steps 2404-2406 being performed during the copy operation. In the following description, for clarity and brevity, we describe embodiments where the multiplication and the predication take place in a single (parallel) operation.

Processor 102 then determines if the element in the result vector is at a key element position in the result vector (step 2408). If so, processor 102 sets the element in the result vector equal to the product of the base value multiplied by a value in the key element position in a first input vector (step 2410). For example, assuming iv1, iv2, cv, and pred contain the values shown, res could be generated as follows:

| iv1  | = | { | 1 | 2 | 3 | 4 | 5 | 6 | 7 | 8 | } |
|------|---|---|---|---|---|---|---|---|---|---|---|
| iv2  | = | { | 8 | 7 | 6 | 5 | 4 | 3 | 2 | 1 | } |
| pred | = | { | 0 | 0 | 1 | 1 | 1 | 1 | 1 | 1 | } |
| cv   | = | { | 0 | 0 | 1 | 1 | 1 | 0 | 0 | 1 | } |
| res  | = | { | X | X | 18| X | X | X | X | X | } |

This example shows an exemplary element in the key element position (i.e., a leftmost element where both pred[x] and cv[x] contain a non-zero values) for which the product of the base value from iv2[x] multiplied by the value from iv1[x] has been written to res[x]. For clarity, other elements in res are marked with an X.

Note that a key element position may not exist (i.e., there may be no element position where both pred[x] and cv[x] contain a non-zero values). In these cases, each element in the result vector is set equal to the corresponding element in the input vector, as is described below with respect to step 2414.

If the element in the result vector is not at the key element position, processor 102 determines if the element in the result vector is located to the left of the key element position in the result vector (step 2412). If so, processor 102 sets the element in the result vector equal to a corresponding element in the second input vector (step 2414). For example, assuming iv2, cv, and pred contain the values shown, res could be generated as follows:

| iv2  | = | { | 8 | 7 | 6 | 5 | 4 | 3 | 2 | 1 | } |
|------|---|---|---|---|---|---|---|---|---|---|---|
| pred | = | { | 1 | 0 | 1 | 1 | 1 | 1 | 1 | 1 | } |
| cv   | = | { | 0 | 0 | 0 | 1 | 1 | 0 | 0 | 1 | } |
| res  | = | { | 8 | X | 6 | X | X | X | X | X | } |

This example shows elements to the left of the key element position for which iv2[x] has been copied to res[x]. For clarity, other elements in res are marked with an X. As described above, a key element position need not exist in the result vector. In other words, there may be no element position in both the predicate vector and the control vector where both the vectors contain a non-zero value. If this case occurs, the values from iv2 are simply copied to each element in res where the corresponding element in pred contains a non-zero value.

If the element in the result vector is not located to the left of the key element position (step 2412), processor 102 sets the element in the result vector equal to the product of the base value multiplied by a value in each relevant element in the first input vector at or to the right of the key element position that are also at or to the left of the element position in the result vector (step 2416). In other words, processor 102 determines the value held in elements in the first input vector for which both a corresponding element in pred and a corresponding element in cv contain non-zero values (i.e., "relevant elements") that are located at or to the left of the element in the result vector. Processor 102 then sets the element in res equal to the product of the base value multiplied by the value in each determined relevant element in the first input vector. For example, assuming iv1, iv2, cv, and pred contain the values shown, res could be generated as follows:

| iv1  | = | { | 1 | 1 | 2 | 3 | 2 | 9 | 7 | 2 | } |
|------|---|---|---|---|---|---|---|---|---|---|---|
| iv2  | = | { | 8 | 7 | 3 | 5 | 4 | 3 | 2 | 1 | } |
| pred | = | { | 1 | 1 | 1 | 1 | 1 | 1 | 1 | 1 | } |
| cv   | = | { | 0 | 0 | 1 | 1 | 1 | 0 | 0 | 1 | } |
| res  | = | { | X | X | 6 | 18| 36| 36| 36| 72| } |

As this example shows, processor 102 multiplies the base value of 3 that was captured from the element in the second input vector at the key element position with the value in the first input vector in the key element position, 2, and writes the product of 6 to the element in the result vector in the key element position (as described with respect to steps 2408-2410). For each of the remaining elements in res to the right of the key element position, processor 102 determines the relevant elements at or to the right of the key element position that are also at or to the left of the element position in the result vector. Processor then multiplies the base value by a value from each of the determined relevant elements in the first input vector and writes the product value to the result vector. For example, for the fifth element in res, processor 102 determines that there are 3 relevant elements at or to the left of the fifth element in the result vector (i.e., the third, fourth, and fifth elements). Processor 102 then determines that the values in the third, fourth, and fifth elements of the first input vector are 2, 3, and 2, respectively. Processor 102 next writes 3*2*3*2=36 into the fifth element of res. The remaining elements are handled by processor 102 in the same way. For clarity, elements that are not written to during this operation are marked with an X in res.

The foregoing descriptions have been presented only for purposes of illustration and description. They are not intended to be exhaustive or to limit the described embodiments to the forms disclosed. Accordingly, many modifications and variations will be apparent to practitioners skilled in the art. Additionally, the above disclosure is not intended to limit the described embodiments. The scope of these embodiments is defined by the appended claims.

What is claimed is:

1. A method for generating a result vector with results of an associative Boolean operation, comprising:
   in a processor, performing operations for:
      receiving a first input vector, a second input vector, and a control vector, and optionally receiving a predicate vector, wherein each vector includes a same number of elements;
      capturing a base value contained in an element of the second input vector at a key element position; and
      generating the result vector, wherein generating the result vector involves, if the predicate vector is received, for each element in the result vector to the right of the key element position for which a corresponding element in the predicate vector is active, otherwise, for each element in the result vector to the right of the key element position, setting the element in the result vector equal to a result of the associative Boolean operation for which the inputs are the base value and a value in each relevant element of the first input vector from an element at the key element position to and including a predetermined element in the first input vector, wherein a relevant element in the first input vector is an element in the first input vector for which a corresponding element in the control vector is active.

2. The method of claim 1, wherein the associative Boolean operation is one of:
an AND operation;
an OR operation; or
an XOR operation.

3. The method of claim 2, wherein the predetermined element in the first input vector is one of:
a first element to the left of an element in a same position as the element in the result vector; or
the element in the same position as the element in the result vector.

4. The method of claim 3, wherein generating the result vector involves setting an element in the result vector at the key element position equal to one of:
the base value; or
a result of the associative Boolean operation for which the inputs are the base value and a value in the key element position of the first input vector.

5. The method of claim 4, wherein if the predicate vector is received, the key element position is a leftmost element position where both the control vector and the predicate vector are active;
otherwise, the key element position is a leftmost element position where the control vector is active.

6. The method of claim 5, wherein if the predicate vector is received, for each element in the result vector to the left of the key element position for which a corresponding element in the predicate vector is active, otherwise, for each element in the result vector to the left of the key element position in the result vector, generating the result vector involves setting the element in the result vector equal to a value in a corresponding element in the second input vector; and
wherein if no key element position exists, if the predicate vector is received, for each element in the result vector for which a corresponding element in the predicate vector is active, otherwise, for each element in the result vector, generating the result vector involves setting the element in the result vector equal to a value in a corresponding element in the second input vector.

7. The method of claim 6, wherein if the predicate vector is received, generating the result vector involves, for each element in the result vector, if a corresponding element in the predicate vector is not active, one of:
leaving the element in the result vector unmodified; or
setting the element in the result vector to zero.

8. The method of claim 1, wherein generating the result vector involves processing elements in the first input vector, the second input vector, the control vector, and, if the predicate vector is received, the predicate vector in parallel to enable the elements of the result vector to be generated in parallel.

9. A processor for generating a result vector with results from an associative Boolean operation, comprising:
at least one execution unit configured to:
receive a first input vector, a second input vector, and a control vector, and optionally receive a predicate vector, wherein each vector includes a same number of elements;
capture a base value contained in an element of the second input vector at a key element position; and
generate the result vector, wherein when generating the result vector, if the predicate vector is received, for each element in the result vector to the right of the key element position for which a corresponding element in the predicate vector is active, otherwise, for each element in the result vector to the right of the key element position, the at least one execution unit is configured to:
set the element in the result vector equal to a result of the associative Boolean operation for which the inputs are the base value and a value in each relevant element of the first input vector from an element at the key element position to and including a predetermined element in the first input vector, wherein a relevant element in the first input vector is an element in the first input vector for which a corresponding element in the control vector is active.

10. The processor of claim 9, wherein the associative Boolean operation is one of:
an AND operation;
an OR operation; or
an XOR operation.

11. The processor of claim 10, wherein the predetermined element in the first input vector is one of:
a first element to the left of an element in a same position as the element in the result vector; or
the element in the same position as the element in the result vector.

12. The processor of claim 11, wherein when generating the result vector, the at least one execution unit is configured to set an element in the result vector at the key element position equal to one of:
the base value; or
a result of the associative Boolean operation for which the inputs are the base value and a value in the key element position of the first input vector.

13. The processor of claim 12, wherein if the predicate vector is received, the key element position is a leftmost element position where both the control vector and the predicate vector are active;
otherwise, the key element position is a leftmost element position where the control vector is active.

14. The processor of claim 13, wherein if the predicate vector is received, for each element in the result vector to the left of the key element position for which a corresponding element in the predicate vector is active, otherwise, for each element in the result vector to the left of the key element position in the result vector, when generating the result vector, the at least one execution unit is configured to set the element in the result vector equal to a value in a corresponding element in the second input vector; and
wherein if no key element position exists, if the predicate vector is received, for each element in the result vector for which a corresponding element in the predicate vector is active, otherwise, for each element in the result vector, when generating the result vector the at least one execution unit is configured to set the element in the result vector equal to a value in a corresponding element in the second input vector.

15. The processor of claim 14, wherein if the predicate vector is received, when generating the result vector, for each element in the result vector, if a corresponding element in the predicate vector is not active, the at least one execution unit is configured to one of:
leave the element in the result vector unmodified; or
set the element in the result vector to zero.

16. The processor of claim 9, wherein when generating the result vector, the at least one execution unit is configured to process elements in the first input vector, the second input vector, the control vector, and, if the predicate vector is received, the predicate vector in parallel to enable the elements of the result vector to be generated in parallel.

17. A computer system for generating a result vector with results from an associative Boolean operation, comprising:
a processor;
a memory coupled to the processor, wherein the memory stores data and instructions for the processor;
at least one execution unit in the processor, wherein the at least one execution unit is configured to:
receive a first input vector, a second input vector, and a control vector, and optionally receive a predicate vector, wherein each vector includes a same number of elements;
capture a base value contained in an element of the second input vector at a key element position; and
generate the result vector, wherein when generating the result vector, if the predicate vector is received, for each element in the result vector to the right of the key element position for which a corresponding element in the predicate vector is active, otherwise, for each element in the result vector to the right of the key element position, the at least one execution unit is configured to:
set the element in the result vector equal to a result of the associative Boolean operation for which the inputs are the base value and a value in each relevant element of the first input vector from an element at the key element position to and including a predetermined element in the first input vector, wherein a relevant element in the first input vector is an element in the first input vector for which a corresponding element in the control vector is active.

18. The computer system of claim 17, wherein the associative Boolean operation is one of:
an AND operation;
an OR operation; or
an XOR operation.

19. The computer system of claim 18, wherein the predetermined element in the first input vector is one of:
a first element to the left of an element in a same position as the element in the result vector; or
the element in the same position as the element in the result vector.

20. The computer system of claim 19, wherein when generating the result vector, the at least one execution unit is configured to set an element in the result vector at the key element position equal to one of:
the base value; or
a result of the associative Boolean operation for which the inputs are the base value and a value in the key element position of the first input vector.

21. The computer system of claim 20, wherein if the predicate vector is received, the key element position is a leftmost element position where both the control vector and the predicate vector are active;
otherwise, the key element position is a leftmost element position where the control vector is active.

22. The computer system of claim 21, wherein if the predicate vector is received, for each element in the result vector to the left of the key element position for which a corresponding element in the predicate vector is active, otherwise, for each element in the result vector to the left of the key element position in the result vector, when generating the result vector, the at least one execution unit is configured to set the element in the result vector equal to a value in a corresponding element in the second input vector; and
wherein if no key element position exists, if the predicate vector is received, for each element in the result vector for which a corresponding element in the predicate vector is active, otherwise, for each element in the result vector, when generating the result vector the at least one execution unit is configured to set the element in the result vector equal to a value in a corresponding element in the second input vector.

23. The computer system of claim 22, wherein if the predicate vector is received, when generating the result vector, for each element in the result vector, if a corresponding element in the predicate vector is not active, the at least one execution unit is configured to one of:
leave the element in the result vector unmodified; or
set the element in the result vector to zero.

24. The computer system of claim 17, wherein when generating the result vector, the at least one execution unit is configured to process elements in the first input vector, the second input vector, the control vector, and, if the predicate vector is received, the predicate vector in parallel to enable the elements of the result vector to be generated in parallel.

25. A method for generating a result vector with multiplied values from a first input vector, comprising:
in a processor, performing operations for:
receiving the first input vector, a second input vector, and a control vector, and optionally receiving a predicate vector, wherein each vector includes a same number elements;
capturing a base value contained in an element of the second input vector at a key element position; and
generating the result vector, wherein generating the result vector involves, if the predicate vector is received, for each element in the result vector to the right of the key element position for which a corresponding element in the predicate vector is active, otherwise, for each element in the result vector to the right of the key element position,
setting the element in the result vector equal to a product of the base value multiplied by a value in each relevant element of the first input vector, from an element at the key element position to and including a predetermined element in the first input vector, wherein a relevant element in the first input vector is an element in the first input vector for which a corresponding element in the control vector is active.

26. The method of claim 25, wherein the predetermined element in the first input vector is one of:
a first element to the left of an element in a same position as the element in the result vector; or
the element in the same position as the element in the result vector.

27. The method of claim 26, wherein generating the result vector involves setting an element in the result vector at the key element position equal to one of:
the base value; or
a product of the base value multiplied by a value in the key element position in the first input vector.

28. The method of claim 27, wherein if the predicate vector is received, the key element position is a leftmost element position where both the control vector and the predicate vector are active;
otherwise, the key element position is a leftmost element position where the control vector is active.

29. The method of claim 28, wherein if the predicate vector is received, for each element in the result vector to the left of a key element position for which a corresponding element in the predicate vector is active, otherwise, for each element in the result vector to the left of the key element position in the result vector, generating the result vector involves setting the element in the result vector equal to a value in a corresponding element in the second input vector; and wherein if no key element position exists, if the predicate vector is received, for each element in the result vector for which a corresponding element in the predicate vector is active, otherwise, for each element in the result vector, generating the result vector involves setting the element in the result vector equal to a value in a corresponding element in the second input vector.

30. The method of claim 29, wherein if the predicate vector is received, generating the result vector involves, for each element in the result vector, if a corresponding element in the predicate vector is not active, one of:

leaving the element in the result vector unmodified; or
setting the element in the result vector to zero.

31. The method of claim 25, wherein generating the result vector involves processing elements in the input vector, control vector, and, if the predicate vector is received, the predicate vector in parallel to enable the elements of the result vector to be generated in parallel.

32. A processor for generating a result vector with multiplied values from a first input vector, comprising:

at least one execution unit, wherein the at least one execution unit is configured to:

receive the first input vector, a second input vector, and a control vector, and optionally receive a predicate vector, wherein each vector includes a same number of elements;

capture a base value contained in an element of the second input vector at a key element position; and generate the result vector, wherein when generating the result vector, if the predicate vector is received, for each element in the result vector to the right of the key element position for which a corresponding element in the predicate vector is active, otherwise, for each element in the result vector to the right of the key element position, the at least one execution unit is configured to:

set the element in the result vector equal to a product of the base value multiplied by a value in each relevant element of the first input vector, from an element at the key element position to and including a predetermined element in the first input vector, wherein a relevant element in the first input vector is an element in the first input vector for which a corresponding element in the control vector is active.

33. The processor of claim 32, wherein the predetermined element in the first input vector is one of:

a first element to the left of an element in a same position as the element in the result vector; or
the element in the same position as the element in the result vector.

34. The processor of claim 33, wherein when generating the result vector, the at least one execution unit is configured to set an element in the result vector at the key element position equal to one of:

the base value; or
a product of the base value multiplied by a value in the key element position in the first input vector.

35. The processor of claim 34, wherein if the predicate vector is received, the key element position is a leftmost element position where both the control vector and the predicate vector are active;

otherwise, the key element position is a leftmost element position where the control vector is active.

36. The processor of claim 35, wherein if the predicate vector is received, for each element in the result vector to the left of a key element position for which a corresponding element in the predicate vector is active, otherwise, for each element in the result vector to the left of the key element position in the result vector, when generating the result vector, the at least one execution unit is configured to set the element in the result vector equal to a value in a corresponding element in the second input vector; and wherein if no key element position exists, if the predicate vector is received, for each element in the result vector for which a corresponding element in the predicate vector is active, otherwise, for each element in the result vector, when generating the result vector, the at least one execution unit is configured to set the element in the result vector equal to a value in a corresponding element in the second input vector.

37. The processor of claim 36, wherein if the predicate vector is received, when generating the result vector, for each element in the result vector, if a corresponding element in the predicate vector is not active, the at least one execution unit is configured to one of:

leave the element in the result vector unmodified; or
set the element in the result vector to zero.

38. The processor of claim 32, wherein when generating the result vector, the at least one execution unit is configured to process elements in the input vector, control vector, and, if the predicate vector is received, the predicate vector in parallel to enable the elements of the result vector to be generated in parallel.

* * * * *